(12) United States Patent
Melcher

(10) Patent No.: US 12,515,828 B2
(45) Date of Patent: Jan. 6, 2026

(54) ELECTRIC VERTICAL TAKEOFF AND LANDING AIRCRAFT

(71) Applicant: Thomas W. Melcher, Mesa, AZ (US)

(72) Inventor: Thomas W. Melcher, Mesa, AZ (US)

(*) Notice: Subject to any disclaimer, the term of this patent is extended or adjusted under 35 U.S.C. 154(b) by 0 days.

(21) Appl. No.: 18/731,094

(22) Filed: May 31, 2024

(65) Prior Publication Data

US 2025/0002148 A1 Jan. 2, 2025

Related U.S. Application Data

(63) Continuation of application No. 18/093,796, filed on Jan. 5, 2023, now Pat. No. 12,037,118, which is a
(Continued)

(51) Int. Cl.
| | |
|---|---|
| *B64U 30/12* | (2023.01) |
| *B64C 3/38* | (2006.01) |
| *B64C 9/02* | (2006.01) |
| *B64C 29/02* | (2006.01) |
| *B64C 37/00* | (2006.01) |

(Continued)

(52) U.S. Cl.
CPC ............... *B64U 30/12* (2023.01); *B64C 3/38* (2013.01); *B64C 9/02* (2013.01); *B64C 29/02* (2013.01); *B64C 37/00* (2013.01); *B64D 1/22* (2013.01); *B64U 10/20* (2023.01); *B64U 30/26* (2023.01); *B64U 50/19* (2023.01); *B64U 2101/60* (2023.01)

(58) Field of Classification Search
CPC .......... B64C 29/00; B64C 29/02; B64C 3/38; B64C 9/02; B64C 2201/024; B64C 2201/042; B64C 2201/126; B64C 2201/128; B64C 2201/162; B64D 1/22; B64U 30/12; B64U 10/20
See application file for complete search history.

(56) References Cited

U.S. PATENT DOCUMENTS

| | | |
|---|---|---|
| 3,589,646 A | 6/1971 | Mori |
| 3,868,073 A | 2/1975 | King |

(Continued)

FOREIGN PATENT DOCUMENTS

| | | |
|---|---|---|
| DE | 102008004054 | 12/2010 |
| WO | 1998002350 | 1/1998 |

OTHER PUBLICATIONS

Restriction Requirement dated May 10, 2021 in U.S. Appl. No. 16/393,736.

(Continued)

*Primary Examiner* — Philip J Bonzell
(74) *Attorney, Agent, or Firm* — SNELL & WILMER LLP

(57) ABSTRACT

An aircraft has a boom, a propulsion assembly coupled to a first end of the boom, and a first wing coupled to a second end of the boom. The propulsion assembly is coupled to the boom by a rotating joint. A second wing is optionally coupled to the rotating joint. The first wing is coupled to the boom by a rotating joint. The first wing is coupled to the rotating joint by a hinge. A vehicle with roll, pitch, and yaw maneuverability able to mirror the aircraft movements may be coupled to the second end of the boom. The vehicle body may be picked up with a vehicle chassis disconnected from the vehicle body. The boom houses an energy source to power the propulsion assembly. A rudder is coupled to the second end of the boom. A paddle is disposed between the propulsion assembly and the boom.

20 Claims, 38 Drawing Sheets

Related U.S. Application Data continuation of application No. 16/393,736, filed on Apr. 24, 2019, now Pat. No. 11,548,637.

(60) Provisional application No. 62/810,901, filed on Feb. 26, 2019, provisional application No. 62/662,081, filed on Apr. 24, 2018.

(51) Int. Cl.
  *B64D 1/22* (2006.01)
  *B64U 10/20* (2023.01)
  *B64U 30/26* (2023.01)
  *B64U 50/19* (2023.01)
  *B64U 101/60* (2023.01)

(56) References Cited

U.S. PATENT DOCUMENTS

| | | |
|---|---|---|
| 4,452,410 A | 6/1984 | Everett |
| 4,598,887 A | 7/1986 | Jordan |
| 5,707,027 A | 1/1998 | Hiesener |
| 5,799,900 A | 9/1998 | McDonnell |
| 5,806,793 A | 9/1998 | Brossier |
| 5,884,873 A | 3/1999 | Breit |
| 5,996,933 A | 12/1999 | Schier |
| 6,138,943 A | 10/2000 | Huang |
| 6,845,939 B1 | 1/2005 | Baldwin |
| 7,070,145 B2 | 7/2006 | Baldwin |
| 7,988,102 B2 | 8/2011 | Juergen |
| 8,172,173 B2 | 5/2012 | Carlson |
| 8,191,834 B2 | 6/2012 | Westenberger |
| 8,276,392 B2 | 10/2012 | Van Der Woude |
| 9,302,788 B2 | 4/2016 | Wan |
| 10,059,442 B2 | 8/2018 | Olm et al. |
| 11,548,637 B2 | 1/2023 | Melcher |
| 2005/0051667 A1 | 3/2005 | Arlton |
| 2006/0011777 A1 | 1/2006 | Arlton et al. |
| 2006/0032971 A1 | 2/2006 | Baldwin |
| 2007/0114325 A1 | 5/2007 | Baldwin |
| 2012/0025012 A1 | 2/2012 | Arlton et al. |
| 2012/0223191 A1 | 9/2012 | Roberts |
| 2013/0099048 A1 | 4/2013 | Fisher et al. |
| 2013/0247584 A1 | 9/2013 | Kasibhotla et al. |
| 2017/0008625 A1 | 1/2017 | Olm et al. |
| 2018/0101169 A1 | 4/2018 | Applewhite |
| 2019/0322368 A1 | 10/2019 | Melcher |

OTHER PUBLICATIONS

Non-Final Office Action dated Jan. 13, 2022 in U.S. Appl. No. 16/393,736.
Notice of Allowance dated Sep. 12, 2022 in U.S. Appl. No. 16/393,736.
Non-Final Office Action dated Aug. 17, 2023 in U.S. Appl. No. 18/093,796.
Notice of Allowance dated Mar. 5, 2024 in U.S. Appl. No. 18/093,796.
International Search Report and Written Opinion dated Aug. 12, 2019 in PCT International Patent Application No. PCT/US2019/028996.
International Preliminary Report on Patentability dated Oct. 27, 2020 in PCT International Patent Application No. PCT/US2019/028996.
International Search Report and Written Opinion dated Nov. 9, 2023 in PCT International Patent Application No. PCT/US23/26101.
International Search Report and Written Opinion dated Nov. 9, 2023 in PCT International Patent Application No. PCT/US23/26161.
Office Action dated May 27, 2022 in India Patent Application No. 202027043647.
European Search Report dated Dec. 14, 2021 in Application No. 19792117.4.
European Search Report dated May 15, 2023 in Application No. 19792117.4.
Office Action dated Aug. 5, 2022 in Philippines Patent Application No. 1/2020/551665.
Office Action dated Dec. 23, 2022 in Philippines Patent Application No. 1/2020/551665.
Office Action dated Jun. 20, 2023 in Chinese Patent Application No. 201980042925.3.
Office Action dated Aug. 16, 2024 in Chinese Patent Application No. 201980042925.3.
Office Action dated Jun. 8, 2023 in Brazil Patent Application No. BR112020021771-9.
Office Action dated Jul. 2, 2024 in Canadian Patent Application No. 3095805.
Office Action dated Jul. 5, 2024 in Indonesia Patent Application No. P00202008023.
Taldesign Official: "PopUp", XP055868399, Retrieved from the Internet: URL:https://www.youtube.com/watch?v=LOhXstrydmy&1c=Ugg-1rCQmg4J1ngCoAEC (2017).
Non Final Office Action in U.S. Appl. No. 18/999,742 dated Jul. 29, 2025.

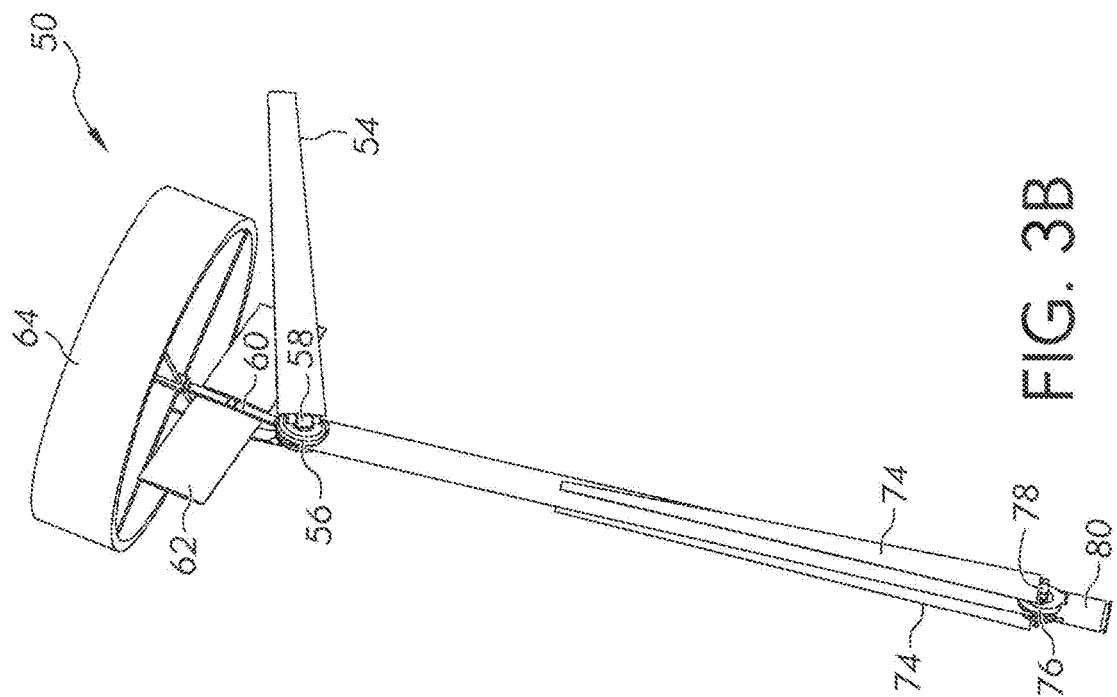
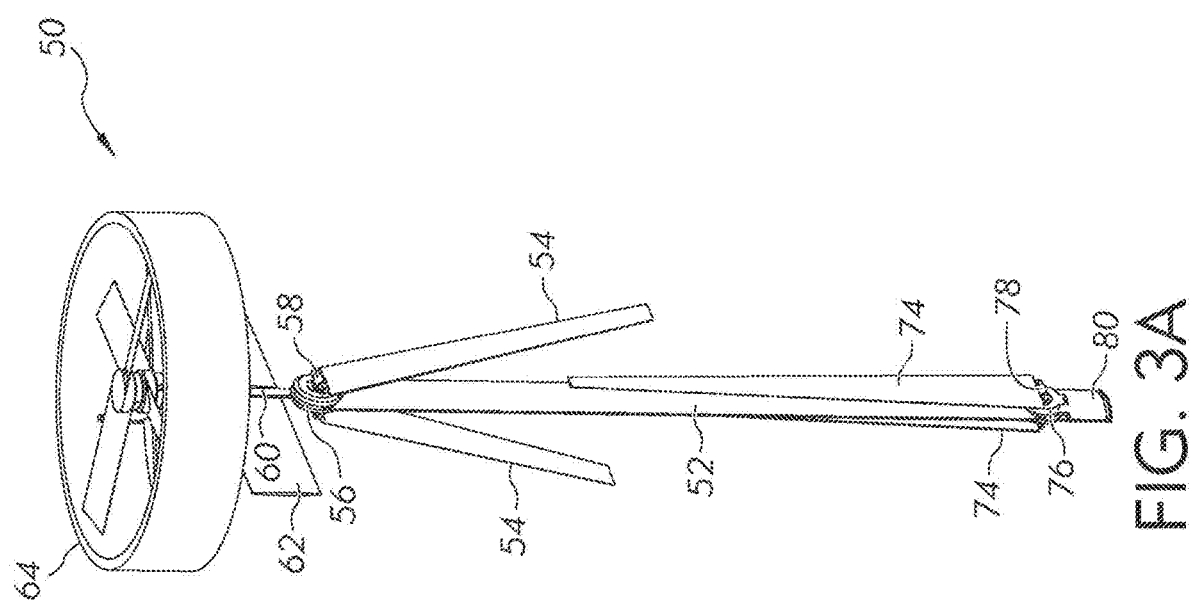

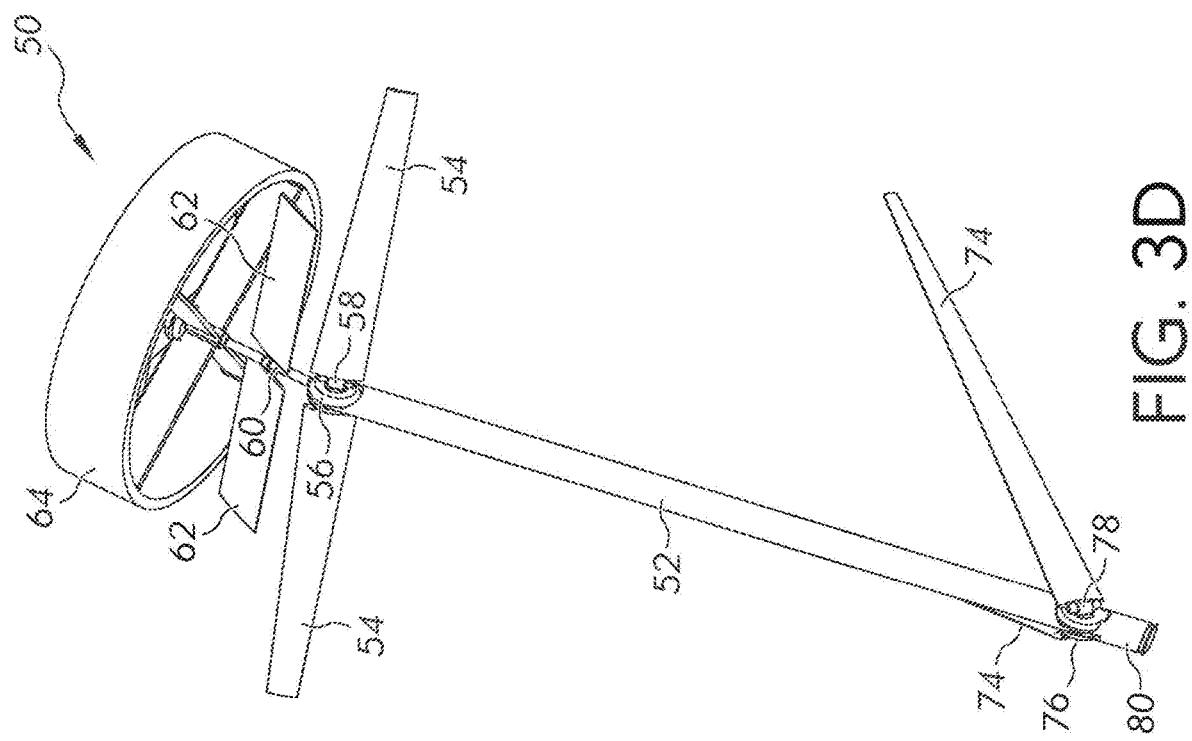
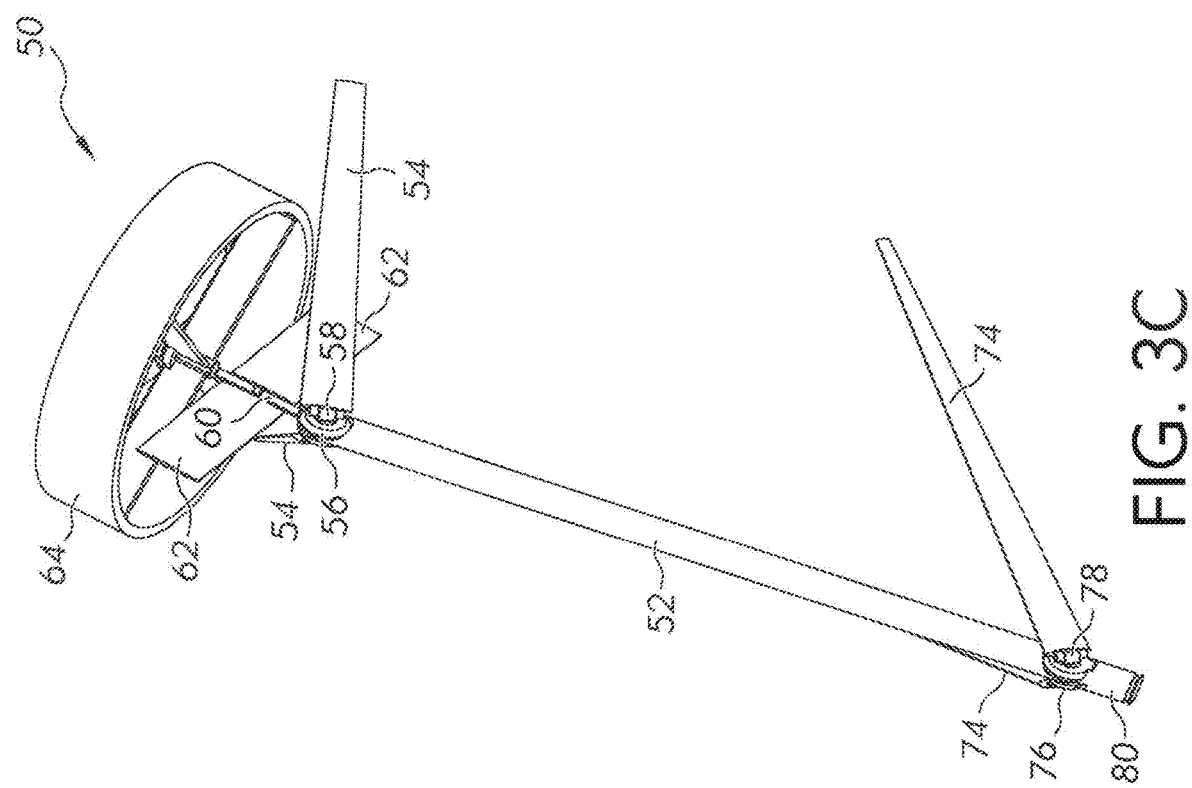
FIG. 3D
FIG. 3C

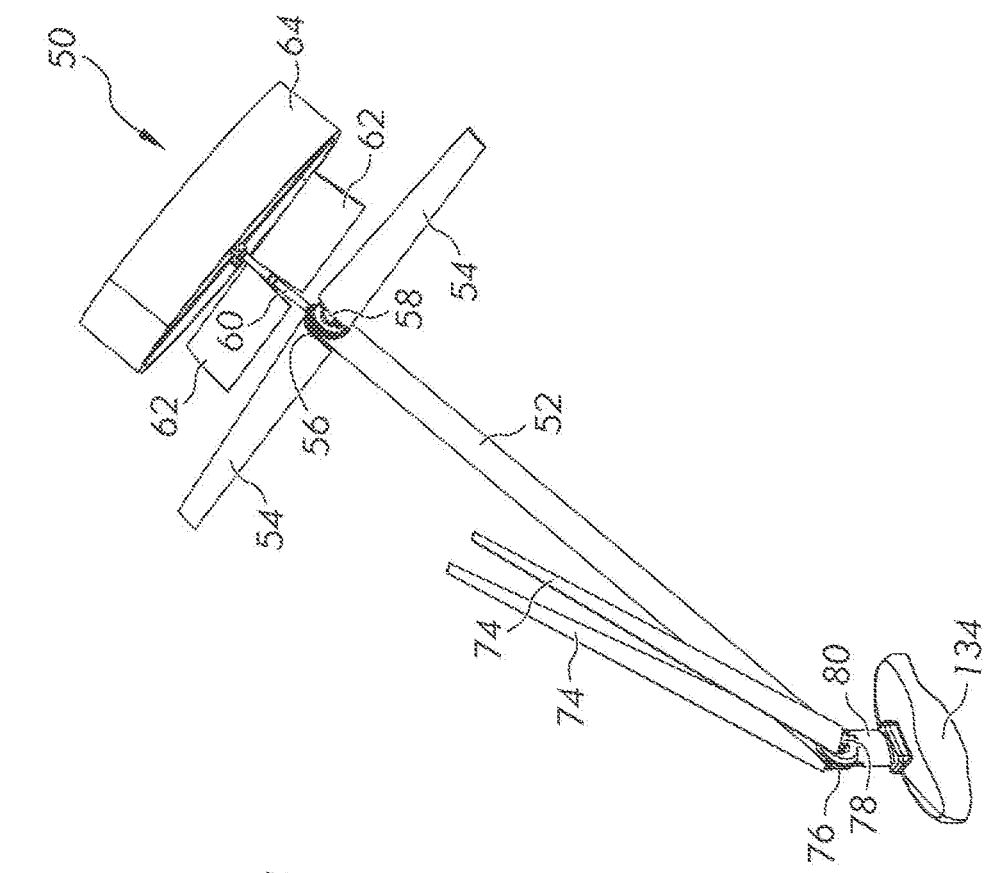
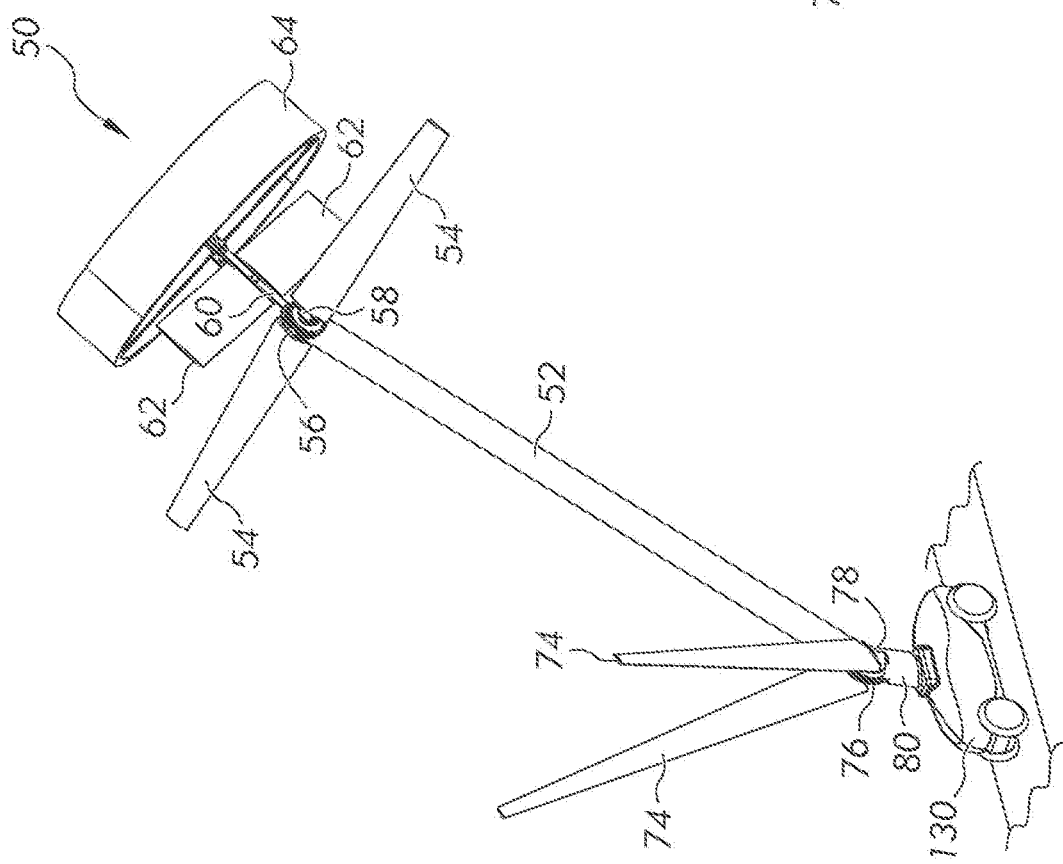

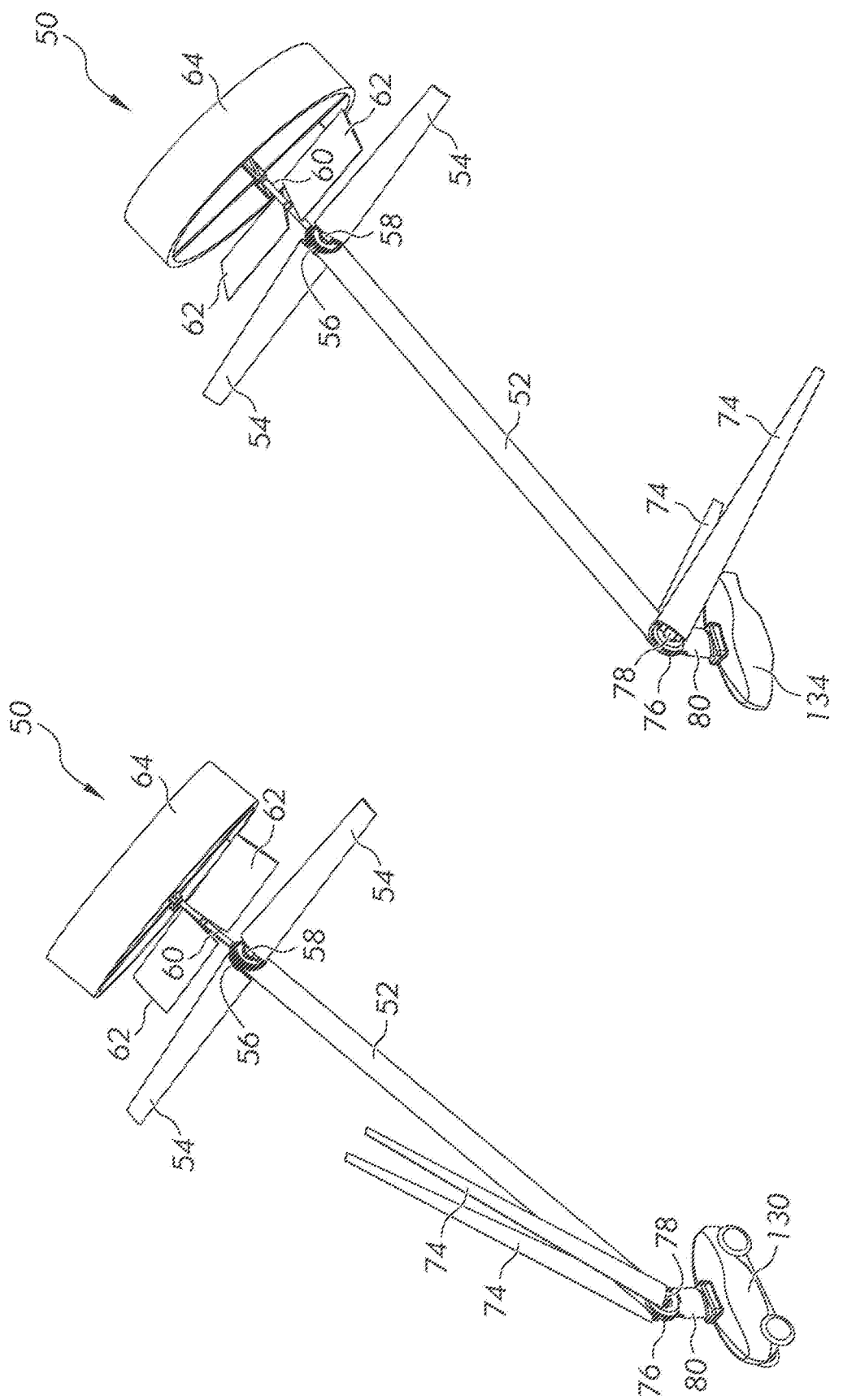

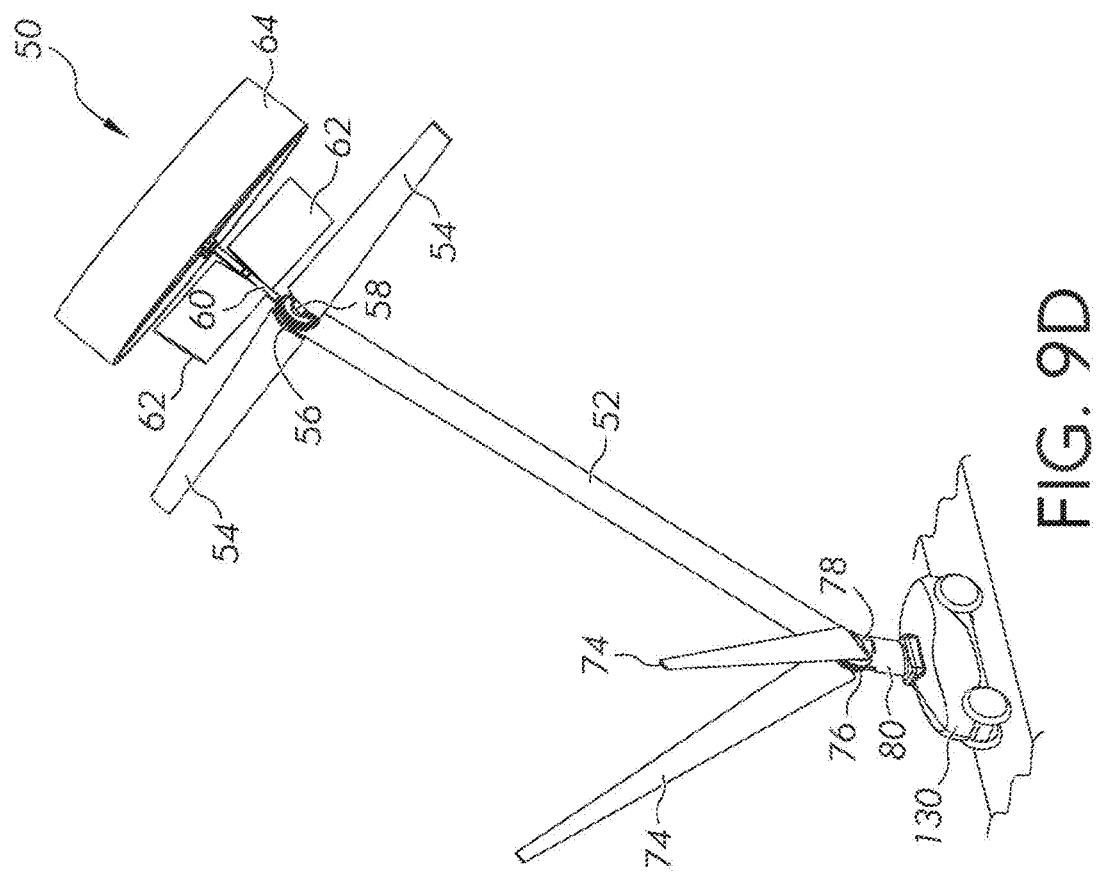
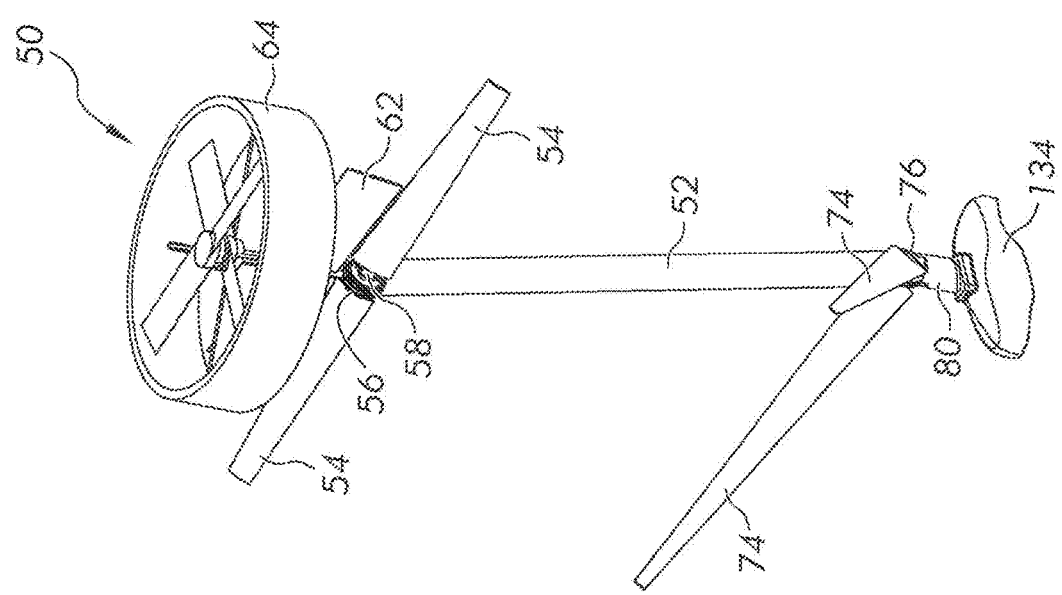
FIG. 9D
FIG. 9C

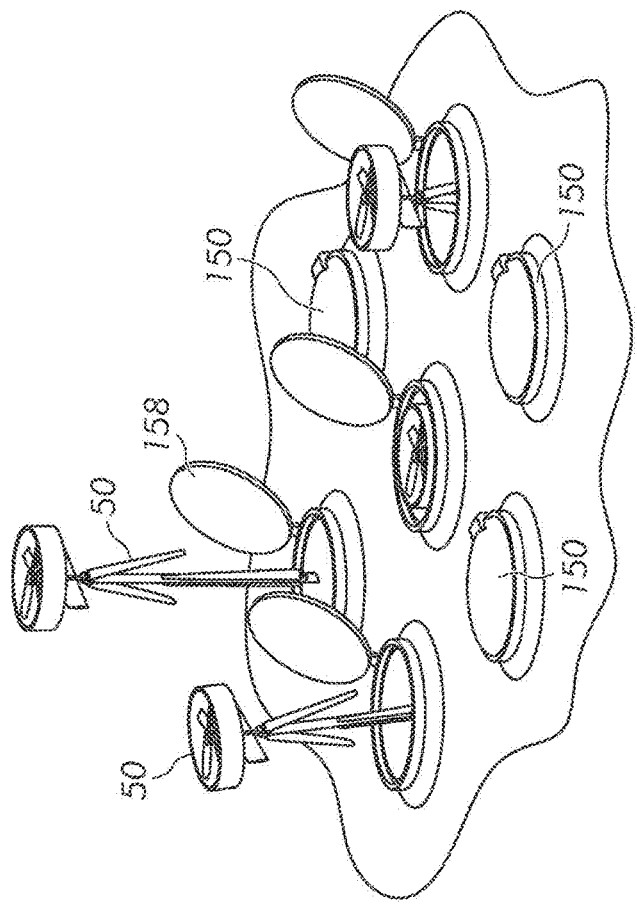
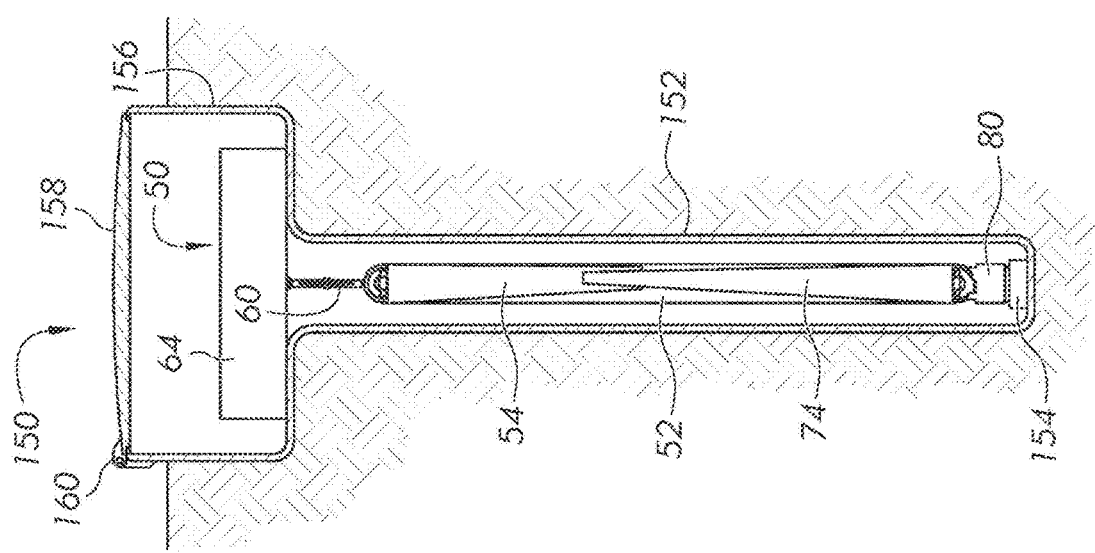
FIG. 10A
FIG. 10B

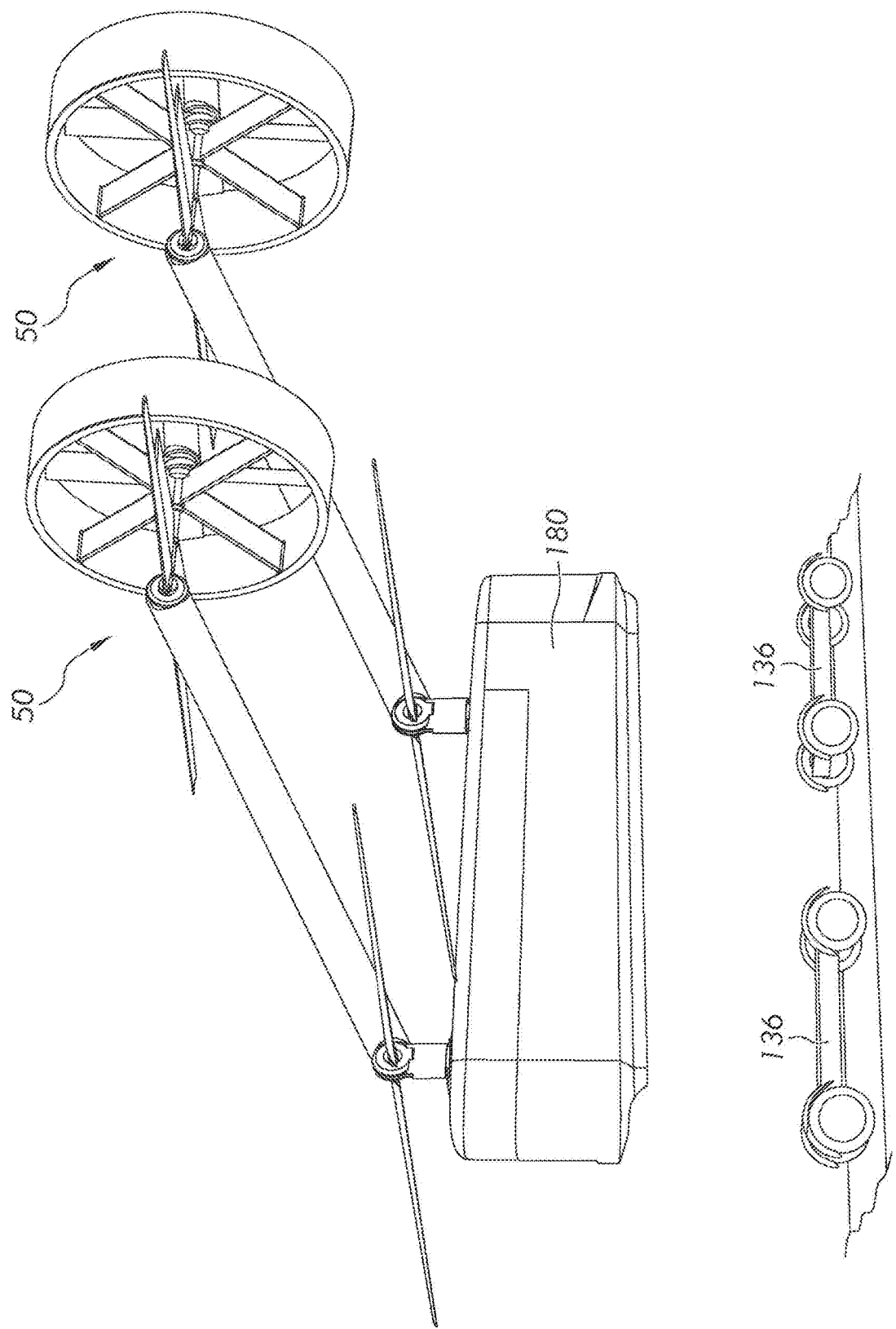

ELECTRIC VERTICAL TAKEOFF AND LANDING AIRCRAFT

CLAIM TO DOMESTIC PRIORITY

This application is a continuation of U.S. patent application Ser. No. 18/093,796, filed Jan. 5, 2023, which is a continuation of U.S. patent application Ser. No. 16/393,736, filed Apr. 24, 2019, which claims priority to, and the benefit of, U.S. Provisional Application Ser. No. 62/662,081, filed Apr. 24, 2018, and U.S. Provisional Application Ser. No. 62/810,901, filed Feb. 26, 2019, which applications are incorporated herein by reference in their entirety.

FIELD OF THE INVENTION

The present invention relates in general to transportation systems, and, more particularly, to a transportation system using an electric vertical takeoff and landing (eVTOL) aircraft to transport ground vehicles with active leaning suspensions and other payloads.

BACKGROUND

Traffic congestion is a major problem across the developed world and getting worse by the day. In all corners of the globe, people drive daily to commute to work, to shop, to travel cross-country for work or vacation, and for any number of other purposes. As populations grow in number and advance economically, more and more cars are added to the roadways. Two million passenger vehicles are added to the world's roadways every year. For 2018, an estimated 81.50 million vehicles were produced globally, up from 79.02 million in 2017. The world's infrastructure has so far not expanded or adapted to meet the growing demands.

One concept for reducing congestion is the introduction of self-driving vehicles. Self-driving vehicles can potentially communicate directly with each other and with local infrastructure systems to coordinate the speeds and locations of every vehicle on the road. Such coordination would allow for the removal and traffic lights and optimization of traffic fluidity. The introduction of self-driving vehicles en masse will allow drivers to reach their destinations quicker. However, an autonomous transportation future will not itself solve the congestion problem. Moving to autonomous vehicles does not reduce the number of vehicles on the road or increase the amount of space on existing highways.

Another proposed solution is to take commuting to the skies. In a concept similar to ridesharing, sky taxis in development will allow commuters to share a ride on electric vertical takeoff and landing (eVTOL) aircraft between skyports spread throughout a metropolitan area. However, construction of hundreds of skyports in the hearts of cities around the world will cost billions and take decades. Once built, passengers will have to arrange transportation to and from skyports and process through security screenings. Moreover, due to their inefficient design, sky taxi aircraft will require full occupancy of between four and six passengers to remain profitable. Unless a commuter is flying between hot-zones at peak times, there will more than likely be a wait before boarding. Even worse, remote destinations with few potential riders will not be able to support a skyport. The sky taxi concept requiring skyports limits the destinations to only large metropolitan centers.

Therefore, a need exists for a transportation system that can truly reduce congestion on the roads while also expanding travel into the air without requiring a large skyport infrastructure.

BRIEF DESCRIPTION OF THE DRAWINGS

FIGS. 3a-3f illustrate the eVTOL going from vertical takeoff to horizontal cruising;

FIGS. 8a-8f illustrate the eVTOL picking up a moving ground vehicle and transitioning to horizontal cruising;

FIGS. 9a-9d illustrate the eVTOL dropping off the ground vehicle in motion on a road;

FIGS. 10a-10d illustrate storage silos for the e VTOL;

FIGS. 11a and 11b illustrate using multiple ground chassis or eVTOLs in tandem.

DETAILED DESCRIPTION OF THE DRAWINGS

Figure 1B:
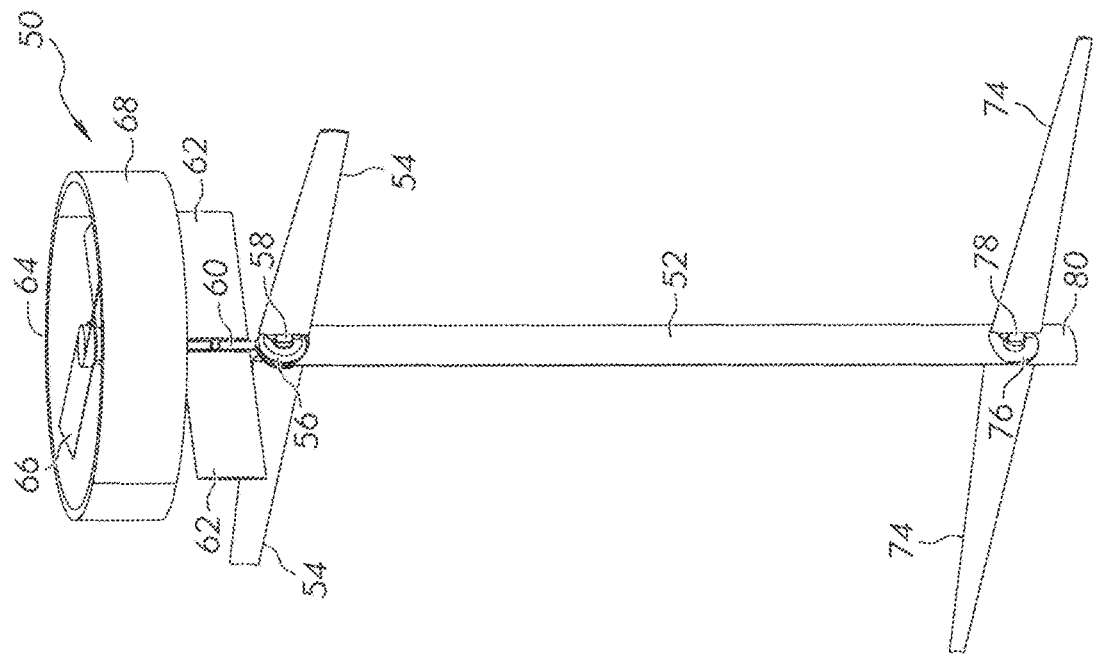
FIGS. 1a-1h illustrate a skyboom electric vertical takeoff and landing (eVTOL) aircraft.
Figure 1A:
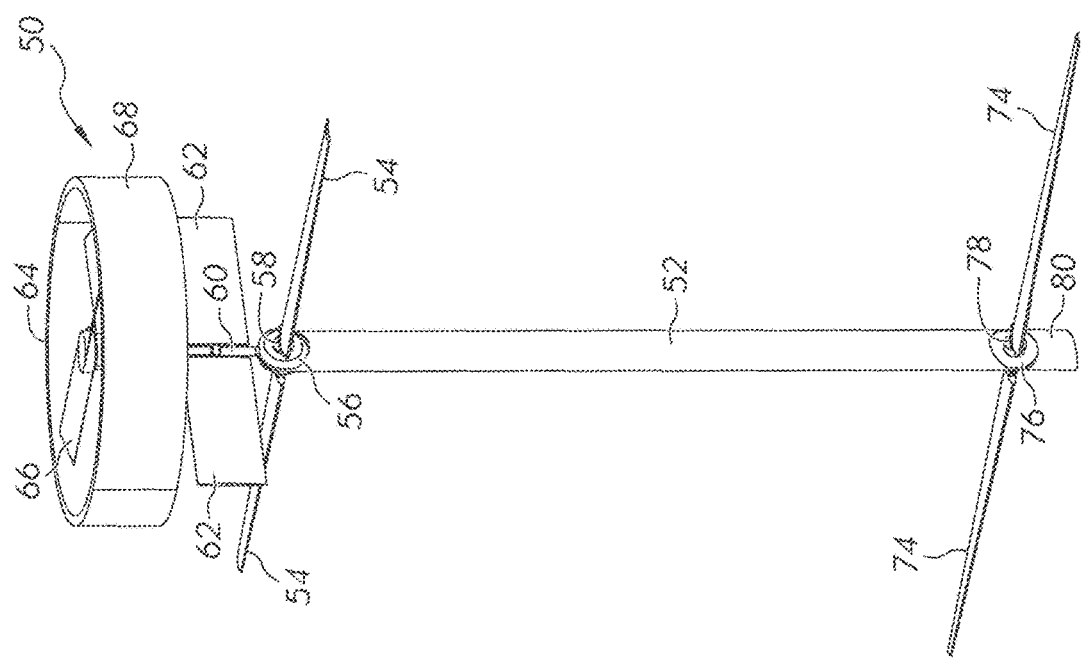

FIGS. 1a-1h illustrate a skyboom-based electric vertical takeoff and landing (eVTOL) aircraft 50. eVTOL 50 is an aircraft formed around a powerboom or skyboom 52. The top end of skyboom 52 has upper wings 54 attached via a rotating joint 56 and a hinge 58. A rotor stanchion 60 extends from joint 56 and holds paddles 62 and rotor assembly 64. Rotor assembly 64 includes one or more rotor blades 66 surrounded by an optional shroud or duct 68. The bottom end of skyboom 52 has lower wings 74 attached via rotating joint 76 and hinge 78. A payload connector 80 extends down from rotating joint 76. In one embodiment, payload connector 80 includes a shaft similar to stanchion 60 and operates as a rudder with 360 degree rotation capability.

Skyboom 52 operates as the fuselage of e VTOL 50. The standard skyboom 52 will be 40 feet in length to support a combined wingspan of 160 feet for upper wings 54 and lower wings 74. In the standard model, the combined wingspan of all four wings 54 and 74 is 100 feet: 60 feet for lower wings 74 and 40 feet for upper wings 54. Skyboom 52 houses fuel to power eVTOL 50. In the case of an all-electric eVTOL 50, skyboom 52 houses a large array of electric batteries. Standard battery weight for the all-electric eVTOL 50 will be 1,800-2,400 pounds, with an estimated total eVTOL weight of 3,600 to 4,000 pounds. The size, length, and battery capacity of skyboom 52 are all scalable as desired to meet flight requirements for a given situation. Skyboom 52 has a symmetric airfoil shape to provide a large battery storage capacity in a low drag structure. In hybrid embodiments, skyboom 52 can house both electric batteries and liquid fuel.

eVTOL 50 has two pairs of long high aspect ratio wings, upper wings 54 at the top of skyboom 52 and lower wings 74 at the bottom of skyboom 52. Upper wings 54 are optional, and some embodiments are capable of horizontal cruising with only lower wings 74. In other embodiments, smaller canards are used for upper wings 54. Rotating joints 56 and 76 allow wings 54 and 74, respectively, to rotate about an axis through the lengths of the wings as illustrated in FIG. 1b. Wings 54 and 74 are attached to circular rails, circular gears, or a ring gear within joints 56 and 76 that allow 360-degree rotation of the wings using gears and electric drive motors. Rotation of wings 54 and 74 can also be passive. A locking mechanism can be used to temporarily disallow rotation of wings 54 and 74. Wings 54 and 74 may have additional control surfaces built into the wings, such as flaps or ailerons, for in-flight control. Otherwise, rotation via joints 56 and 76 can be used for in-flight control.

Rotating joint 56 allows wings 54 to rotate independently from each other. Rotating joint 76 allows wings 74 to rotate independently from each other. Rotating wings on opposite sides of skyboom 52 in opposite directions will effectively turn the wings into rotors to facilitate autorotation. Wing tips could be fitted with rockets to initiate autorotation. Rockets can be mounted directly to wing tips or within wing structure with plumbing to a wing tip nozzle. Autorotation can be particularly useful in reduced power or loss of power situations. In autorotation, the entire eVTOL 50 rotates in response to surrounding air moving upward relative to the eVTOL. In autorotation, skyboom 52 rotates about an axis through the length of the skyboom. An attached load could be geared through payload connector 80 to maintain set position or rotate in an opposite direction to induce a stabilizing effect.

Figure 1D:
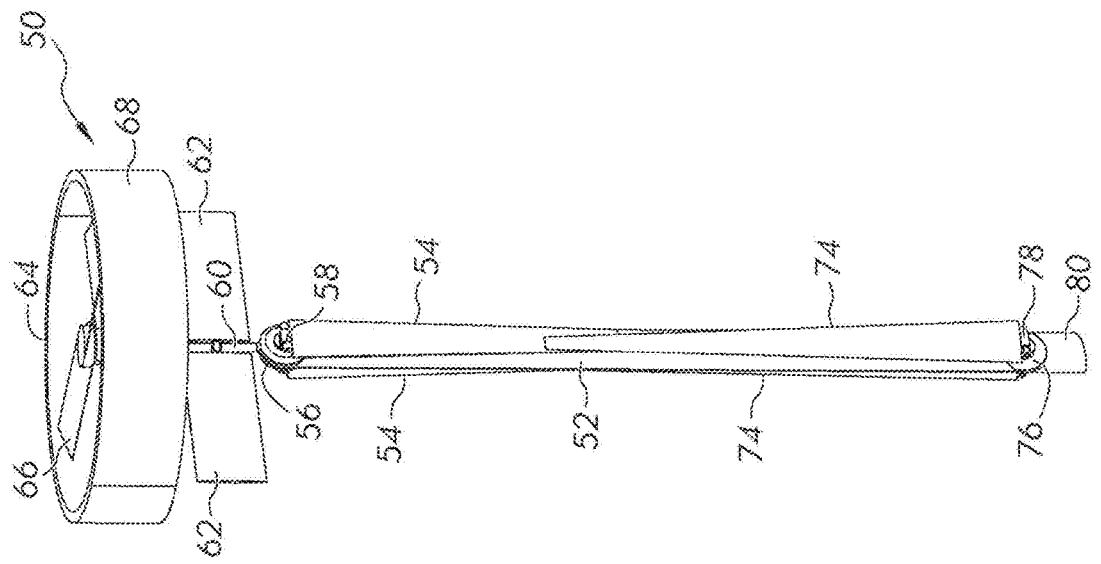
Figure 1C:
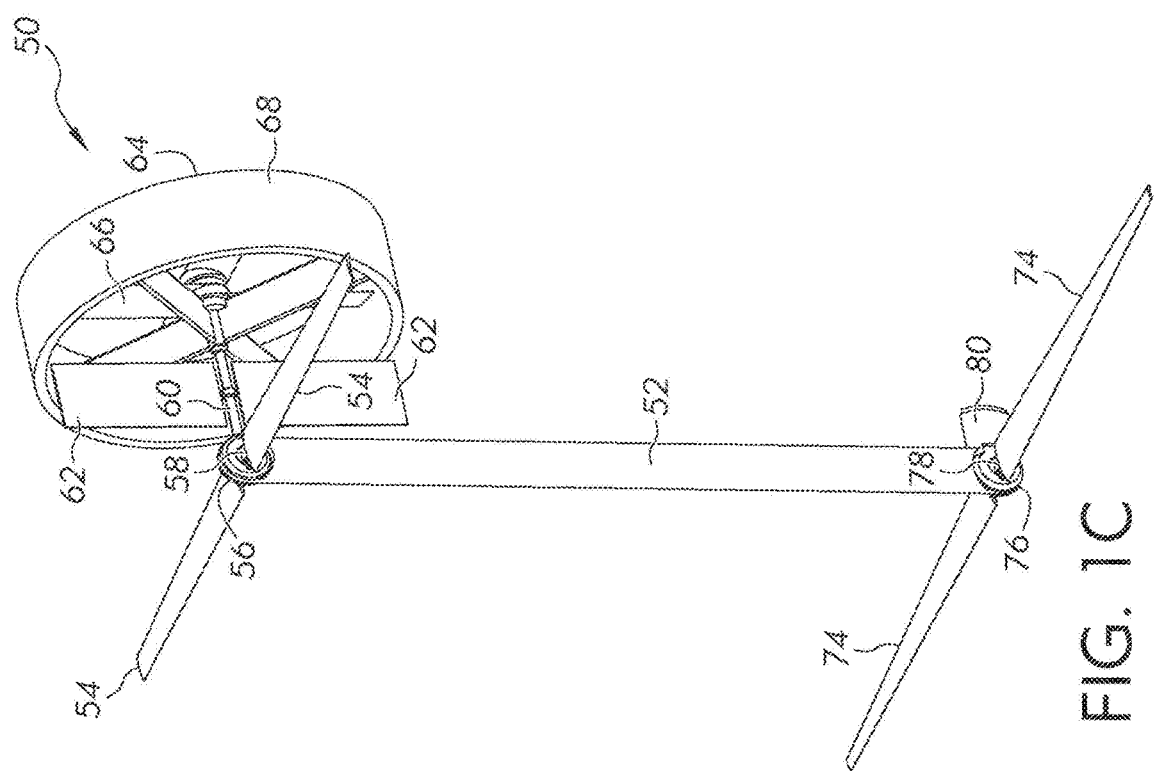

Rotating joint 56 also allows rotor stanchion 60, and thus rotor assembly 64, to rotate relative to skyboom 52 as shown in FIG. 1c. As with wings 54, rotor stanchion 60 is attached to a circular rail or geared component within rotating joint 56 to allow rotation and powered by an electric drive motor and gears. Rotation of rotor assembly 64 facilitates transition between horizontal and vertical flight by tilting thrust toward the desired direction of travel. Rotation of rotor assembly 64 relative to skyboom 52 can be passive. With the rotor assembly dragging the skyboom behind, the wings provide lift to naturally bring eVTOL 50 into a horizontal posture. A locking mechanism can be used to temporarily disallow rotation of rotor assembly 64.

Rotation joint 76 allows connector 80 to rotate relative to skyboom 52. Connector 80 is attached to a circular rail or geared component within rotation joint 76 and powered by a driver motor and gears. Rotation can be passive, with a load causing connector 80 to remain hanging down vertically from rotation joint 76 as eVTOL 50 transitions between vertical and horizontal flight. When connector 80 is loaded and hangs down, the connector 80 stabilizes the flight of eVTOL 50 and functions as a tail rudder. When eVTOL 50 is unloaded, connector 80 can be extended upward or downward during horizontal flight as a vertical stabilizer. A locking mechanism can be used to temporarily disallow rotation of connector 80. The double-jointed design of eVTOL 50 with rotating joints at both ends allows counter-force to be applied to the propulsion system, reducing moments of instability during transition between horizontal and vertical flight.

The vertical design of eVTOL 50 with skyboom 52 provides a base structure to accommodate long folding wings 54 and 74 deployed from joints 56 and 76. Hinge 58 on joint 56 allows wings 54 to fold down onto skyboom 52, and hinge 78 on joint 76 allows wings 74 to fold up onto skyboom 52, as shown in FIG. 1d. In some embodiments, one or more sets of wings attached to skyboom 52 can be fixed rather than rotatable and foldable. Additional active wings, rudders, and other control surfaces can be mounted to skyboom 52 as desired for additional lift and control.

In some embodiments, upper wings 54, lower wings 74, or both can have a variable geometry. In one embodiment, hinges 78 allow lower wings 74 to sweep forward, in a similar rotation direction as classic variable sweep aircraft wings. Wings 74 would end up being oriented parallel to skyboom 52 as in FIG. 1d, but rotated approximately 90 degrees about an axis through the length of the wings so that the width of the wing extends out from the skyboom. Wings 74 would then operate similar to a long delta wing or chine. The tips of wings 74 can attach to the skyboom 52, so that rotating joint 76 warps wings 74 as a control surface. Upper wings 54 could be swept backwards similarly instead of or in addition to lower wings 74.

Figure 1E:
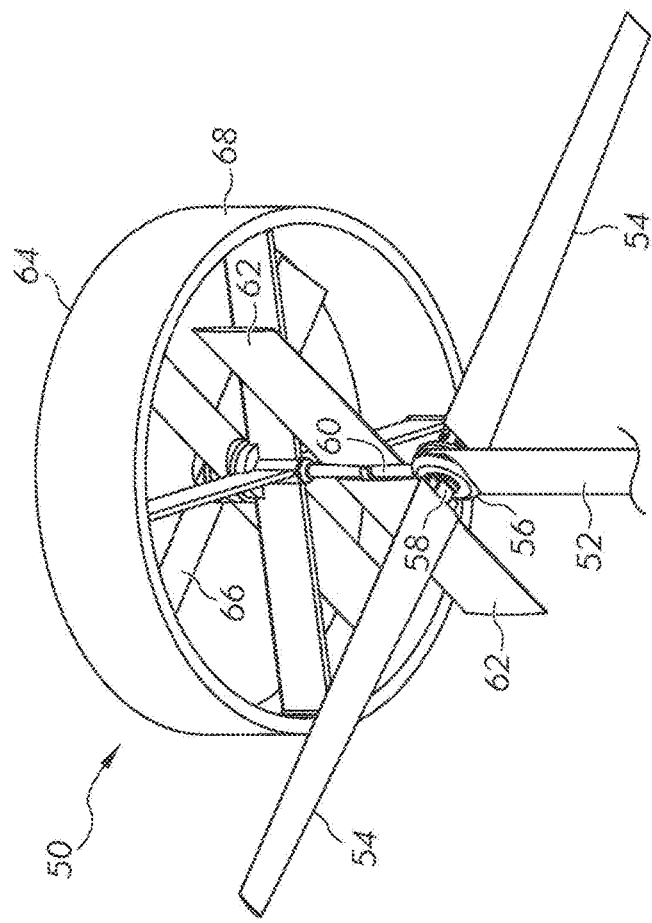

FIG. 1e illustrates a perspective view from below rotor assembly 64. Rotor blades 66a and 66b are mounted to and rotate around stanchion 60. Rotor blades 66a and 66b are configured to counter-rotate to keep the overall rotational velocity approximately zero. Individual rotor blades 66 can be driven with one or more electric motors stacked on a common shaft. Stacking electric motors provides redundancy and reduces magnetic saturation within the motors during high current draw situations. Stacking motors also allows switching between motors to reduce thermal loading and improve efficiency during horizontal winged flight. Shroud or duct 68 is mounted to stanchion 60 and extend around blades 66. Center attachment of the propulsion system reduces weight and improves the stability and rigidity of duct 68.

Figure 1F:
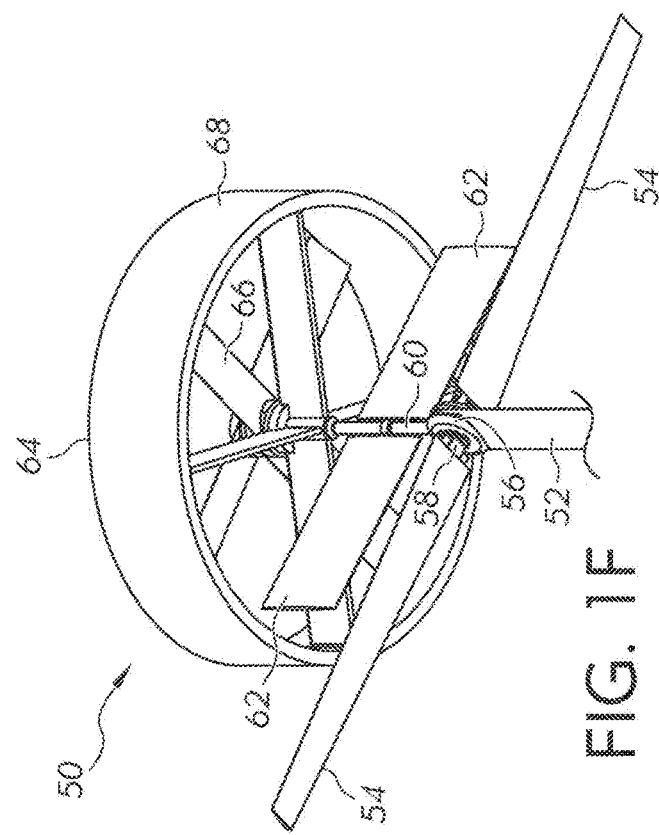
Figure 1G:
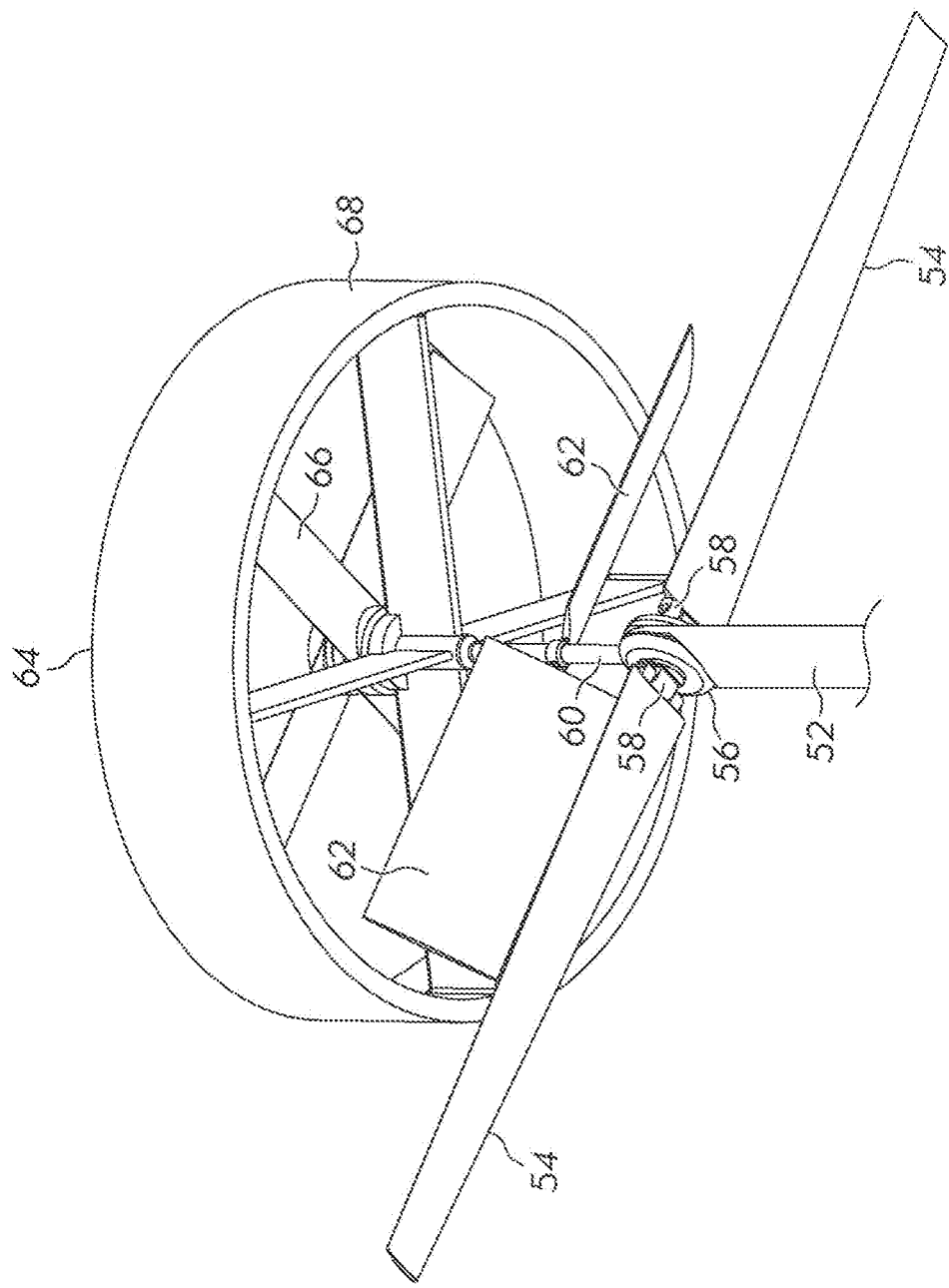
Figure 1H:
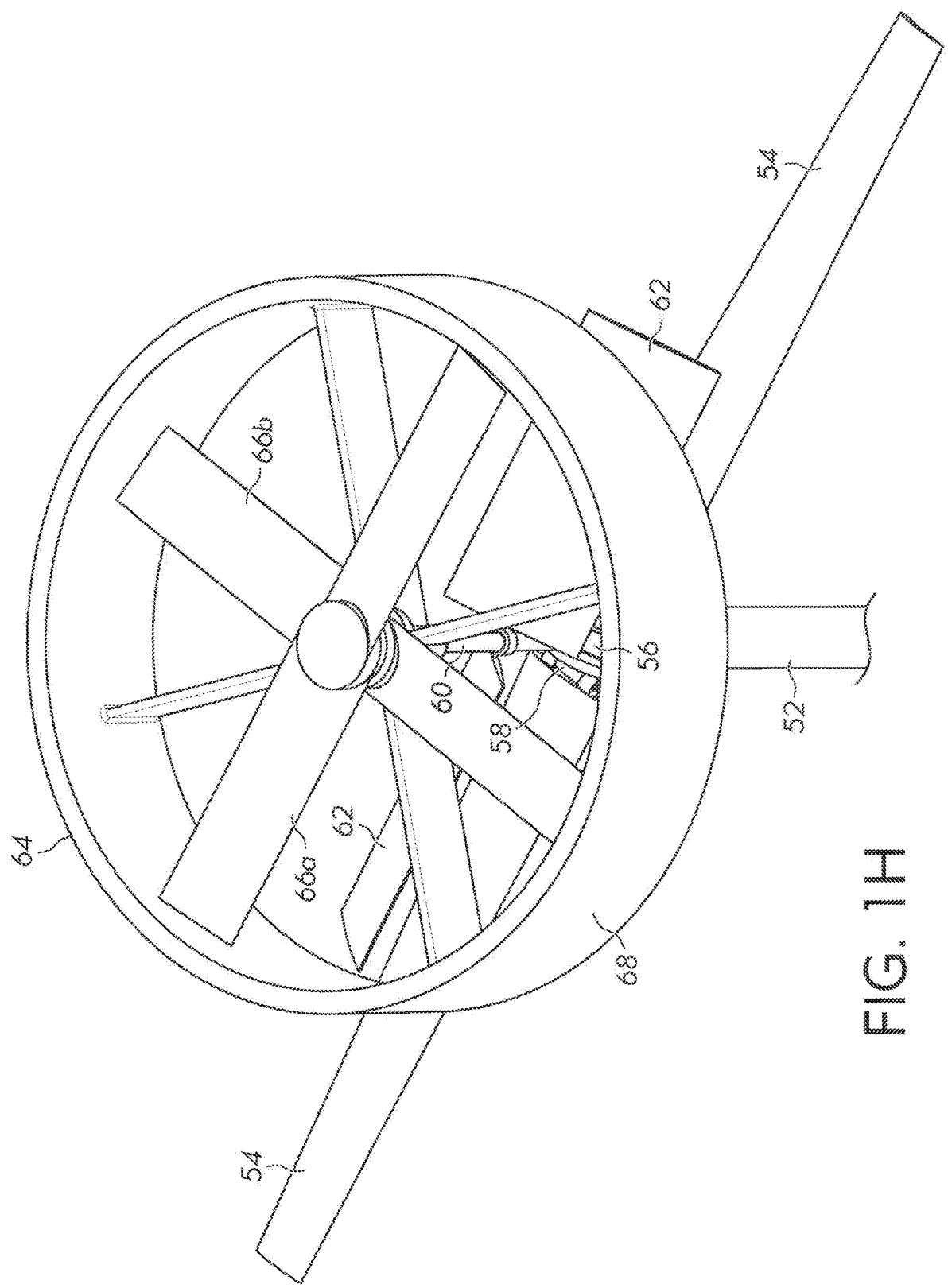

Paddles 62 are configured to control movement of eVTOL 50 by displacing moving air from blades 66. The paddles can be rotated about stanchion 60 to modify the direction that moving air is displaced relative to skyboom 52. FIG. 1e shows paddles 62 oriented perpendicularly to the lengths of wings 54, while FIG. 1f shows the paddles rotated to be parallel with the wings. Paddles 62 can also be rotated about an axis through the lengths of the paddles as illustrated in FIG. 1g. Paddles 62 can be rotated independently of each other. FIG. 1g shows paddles 62 rotated in different directions to spin eVTOL 50 in vertical flight. FIG. 1h is a perspective view from the top of rotor assembly 64.

EVTOL 50 has high aspect ratio wings, an aerodynamic design, and large energy storage capacity within skyboom 52, which provide excellent efficiency and allows the eVTOL to operate for long periods of time before needing recharging or refueling. The efficient aerodynamic design of the eVTOL 50 structure in combination with the unobstructed air flow around the propulsion system provide greater cruise and top speed capability independent of the chosen propulsion system. The noise reduction attributes of the ducted rotor propulsion design coupled with the propulsion system's location 40 feet or more above the payload combine to reduce noise levels. The location of the propulsion system and length of skyboom 52 allows for a long, efficient wingspan and larger diameter rotor blades 66, whether ducted or not. The simple design of eVTOL 50 helps streamline the manufacture of carbon fiber components. However, eVTOL 50 is so efficient that the aircraft could also be made out of aluminum and still fly long enough on a single battery charge to be commercially viable.

Figure 2A:
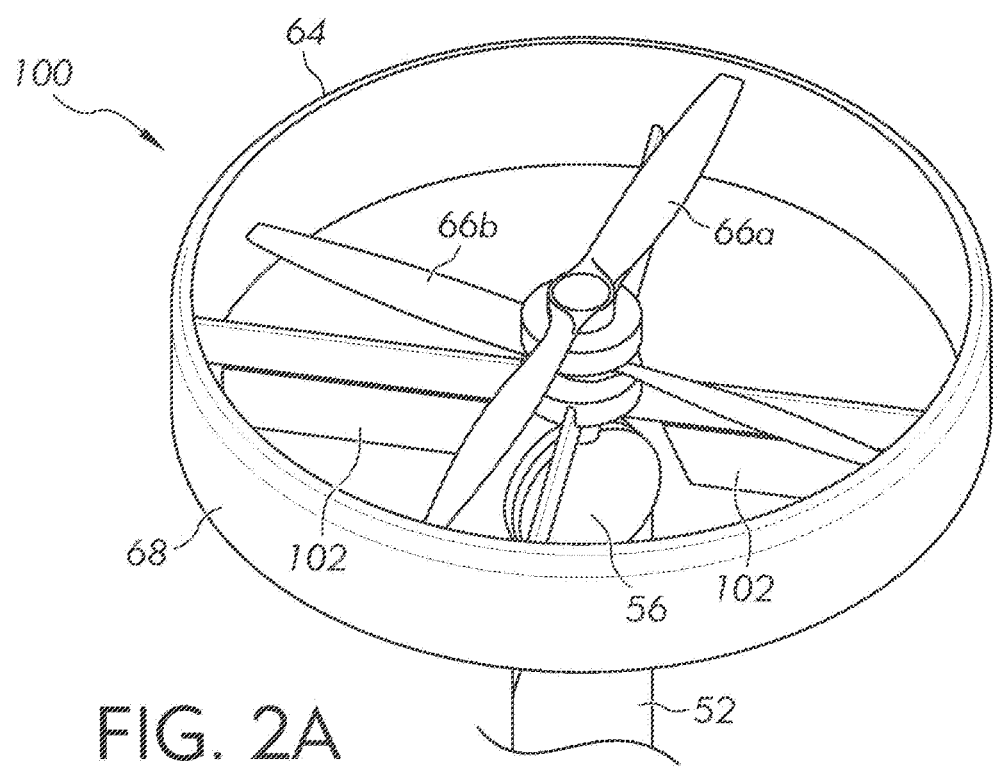
FIGS. 2a-2f illustrate alternative embodiments for the propulsion system used in the eVTOL.
Figure 2B:
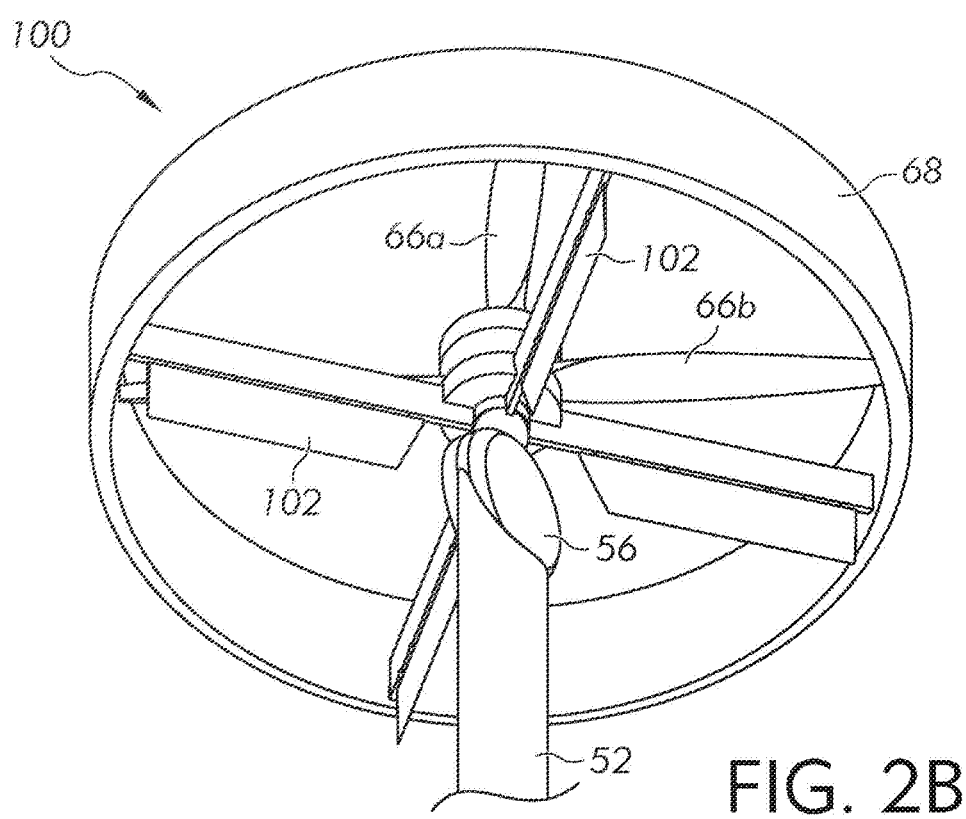

FIGS. 2a-2e illustrate alternative embodiments for the eVTOL 50 propulsion system. In FIGS. 2a and 2b, a rotor assembly 100 has paddles 62 replaced with four independent control surfaces 102 attached to the support struts of duct 68.

Control surfaces 102 can be all folded clockwise or counterclockwise around stanchion 60 to spin eVTOL 50 during vertical flight. Spinning eVTOL 50 gets rotating joint 56 oriented in the desired direction so that when the rotor assembly 100 is folded by the rotating joint the rotor assembly aims thrust in the desired direction for horizontal travel. Rotor assembly 100 with control surfaces 102 is illustrated without the use of upper wings 54, but upper wings 54 are used with control surfaces 102 in other embodiments. Control surfaces 102 and paddles 62 can be combined in a single embodiment to facilitate additional control.

Figure 2C:
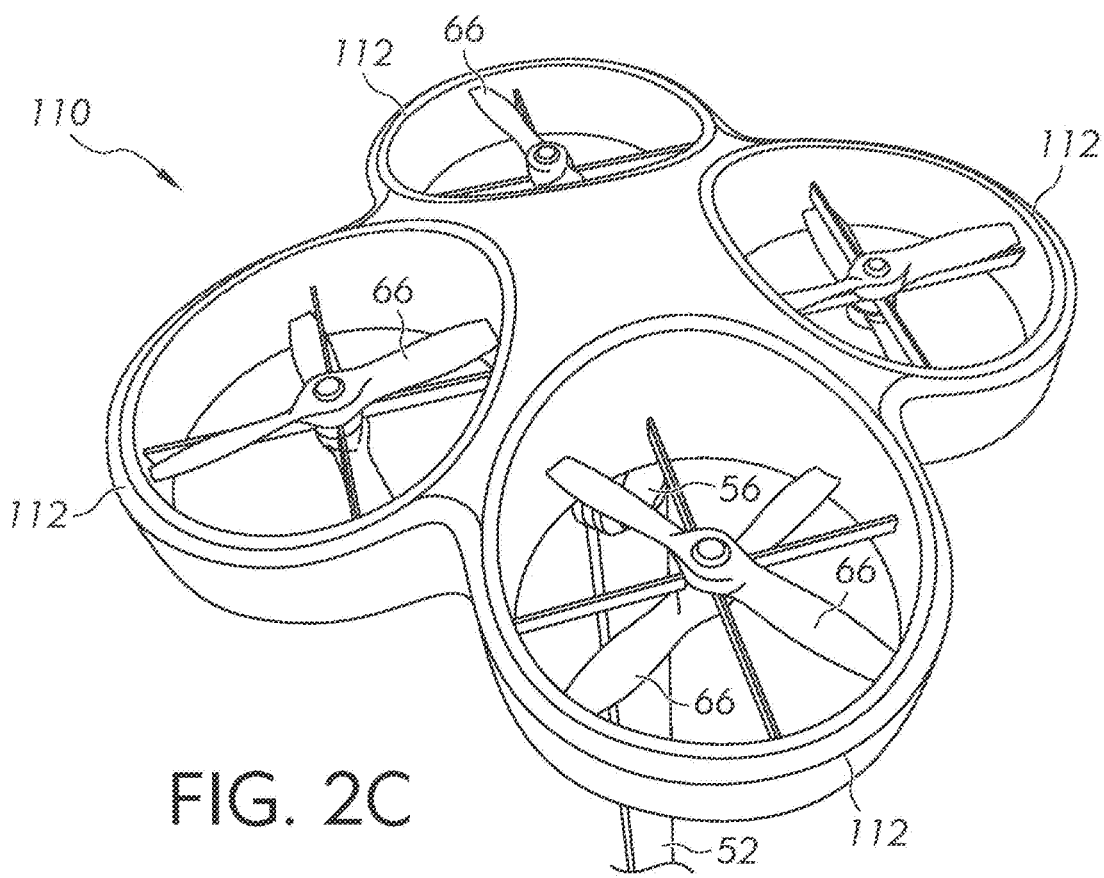
Figure 2D:
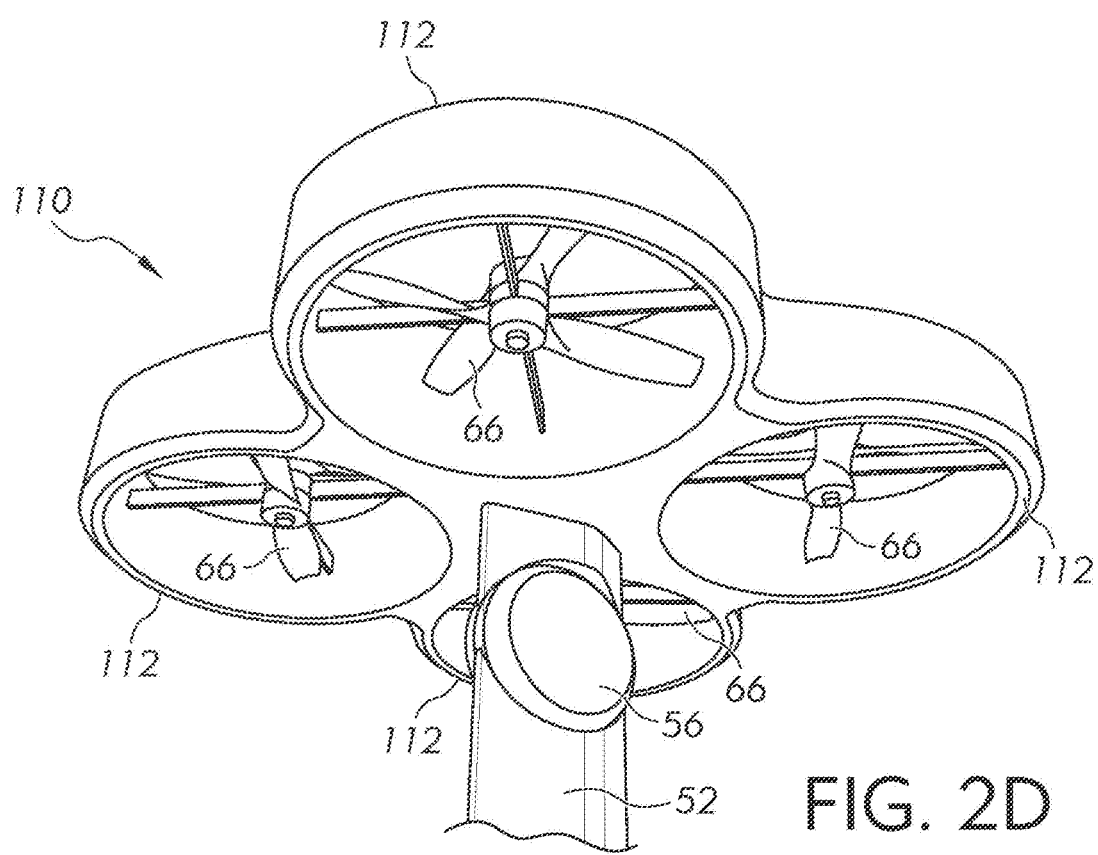

FIGS. 2c and 2d illustrate a rotor assembly 110 with four electrically powered fan nacelles 112. Each nacelle 112 is fitted with a pair of counter-rotating blades 66 as with rotor assembly 64. In other embodiments, each nacelle 112 includes a single blade 66, with two total blades spinning clockwise and two total blades spinning counterclockwise. Alternatively, each nacelle 112 can include two blades spinning the same direction, with a total of four blades spinning clockwise and four blades spinning counterclockwise. Alternatively, each nacelle can include one or more electric turbines. The blades 66 of each nacelle 112 can be rotated at different rates to vary thrust and control the attitude of rotor assembly 110.

In one hybrid embodiment, a turbine or other heat engine is housed in the center of a quadcopter and used as a generator to power electric rotors in a rotor assembly. A center mass of the rotor assembly can house one or more small turbine engines or other heat engines powering multiple generators, alternators, or motors to supply electrical current to multiple electric propulsion motors with attached propellers to generate lift or thrust. A small startup battery can also be included within the center mass of the rotor assembly. Multiple propulsion motors or engines provide redundancy in case of partial failure. The propulsion motors can attach to the center mass via airfoil shaped arms. The airfoil shaped arms can be used to generate lift during horizontal flight. In some embodiments, telescoping arms are used to mount the multiple motors to the center mass. Seals or collapsible internal bladders can be used to increase or decrease the length of the arms to effect lift, utilizing waste air from the turbine. Bladders within bladders can be used to house fuel for the turbine engine.

Figure 2E:
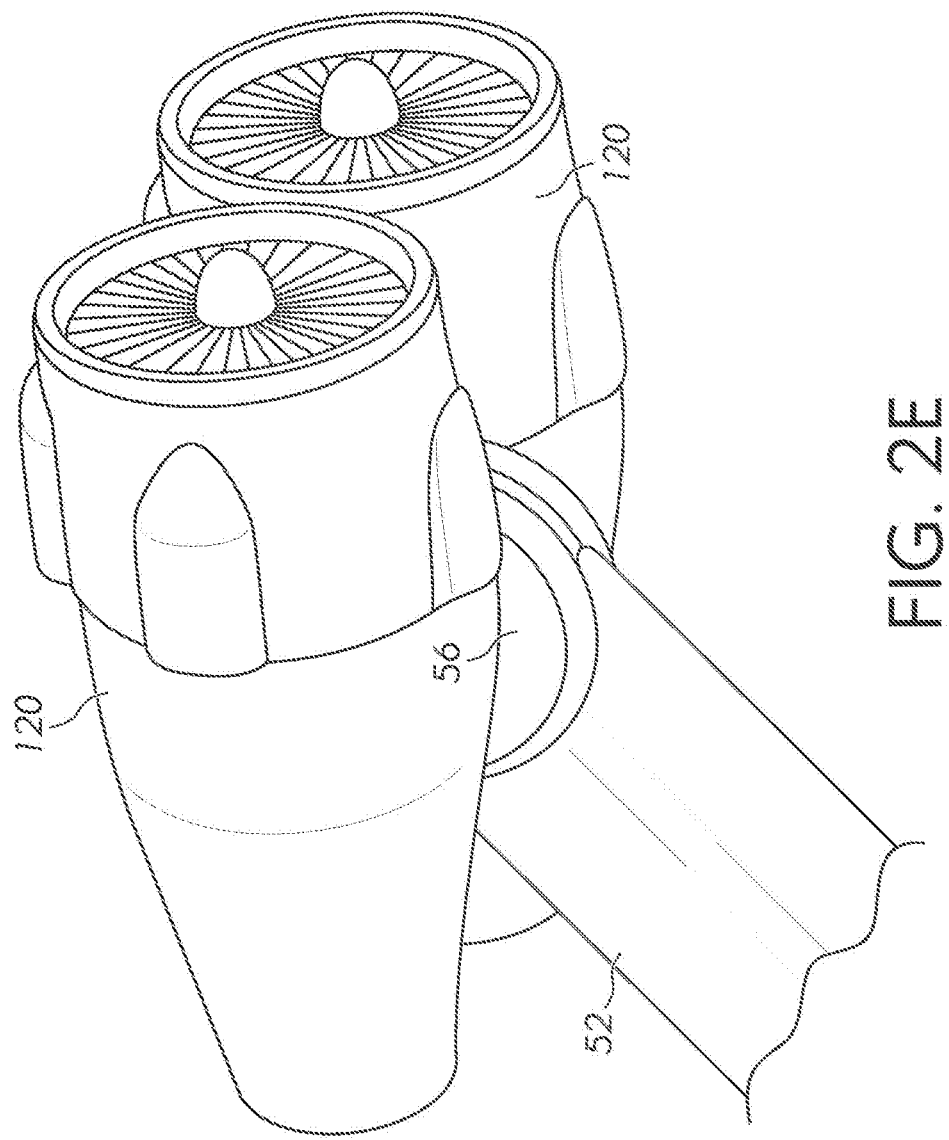

FIG. 2e illustrates an embodiment with jet engines 120 mounted to upper rotating joint 56. Jet engines 120, or alternatively turboprops, can be used as propulsion for longer trips. Skyboom 52 stores liquid fuel for jet engines 120. Batteries for operation of electronics are included as well. Additional lifting surfaces, e.g., wings, can be mounted to jet engines 120. The skyboom propulsion system can be selected based on the particular mission. Electric or hybrid would typically be used for urban commuting, with gas turbine for longer interstate or international flights.

Figure 2F:
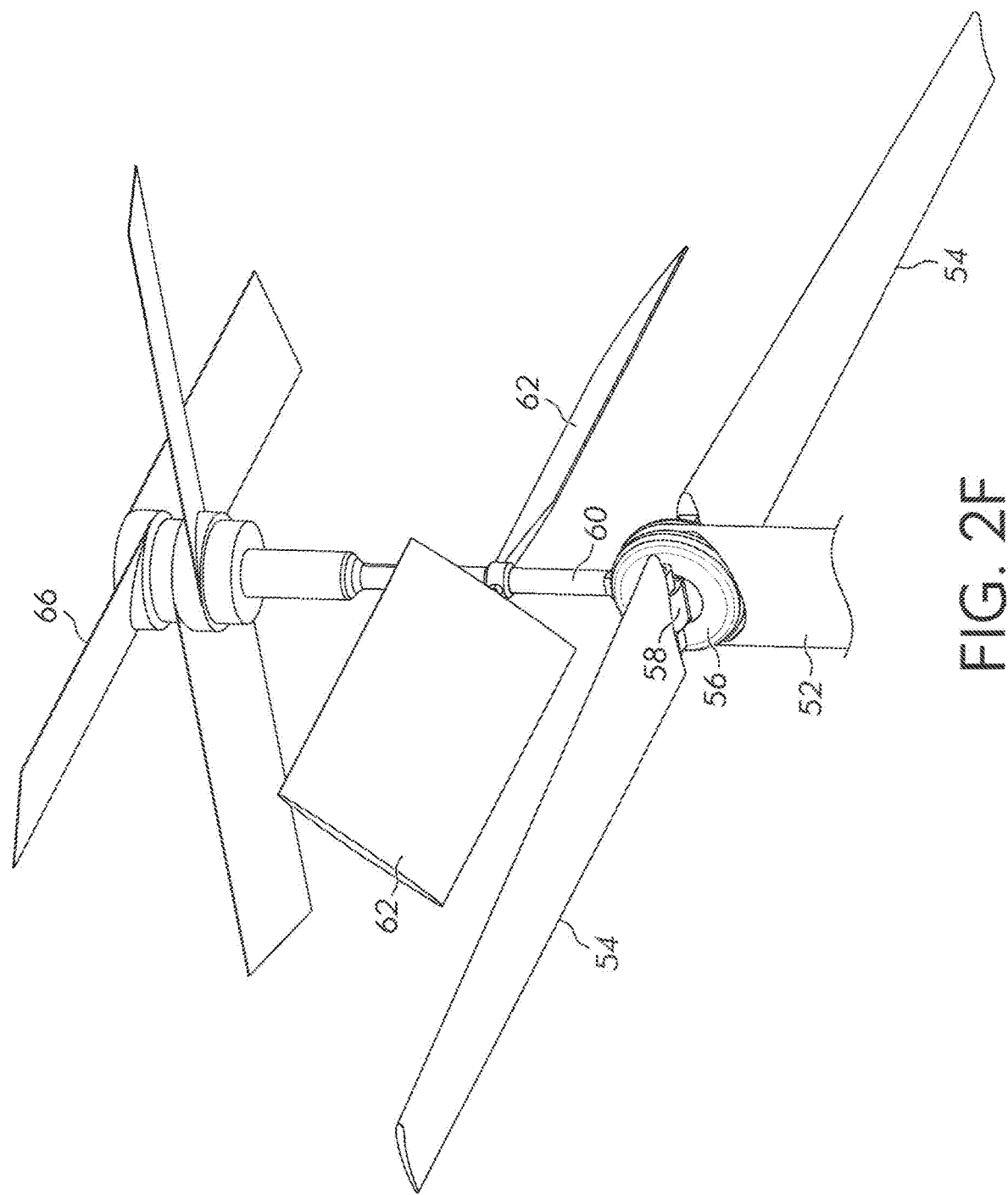

FIG. 2f illustrates an embodiment where fan blades 66 are used without a duct 68.

FIGS. 3a-3f illustrate e VTOL 50 taking off from a standstill and transitioning from vertical flight to horizontal flight. Normally, when not in flight, eVTOL 50 is stored vertically with wings 54 and 74 folded substantially parallel with skyboom 52, as illustrated above in FIG. 1d. The thin footprint of eVTOL 50 allows storage of the eVTOL in a tall and thin tubular structure. FIGS. 10a-10d below illustrate a variety of parking or storage options.

To take off, blades 66 begin spinning to generate thrust. Once eVTOL 50 rises out of a storage tube, if used, and above any other obstacles, wings 54 can be extended with a large negative dihedral to help control the flight of the eVTOL. FIG. 3a shows eVTOL 50 loitering in the vertical flight mode. Rotor assembly 64 generates thrust to keep eVTOL 50 afloat. Paddles 62 and wings 54 are used as control surfaces to direct the thrust generated by rotor assembly 64. Wings 54 can be rotated or scissored to control air flow and boom movement.

Vertical flight can also be controlled by angling rotor assembly 64 at rotating joint 56. Paddles 62 can be angled in opposite directions to spin eVTOL 50 so that the rotation of rotor assembly 64 is toward the desired direction of flight. In some embodiments, paddles 62 are used to control eVTOL 50 in vertical flight, and upper wings 54 are fully deployed depending on weather and surrounding obstructions.

If more significant horizontal movement is desired, eVTOL 50 transitions to horizontal flight as demonstrated in FIGS. 3b-3f. To achieve horizontal flight, the thrust of rotor assembly 64 is quickly aligned to the desired flight path. Skyboom 52 naturally rotates back as horizontal motion begins, and is aided by wings 54 and 74 creating lift. Instability during prior art VTOL transition is in part due to the absence of dynamic pressure on control surfaces needed to counter centripetal and directional thrust force. The unique articulated skyboom 52 of eVTOL 50 with dual-wing design provides the isolation and leverage required to rapidly transition from vertical to horizontal flight while reducing the instability moments common in other VTOL aircraft. Additional articulated joints can be added to skyboom 52 between joints 56 and 76.

Coming out of the storage silo, both upper wings 54 and lower wings 74 are folded onto skyboom 52 with the leading edge of upper wings 54 facing forward and the leading edge of lower wings 74 facing backward. Upper wings 54 are mounted higher relative to lower wings 74 and can fold out first, once clear of surrounding obstacles. Lower wings 74 start to unfold as the aircraft gains forward airspeed.

Figure 3E:
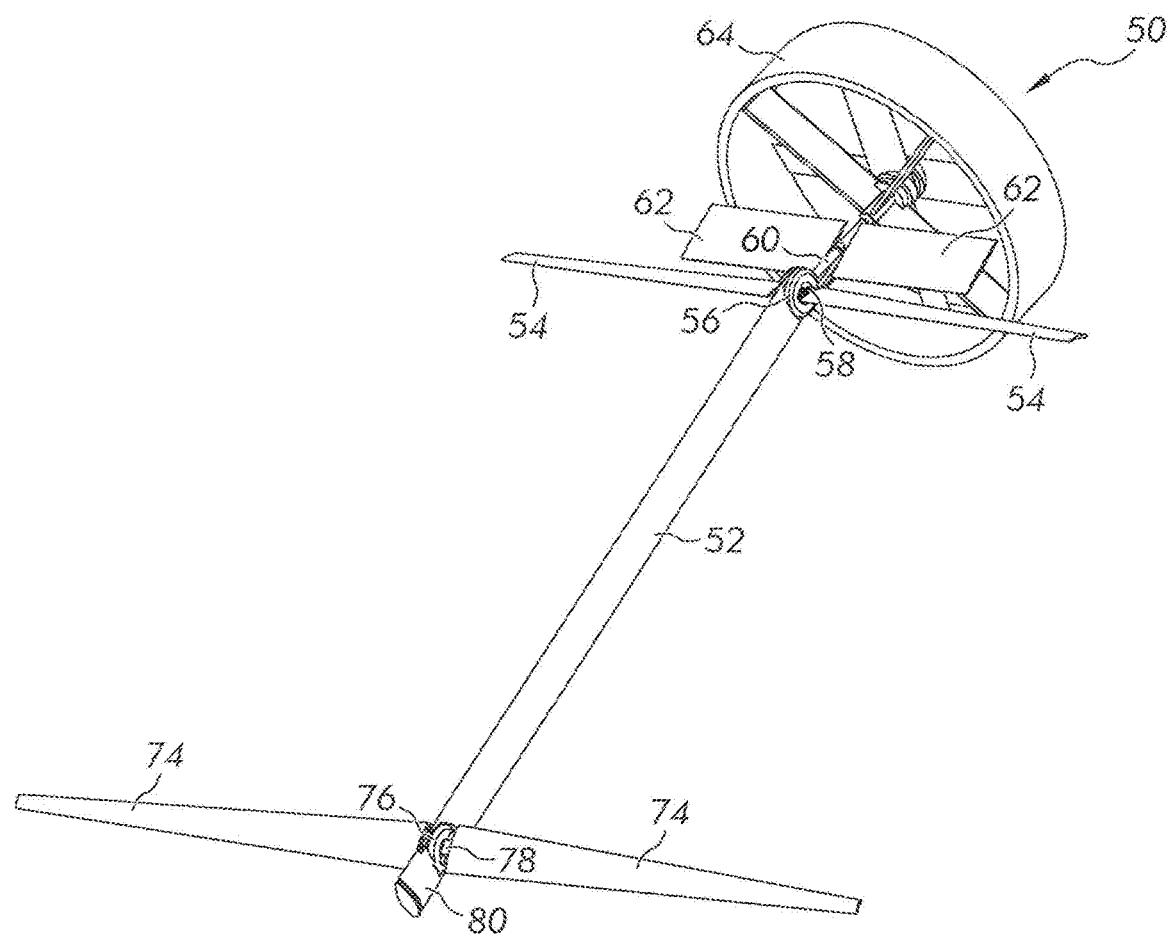

In FIG. 3b, rotor assembly 64 is leaned toward the desired direction of travel using rotating joint 56. Wings 54 and 74 are deployed as horizontal velocity increases. FIG. 3b has upper wings 54 partially extended. In FIG. 3c, horizontal speed has increased and wings 74 are partially extended as well. Both wings 54 and 74 initially have a large negative dihedral relative to skyboom 52. In FIG. 3d, upper wings 54 are fully extended perpendicular to skyboom 52, and paddles 62 are rotated to horizontal. In FIG. 3e, lower wings 74 are raised to perpendicular.

Figure 3F:
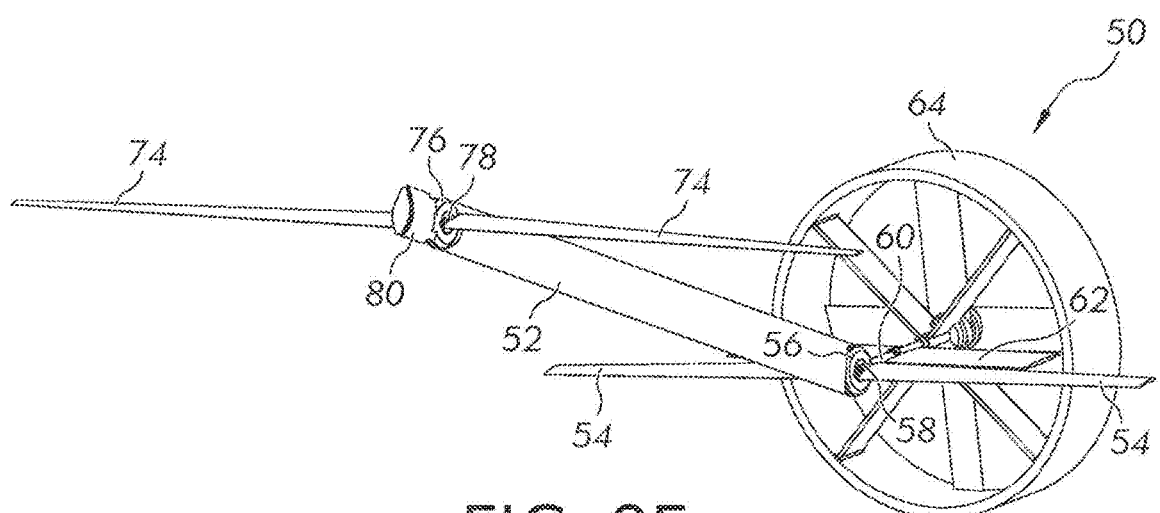

In the transition sequence from vertical flight to horizontal flight, wings 54 and 74 are unfolded in such a manner as to reduce or minimize the operating load on the gear mechanisms within rotating joints 56 and 76 and hinges 58 and 78. Reducing operating load limits the electrical current draw of operating the joints and hinges via battery powered motors, increasing battery life both in terms of daily work cycle and overall life of the batteries. Reduced gear loading also increases long term cycle life of the gearsets, increasing the time between Federal Aviation Administration (FAA) teardown inspections.

eVTOL 50 in FIG. 3e has fully transitioned to horizontal flight. The transition sequence is completed as lower wings 74 generate lift in forward flight. eVTOL 50 can continue horizontally as shown in FIG. 3e, using rotor assembly 64 for horizontal thrust and wings 54 and 74 for lift. Rotor assembly 64 and paddles 62 may provide some lift as well. Wings 54, wings 74, and paddles 62 are control surfaces used to guide eVTOL 50. In FIG. 3e, rotor assembly 64 is positioned above lower wing 74. However, eVTOL 50 can be flown horizontally with wing 74 above, below, or at the same height as rotor assembly 64. FIG. 3f shows eVTOL 50 with wing 74 above rotor assembly 64. The height of wings 74 relative to rotor assembly 64 can be adjusted to optimize efficient center of gravity balance and air flow in relation to thrust. Sensors on eVTOL 50 can be used to adjust the relative height of wings 74 on the fly. Having the propulsion system below wings 74, as shown in FIG. 3f, increases efficiency and loitering capability. The dihedral of wings 54, wings 74, or both, can be adjusted to improve stability and efficiency. Payload connector 80 can be rotated above or below rotating joint 76 to increase vertical stability.

Figure 4B:
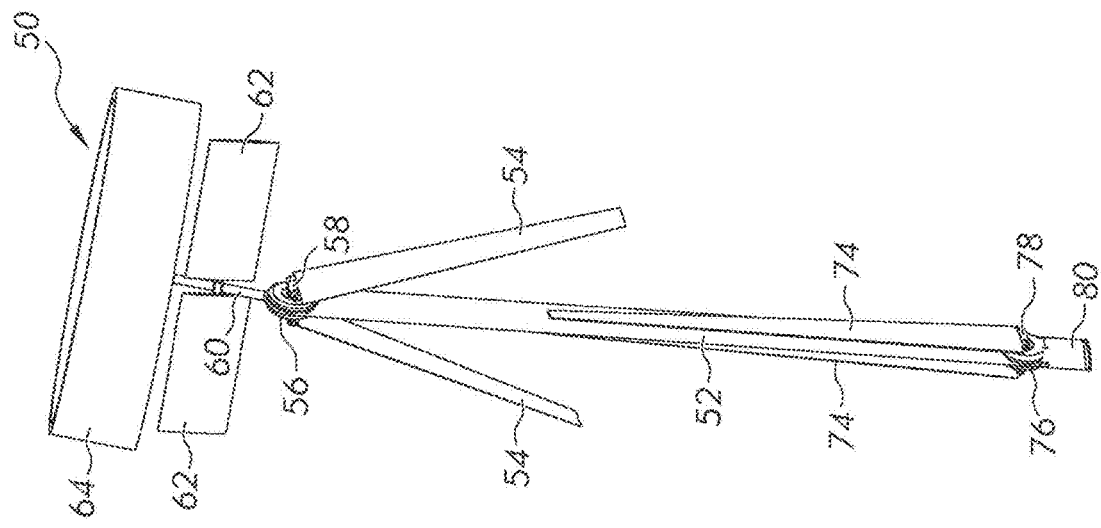
FIGS. 4a-4c illustrate the eVTOL going from horizontal cruising to vertical landing.
Figure 4A:
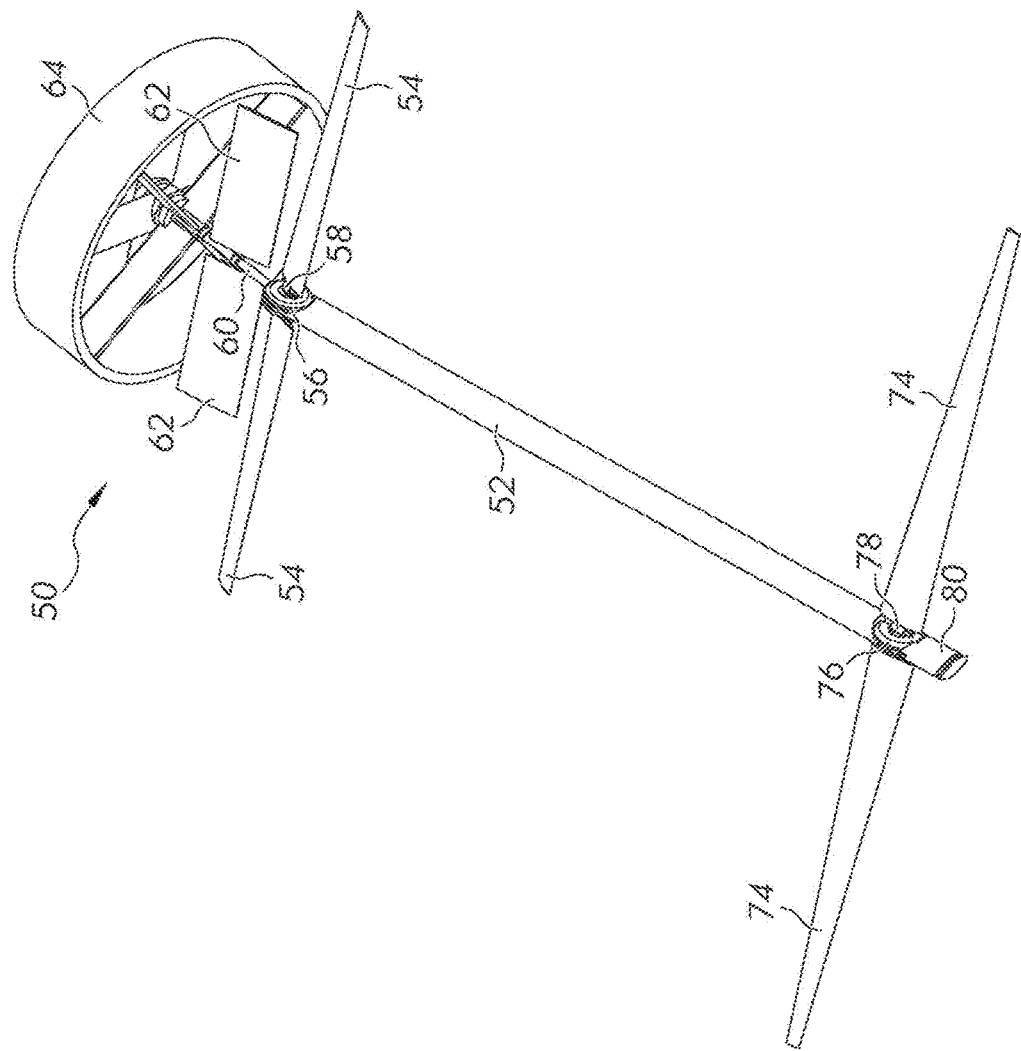
Figure 4C:
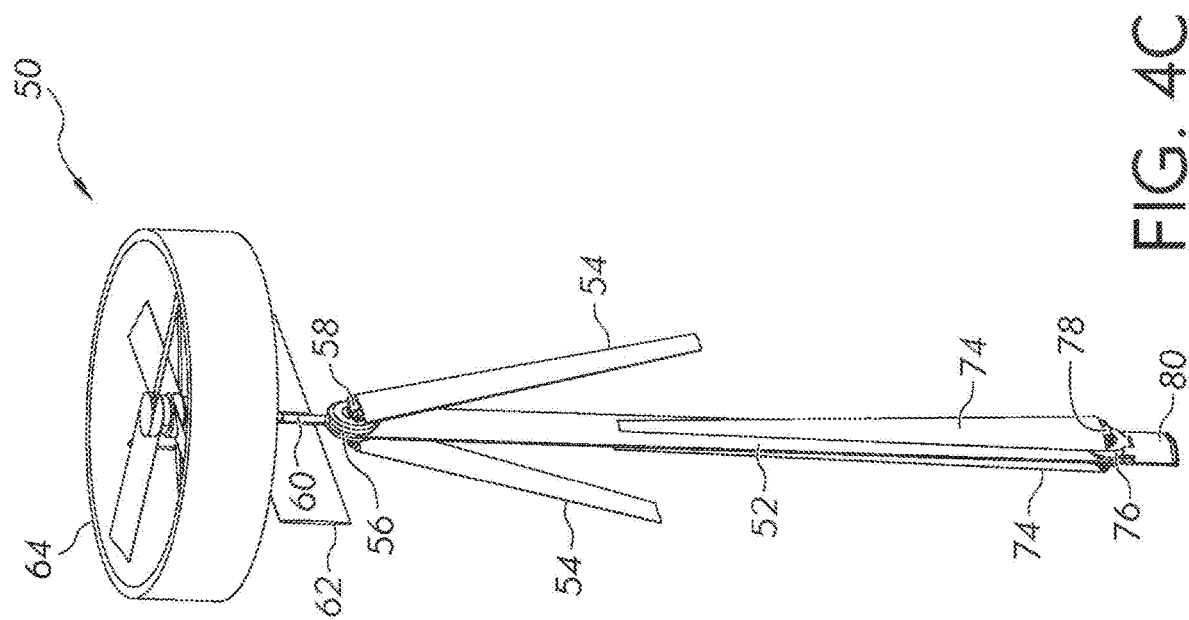

FIGS. 4a-4c illustrate eVTOL 50 returning from horizontal to vertical flight. In FIG. 4b, the thrust of rotor assembly 64 is rotated upward. As the forward motion of eVTOL 50 slows, lower wings 74 lose lift and fall. As the direction of thrust is quickly moved to vertical, skyboom 52 naturally swings forward. As skyboom 52 swings forward, wings 74 are folded up for vertical flight as shown in FIG. 4b. In FIG. 4c, eVTOL 50 has returned to vertical flight.

eVTOL 50 is a fully autonomous flying vehicle capable of horizontal flight with vertical takeoff and landing. However, eVTOL 50 is only one element of the overall VTOL transportation system. The VTOL transportation system also includes a ground vehicle 130, illustrated in FIG. 5a. Ground vehicle 130 is usable by an individual as their personal vehicle, just like any car. In addition, ground vehicle 130 includes a dock 132 configured to interface with payload connector 80 of eVTOL 50. A driver can drive ground vehicle 130 from place to place locally, and then, when needed, request an eVTOL 50 to pick up the ground vehicle and fly both vehicle and passenger to a more distant destination.

In the VTOL transportation system, consumers have personal ownership of their own ground vehicles 130. Any vehicle manufacturer can manufacture vehicles with a dock 132 and sell a vehicle compatible with being picked up and flown by eVTOL 50. A consumer can decide to purchase a fancy luxury vehicle, a fast sports car, or a cheaper base model sedan, and each can be flown by eVTOL 50. A dock 132 should optimally, but not necessarily, be placed at the center of gravity of a vehicle. The attachment point within dock 132 may have gearing allowing longitudinal movement to allow optimal center of gravity location or adjustment to align with payload connector 80 of eVTOL 50.

Figure 5B:
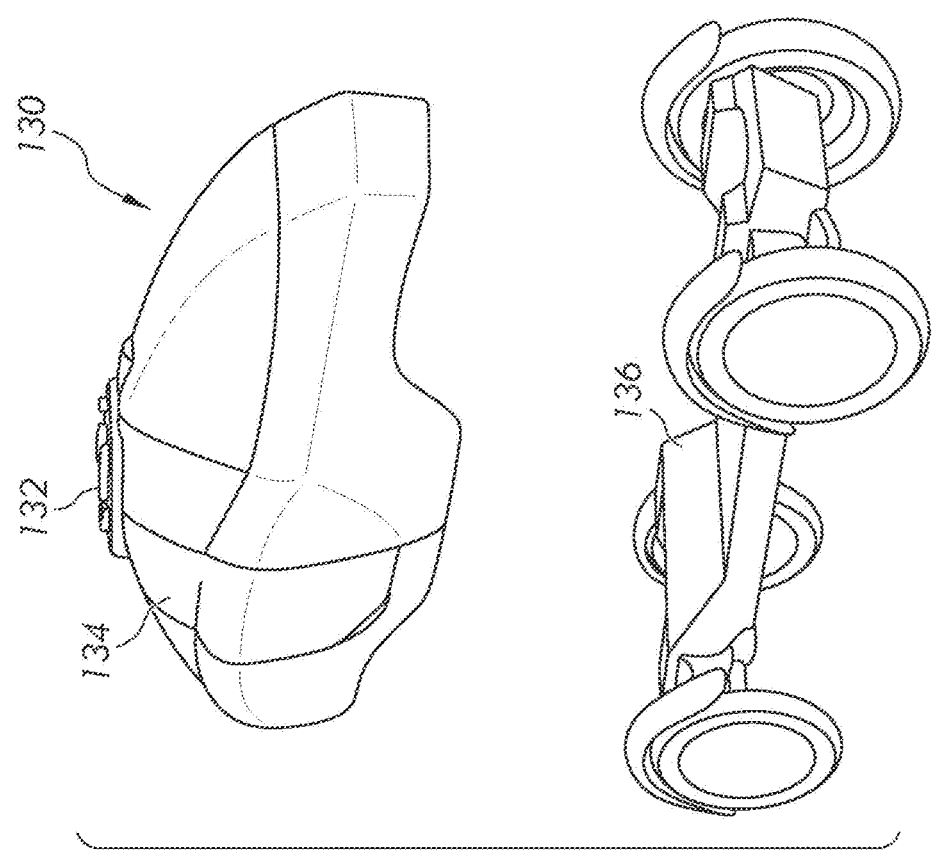
FIGS. 5a-5f show a ground vehicle capable of being transported by the eVTOL.
Figure 5A:
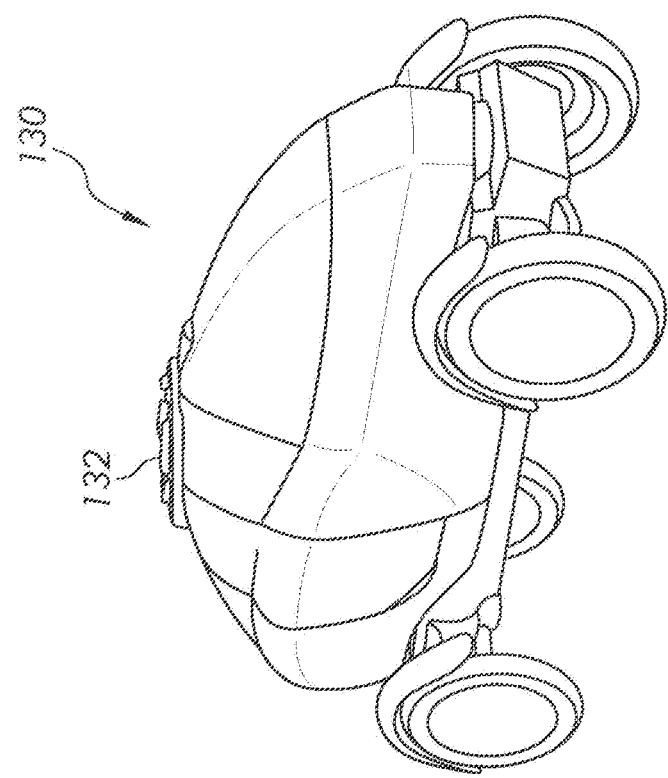
Figure 5C:
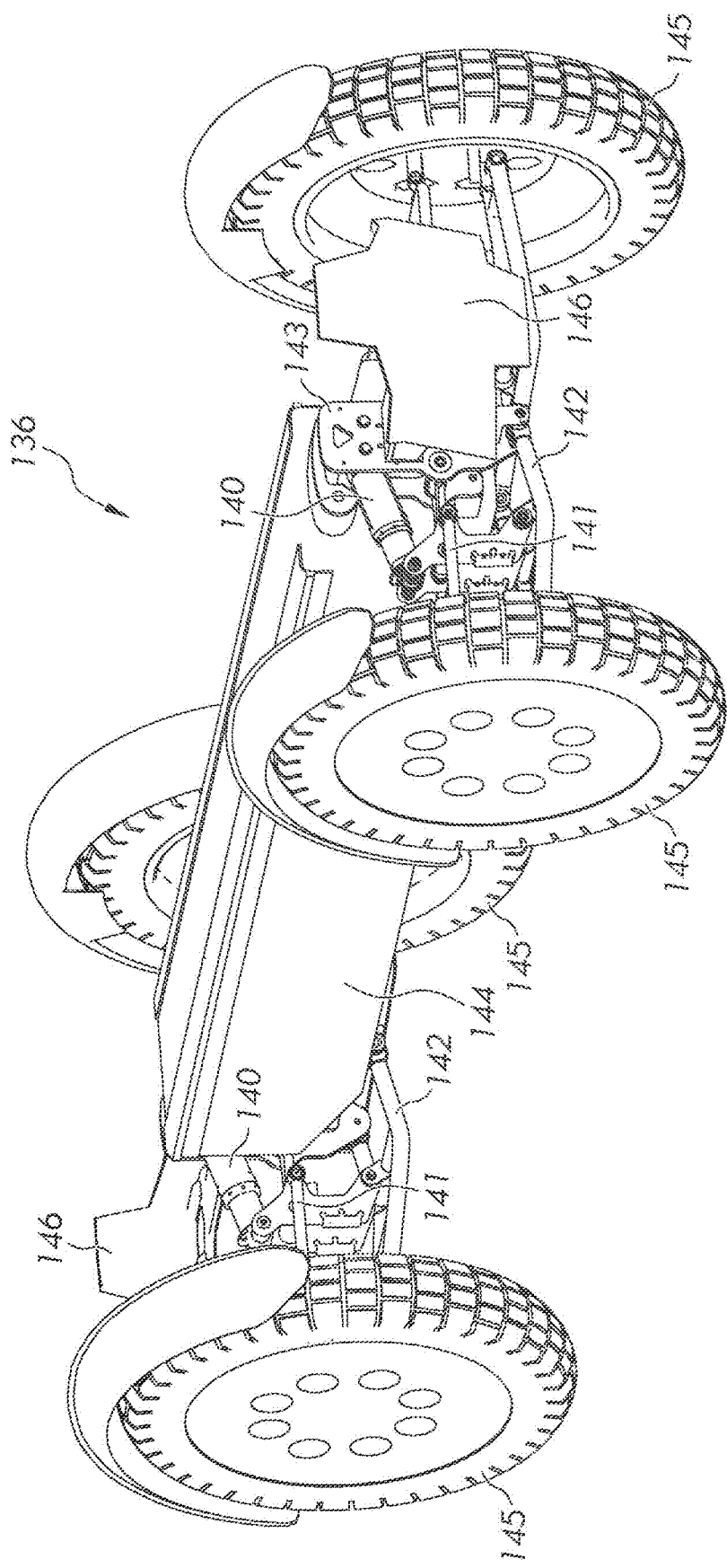

An active leaning suspension, as illustrated in FIG. 5c, provides significant help for coupling eVTOL 50 to vehicle 130 because the ground vehicle can adjust its height relative to the ground by 24 inches or more to compensate for undulations in the road, and has roll, pitch, and yaw maneuverability allowing it to autonomously mirror the movements of eVTOL 50. A dock 132 can be added to the conventional vehicles of today as a type of air towing or relocation service. However, as a true system solution to reducing traffic congestion a new type of vehicle is necessary. Ground vehicle 130 is a relatively thin leaning vehicle, having an overall width of 48 inches and an overall length of 156 inches for the two-passenger model. The narrow width of vehicle 130 means that each lane of traffic currently in use can be turned into two lanes of traffic if vehicle 130 is universally adopted. Doubling the number of lanes of traffic in cities across the globe provides an obvious benefit to congestion. With autonomous driving, vehicles 130 can operate two per lane in standard lanes of traffic in use today while still allowing traditional vehicles to exist concurrently.

Vehicle 130 can be manufactured with a vehicle body 134 that is separable from a chassis 136 of the vehicle as shown in FIG. 5b. Physically separating body 134 from chassis 136 allows the body to be transported as a payload of eVTOL 50 without the chassis. Reducing payload weight allows reduction in the battery size requirement of eVTOL 50 or allows the eVTOL to transport the payload further. In one embodiment, body 134 weighs 496 pounds and chassis 136 weighs 705 pounds. Disconnecting chassis 136 for flight reduces payload weight by more than half. Chassis 136 is more likely to remain attached for short urban flights because the flight is more economical with the added weight. The additional energy required to lift the chassis is offset through the reduction of infrastructure cost, transit time, and coupling time.

Chassis 136 can be made universal and either privately owned or corporate owned. Corporate owned chassis 136 can be made available for short-term lease similar to a ride-share system of today. Leasing a chassis 136 at a flight destination allows the user to fly in their personally owned body 134 without their personally owned chassis to reduce the flight cost.

Either privately owned or corporately owned chassis 136 can be made available for other uses when not in use by the owners. The universal chassis 136 may be used to transport a variety of top structures or bodies utilizing the receiver hitch locating slots at either end of the universal chassis. Several examples are shown in U.S. Provisional Application No. 62/662,081, filed Apr. 24, 2018. Examples include attachments to provide a variety of services, such as snow plowing, street sweeping, garbage pickup, package delivery, etc. Decoupling of body 134 from chassis 136 when not in use also allows automobile bodies to be stored vertically in automated facilities or on roof-tops via robotic arms at the destination to reduce curb parking. Removing chassis 136 allows attachment of a storage container below body 134 in place of chassis 136 for flights where luggage or other cargo is needed. The storage container could also be used as a landing base to drop body 134 off without chassis 136. Aerodynamic design considerations to the under-vehicle storage container would make it suitable for long-haul high-speed flight. Stationary cranes can be used to attach eVTOL 50 on top of ground vehicle 130 or another load. Cranes can also be used to move loads for shipping, or to move vehicles when not in use or in the way of traffic, walkways, etc. Parked vehicles can easily be relocated via attachment to dock 132 when not in use.

Due to the high efficiency of eVTOL 50, vehicle 130 can be formed from aluminum rather than the carbon fiber normally required for flying vehicles. Production using aluminum reduces cost and increases potential production volume. Constructing vehicle 130 from aluminum instead of carbon fiber allow for the high volume manufacturing techniques needed to produce vehicles in the millions—accelerating the transition of the transportation system as a whole to eVTOL capable automobiles. In some embodiments, chassis 136 is formed of carbon fiber to reduce weight and make flying with the chassis more efficient.

The narrow body of vehicle 130 improves aerodynamics for both driving and flight when combined with eVTOL 50 and is possible thanks to the leaning suspension being used. Vehicle 130 is capable of leaning into turns to counteract centripetal forces that would otherwise cause a vehicle with such a narrow wheelbase to roll. Vehicle 130 uses much of the technology disclosed in U.S. patent application Ser. No. 16/138,849, filed Sep. 21, 2018 and published as U.S. Publication No. 2019/0084638 on Mar. 21, 2019 (the '849 application). FIG. 5c shows one detailed view of chassis 136 with the hydraulic suspension the '849 application. Chassis 136 also includes hub drive electric motors. The hub drive electric motors are completely integrated into the hub of all four wheels, allowing the wheels to each move independently. While other figures show chassis 136 with a greatly simplified illustration, each chassis above or below includes all the features of chassis 136 in FIG. 5c.

The leaning suspension operates hydraulically as discussed in the '849 application. Leaning is actuated by hydraulic shock actuators 140 moving upper control arms 141 horizontally relative to lower control arms 142. Each of the front and rear suspensions is formed around a center block 143 attached to a chassis block 144. Chassis block 144 houses batteries to operate chassis 136. The simple design of chassis block 144 simplifies manufacture, allowing carbon fiber to be wound on a long mandrel. The torsional stiffness of the block 144 structure will reduce weight. The block shape simplifies battery pack construction and replacement, as well as coupling and decoupling chassis 136 to body 134. Increasing volume is important to allow for electronics and battery while providing proper clearance needed to turn the wheels.

The leaning suspension of chassis 136 can operate with the electric motors from the '849 application on all four wheels, or with the hybrid propulsion having a gasoline motor driving the rear wheels. However, the most useful embodiment is having electric motors integrated into the hubs of all four wheels as shown in U.S. Provisional Application No. 62/662,081, filed Apr. 24, 2018. The four-wheel hub-drive and four-wheel steering improve vehicle control, both on and off-road. The active suspension and four-wheel steering also allow for much closer proximity parking than conventional vehicles because the vehicles can spin about an axis through the vehicle to align with a thinner parking spot.

The leaning suspension design also improves high speed cornering ability. Vehicle 130 uses center of gravity shift to maneuver at higher speeds, reducing instability moments and allowing the vehicle to return to a stable trim state or state of equilibrium much more quickly after a turn. This control method allows the vehicle to smoothly and efficiently change direction without the long duration instability moment associated with conventional suspension designs. Rounded tires 145 of vehicle 130 allow for leaning and improve efficiency through reduced rolling resistance. Battery size can be reduced accordingly. The lighter weight and low drag coefficient of the narrow vehicle 130 allow further reduction in battery size.

The active long travel leaning suspension technology's unique geometry design proportions liquid within the supporting hydraulic shock actuators 140 to maintain vehicle equilibrium (stable trim state) during cornering events and independent wheel events within the design envelope, i.e., suspension travel. Disproportionate leverage changes in suspension geometry from the neutral control arm 141 position coupled with the nonlinear collapse of the hydraulic shock actuators from the neutral control arm position provide proportional loading of the chassis and wheel to stabilize the sprung mass during cornering and other dynamic event scenarios. Unique to the design is the inability of the shock actuators to completely collapse as independent components due to internal volume discrepancies between gas and liquid chambers. Additional changes to dynamic spring rate can be made by varying the percent of liquid to gas respective to their independent chambers within the shock actuators, resulting in an increase or decrease of applied load. The liquid side of the shocks can be overfilled to impart unique leaning attributes onto vehicle 130.

The leaning suspension also allows significant reduction in overall vehicle weight. Leaning keeps the applied loads perpendicular to the wheels so that the design primarily needs to manage loads only along a single axis. The reduced need to design for side loading of components significantly reduces the overall vehicle weight.

Vehicle 130 has the ability to turn and drive all wheels independently in either direction. The ability to turn and drive front and rear wheels in opposite directions allows the vehicle to spin around a set vertical axis. Vehicle 130 has auto stabilization that automatically operates the front and rear suspensions to keep the vehicle stable relative to gravitational load. However, vehicle 130 is normally stable and can be driven manually, with or without the stability control system.

Vehicle 130 can be fitted with airlift tie down eyelets at the front and back. Eyelets can be used to attach a variety of tools both powered and passive. EVTOL 50 could use the eyelets as an attachment point. Vehicle 130 can have linking capability, to link the vehicle with either other similar vehicles or trailers into a train. When linked, the multiple vehicles or trailers can communicate either wired or wirelessly to sync speed, leaning, stability control, and other suspension or driving operations. In one embodiment, bumpers 146 of vehicles 130 include electromagnet circuitry to allow the vehicles to be magnetically stuck together to form trains when energized rather than being linked by a mechanical component attached between two vehicles.

Linking into trains allows vehicles 130 to share electrical drive systems. Taking advantage of available shared voltage, vehicles could switch between motor drives to reduce thermal loading across available systems. Coupling vehicles for longer trips would reduce aerodynamic drag and further increase efficiency.

Military vehicles could have many possible configurations. One would include a robotic arm with a minigun, missile launcher, or other weaponry or optical equipment mounted to the front of the vehicle and slaved to the operators helmet movements. Ammunition for the weapon could be carried at the rear of the vehicle and fed forward. The gun could also be operated manually. The leaning suspension technology can be scaled to accommodate larger enclosed vehicle types, such as transport vans, busses, or delivery trucks. All vehicle manufacturing is scalable to meet any carrying, velocity, and range requirements.

The outboard leaning suspension design of vehicle 130 provides side impact crumple zone protection. Utilizing onboard sensors, vehicle 130 can position itself prior to a collision, either avoiding the collision altogether or minimizing impact through suspension collapse. Leaning into turns also reduces rollover accidents from sudden swerving to avoid obstacles.

The ability to actively control the position of vehicle 130 relative to a collision event can further reduce vehicle weight by eliminating or reducing forward/aft designed impact energy absorption zones. In a frontal collision, this could be accomplished by pitching the vehicle, e.g., extending the front suspension and collapsing the back suspension to deflect or absorb the impact forces in such a way as to better align the occupant to the incoming loads. The same could be accomplished in a rear collision by raising the rear and lowing the front of the vehicle.

If the electronic control unit (ECU) of vehicle 130 determines that a collision is eminent, by looking at position, velocity, and proximity in relation to itself and other vehicles, the ECU would position the vehicle in such a way as to absorb the impact forces and provide optimal protection to the occupants within the limits of its functional capability. Vehicle 130 would actively protect the occupants by leaning away from the point of collision. Vehicle 130 would then extend the suspension outward toward the impending impact to absorb and disperse as much energy as possible. The primary programed directive of the vehicle's ECU would be the protection of the vehicle occupants and surrounding pedestrians. With enough computing power, the vehicle could determine its post-collision trajectory and final resting position. This would enable the vehicle to adjust its pre collision position to alter its final position.

In some embodiments, the leaning capability of vehicle 130 is manually controllable. In manual mode, leaning angle is controlled by the operator applying a mechanical load to sensors. Data recorded during manual mode operation, e.g., recording of applied loads on and relative positions of associated mechanical components through data acquisition, could be used in the programming of vehicles using semi-active or autonomous driving modes.

The software running on the ECU of vehicle 130 is connected to driverless sensor technology distributed over the vehicle. In some embodiments, a telescoping or folding sensor tower may be located on chassis block 144 or bumpers 146 and deploy during use of chassis 136. In other embodiments, sensors are located in bumpers 146. Bumpers 146 can be mounted using a receiver hitch style attachment mechanism of center blocks 143, such as the hitch receiver openings in the '849 application, to facilitate ease of replacement and maintenance. The ECU software can automatically change ride characteristics and vehicle attitude prior to a suspension event. Automatic adjustment of suspension characteristics provides a smoother ride than conventionally designed luxury automobiles. The ECU uses the sensors on bumper 146 and within the leaning suspension's hydraulic system to balance or align gravitational and centripetal forces acting on the vehicle during auto leaning mode.

Hydraulic shock actuators 140 in the leaning suspension consists of a cylinder with a floating piston separating gas from liquid and an integrated damping valve on the liquid side to control flow rate. An integrated gas enclosure with adjustable pressure control features is attached on the gas side. The compound spring/damping system imparts additional adjustable spring and damping capability to hydraulic shock actuator 140. This system allows phase-in damping and spring adjustment to the supporting shock actuator above and below set shock actuator isolated values. Spring rate drop of the shock actuator on extension is dependent on gas chamber volume. Additional remote gas vessels or bottles can be plugged into the gas chamber of hydraulic shock actuator 140 via a hose connection. A floating piston stop determines the phase-in point of shock actuator. A mechanical spring on the gas side of the floating piston acts as an additional adjustment of the floating piston stop point. Liquid reservoir volume can be actively adjusted to impart varying spring and damping values with or without gas chamber assist or secondary damping.

The leaning suspension also uses a biasing pump to transfer liquid between the sides of the suspension, or between the front and back suspensions. The biasing pump is described in detail in U.S. Provisional Application No. 62/662,081, filed Apr. 24, 2018, which is incorporated herein by reference. The biasing pump is a direct volume displacement pump. The pump has four chambers separated by two geared racks driven by a single lead screw. The lead screw is driven via two opposing motors-either motor is capable of operating the pump. The chambers of the pump can move fluid independently or they can be linked together as needed. The lead screw helix of the pump is designed to impart various back-drive and load carrying attributes depending on the application. Pressure sensors within the pump chambers relay measurement data to the CPU to control motor current/torque to drive pump motors and set/maintain vehicle attitude. Sensors are also used to set pump pressure limits and direction. The pump is of modular design. Several pumps can be linked together in various configurations depending on the application.

Figure 5D:
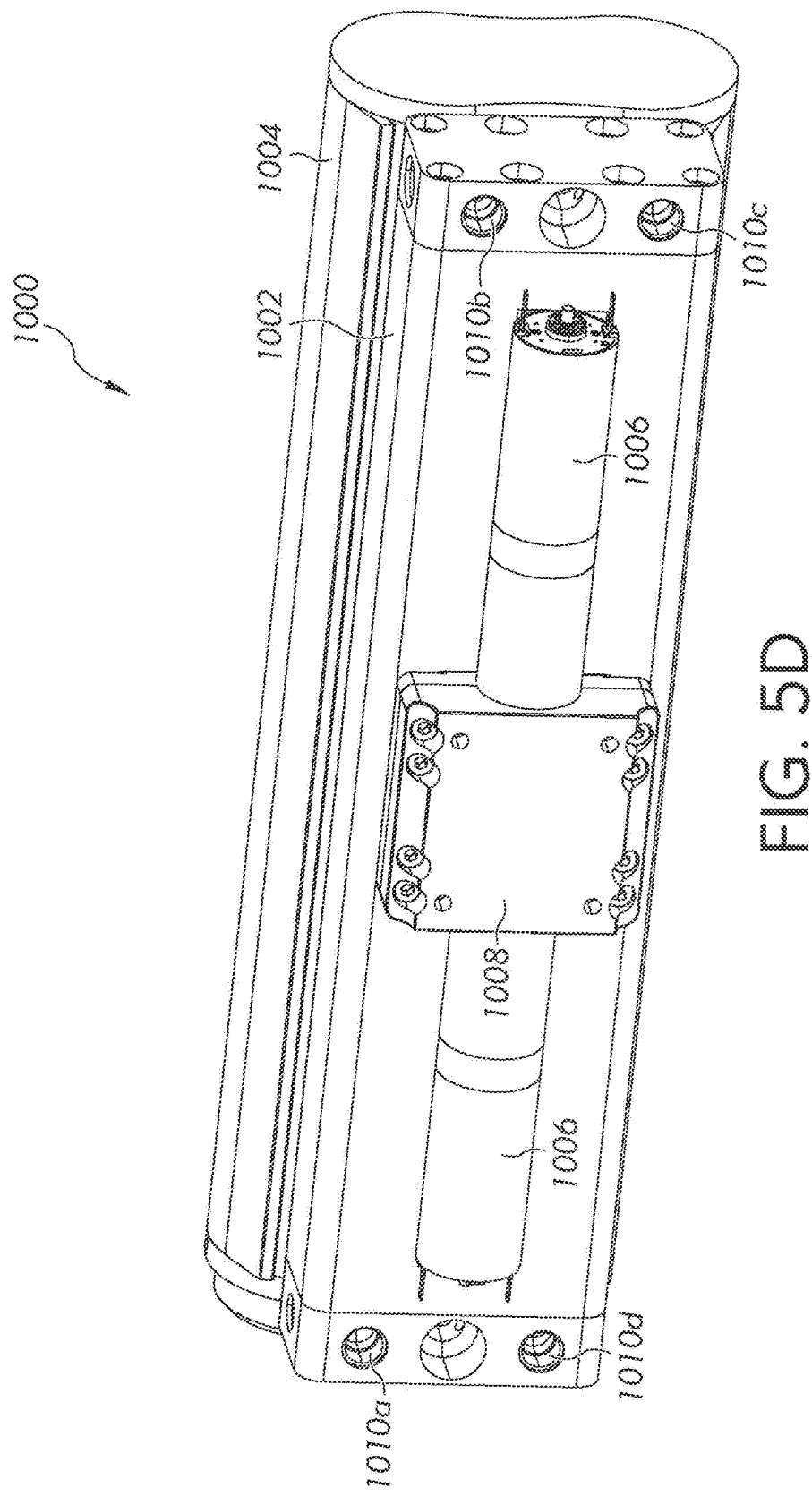
Figure 5E:
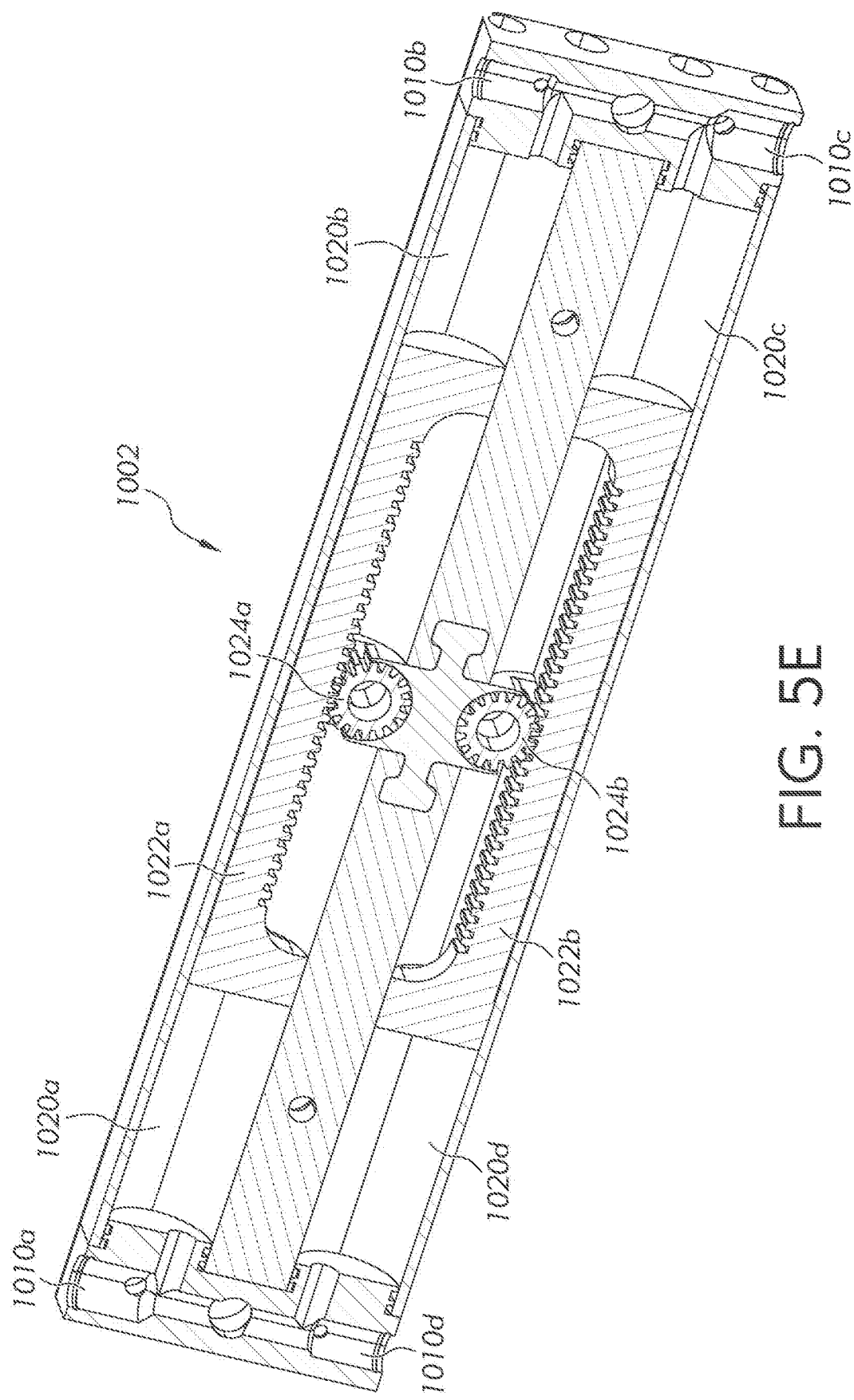
Figure 5F:
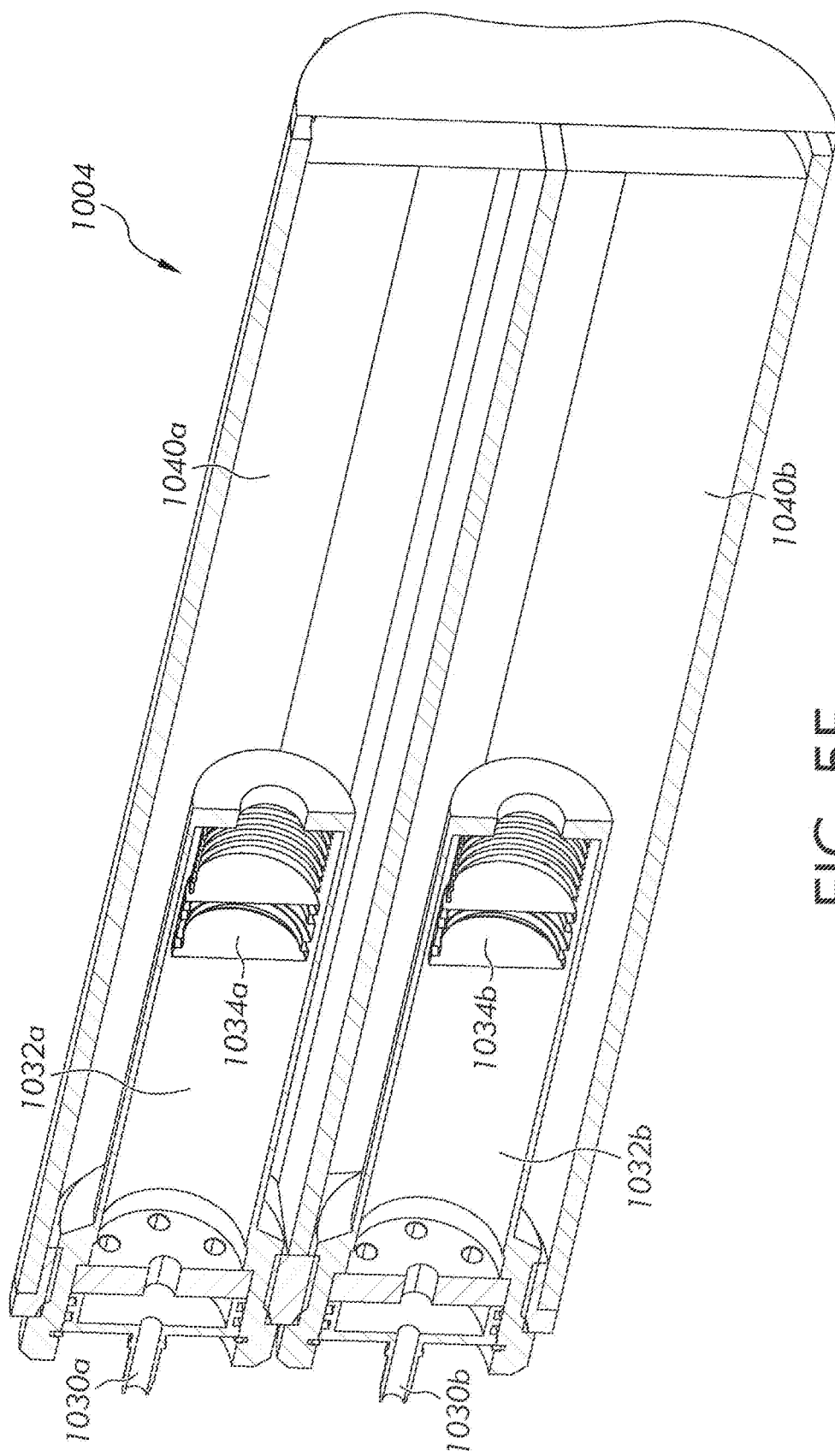

FIGS. 5d-5f illustrate the biasing pump 1000. FIG. 5d is an external view of the pump. FIG. 5e is a cross-section through the pump 1002. FIG. 5f is a cross-section through a gas chamber 1004 coupled to the pump. The biasing pump has a similar function to, and can replace, hydraulic pump assembly 126 in U.S. Pat. No. 9,545,976, granted Jan. 17, 2017, and U.S. Publication No. 2017/0321729, published Nov. 9, 2017, which are incorporated herein by reference (collectively referred to as the Incorporated Documents below). The biasing pump transfers hydraulic fluid volume between the left and right side of the vehicle's suspension. The gas chamber has a similar function to bypass system 900 in the Incorporated Documents insofar as the bypass system acts as a secondary suspension. However, the gas chamber does not bypass fluid between the two sides. Compressed gas within the gas chamber forces more fluid into the shock actuators when load on the system is reduced to maintain spring rate. When the shocks receive a load again, the excess fluid returns to cylinders within the gas chamber.

A top-right port 1010B in FIG. 5e is coupled to one of the shock actuators (e.g., shocks 68 and 88 in the Incorporated Documents or shock actuators 140 of vehicle 130). A top-left port 1010A is coupled to one of the ports 1030A or 1030B of the gas chamber. The bottom-left port 1010D and bottom-right port 1010C are connected in an opposite orientation: the bottom-left is coupled to the other shock actuator and the bottom-right is coupled to the other port of the gas chamber. The caps on the two ends of the biasing pump include a hydraulic pathway coupling the attached shock actuator to the corresponding port of the gas chamber.

The biasing pump includes four different chambers 1020A-1020D, with one of the chambers connected to each of the four ports 1010A-1010D just described. The end caps couple the two chambers on the right together, and the two chambers on the left together. Other use cases include end caps that do not connect the chambers together. Geared racks 1022 are disposed within the biasing pump and are oriented left-to-right, one geared rack between the top ports and one geared rack between the bottom ports. The geared racks are driven left and right to transfer hydraulic fluid either in the left ports and out the right ports, or vice versa.

The two motors 1006 shown in FIG. 5d are hooked up in parallel to the two geared racks. Either one of the two motors can operate the biasing pump in case the other motor fails. For sense of scale, in one embodiment the motors have a diameter of one inch. The geared racks are coupled to move in unison when gears 1024 are turned by motors 1006. Both geared racks move left at the same time, and both move right at the same time. When the geared racks move left in the view of FIG. 5c, the shock actuator hooked to the top-right chamber has fluid removed, and fluid is added to the shock actuator hooked to the bottom-left chamber.

As a leaning suspension leans in either direction from neutral, both sides lose mechanical leverage. The biasing pump allows a biasing of the leverage by causing a disproportional collapse in the shocks. The shock on the inside of a turn can be collapsed and lose leverage at twice the rate of the shock on the outside of the turn. The biasing pump transfers load handling capability to the outer shock, which experiences most of the load from a turn. The biasing pump hooks up in between the two shock actuators and operates within the pressure differential between the two sides to transfer fluid volume from one side to the other.

Both geared racks are working to transfer fluid in the same direction in the system (i.e., from the left shock to the right shock or vice versa). The biasing pump end caps hydraulically couple the ports on each side together. Therefore, each shock actuator is coupled to an associated port of the gas chamber through the cap. The air pressure in gas side 1040 of the gas chamber applies force through the pathway of the end cap to the shock actuators. Excess hydraulic fluid is forced into fluid side 1032 of the gas chamber, and the gas within the gas side presses on the other side of a plunger 1034 in the gas chamber to force the fluid back out again later. The plunger within the gas chamber keeps the hydraulic fluid separated from the gas stored in the gas chamber.

There is no significant fluid communication between the left and right side of the system. The geared racks sit between the left and right shock actuators, substantially blocking fluid from the left and right side from intermixing. Therefore, if one side is damaged and loses fluid, the other side can still operate.

The geared rack moves hydraulic fluid volume left-to-right and right-to-left depending on the circumstances of the vehicle. The gas chamber is connected to the shock actuators through the biasing pump end caps. The gas chamber stores excess fluid from either shock actuator in cylinders illustrated below but does not bypass the fluid between the two sides. The excess hydraulic fluid stored in the gas chamber cylinders allows both shock actuators to fall at once, e.g., if the vehicle goes airborne fluid from the gas chamber flows to both shock actuators due to the load being removed from both. Both actuators pull in excess hydraulic fluid from the gas chamber and expand. The biasing pump by itself is not capable of expanding both shock actuators, because the biasing pump is only capable of transferring volume from one side to the other.

In other use cases of the biasing pump, all four ports are coupled and transfer fluid within two different systems without the gas chamber. The biasing pump caps can be formed without the ports connected so that fluid is not transferred between any of the four biasing pump chambers. For instance, in a four-wheel vehicle, a biasing pump can be coupled so that one geared rack transfers fluid between the front-left shock actuator to the rear-left shock actuator, while the other geared rack transfers fluid between the front-right shock actuator to the rear-right shock actuator. In that case, the two geared racks transfer fluid in two different systems in parallel, rather than a single system. Because there is no fluid communication between any of the four chambers, if one quadrant of the system is damaged the other three shock actuators continue operating properly.

In one embodiment, a four-wheeled vehicle includes two leaning suspensions. For instance, chassis 136 includes two separate suspensions, one at the front of the vehicle and a second at the rear of the vehicle. Each of the leaning suspensions includes a biasing pump and gas chamber combo for biasing hydraulic fluid left-to-right in the system. A third biasing pump without a gas chamber is used to transfer fluid front-to-back. The third biasing pump allows leaning of the vehicle front-to-back. The system with three biasing pumps limits fluid communication between the four quadrants of the system. There is no significant fluid transfer from left to right or right to left through any of the three biasing pumps, and no significant fluid flows across the middle biasing pump from front to back or back to front. The biasing pump uses geared racks to move hydraulic volume without allowing fluid intermixing.

The gas chamber operates as a secondary suspension system because the gas applies pressure to the system. The gas pressure also puts more fluid into the system when both sides fall. In one embodiment, the air pressure in the gas chamber is 600 pounds per square inch (PSI) or more. When a load is experienced, the gas pressure helps resist the load.

The gearing can be implemented as a replaceable module. The gearing can be mounted within the middle cover 1008, and then removed and replaced to modify attributes of the pump.

FIG. 5*f* illustrates a cross-section of the gas chamber. The two cylinders inside the gas chamber include floating pistons, which are similar in functionality to pistons 908 in the Incorporated Documents. The floating pistons will bottom out prior to falling into the gas chamber. Springs provide dampening when the pistons bottom out. The structure of the gas chamber is similar to integrating cylinders 906 within air canister 912 in the Incorporated Documents.

In one embodiment, the system is configured such that the floating pistons within the gas chamber cylinders will never bottom out. The vehicle chassis will bottom out on the ground before the floating pistons will reach their absolute maximum extent within the air chamber cylinders. The springs in the air chamber cylinders are for the rare case when, due to the terrain, the body is allowed to fall below the level of both wheels on a load input event, e.g., landing a jump. The springs soften the blow of the floating pistons hitting the bottom of the cylinders. The springs are very high tension and only compress at the very upper limits of actuator pressure. The springs are a safety feature to reduce the likelihood of parts breaking in extreme situations. In another embodiment, the movement of the vehicle's suspension arms will physically bottom out before the floating pistons in the gas chamber cylinders bottom out.

FIGS. 6*a*-6*f* illustrate eVTOL 50 picking up a vehicle 130 with vehicle 130 beginning at rest. The lightweight construction of vehicle 130 allows transport by autonomous and semiautonomous eVTOL 50. In one embodiment, ground vehicle 130 uses a battery with a limited range based on technology of the time. For example, ground vehicle 130 may only have a maximum range of 100 miles. In this scenario, vehicle 130 would use available battery range to operate within the metropolitan core of a city. If the operator desired to travel outside the metroplex, possibly to another city or a rural area, he or she would request air transport and select the type or speed of vehicle based on distance and desired arrival time. Skyboom 52 size may be matched to ground vehicle mass, travel distance, and speed at the time a request is made. Longer trips may be service with an eVTOL 50 having a longer or larger diameter skyboom 52 to provide more fuel capacity. eVTOL 50 would attach to ground vehicle 130, either while in motion or standing still, and transport it to a suitable drop point close to the destination. Vehicle 130 can be dropped directly at any suitable location, for instance in a driveway or the top of a highrise building.

Before the transitional flight sequence from vertical flight to horizontal flight can be initiated, the drone and automobile must be coupled together. Efficient pick-up and drop-off of a load requires fast and positive coupling and decoupling before power can be applied to lift the load to a safe transitional altitude. The design of eVTOL 50 with skyboom 52 places the propulsion system high above the load safely out of harm's way, reducing the effects of rotor-wash, a significant advantage over other VTOL designs.

Figure 6B:
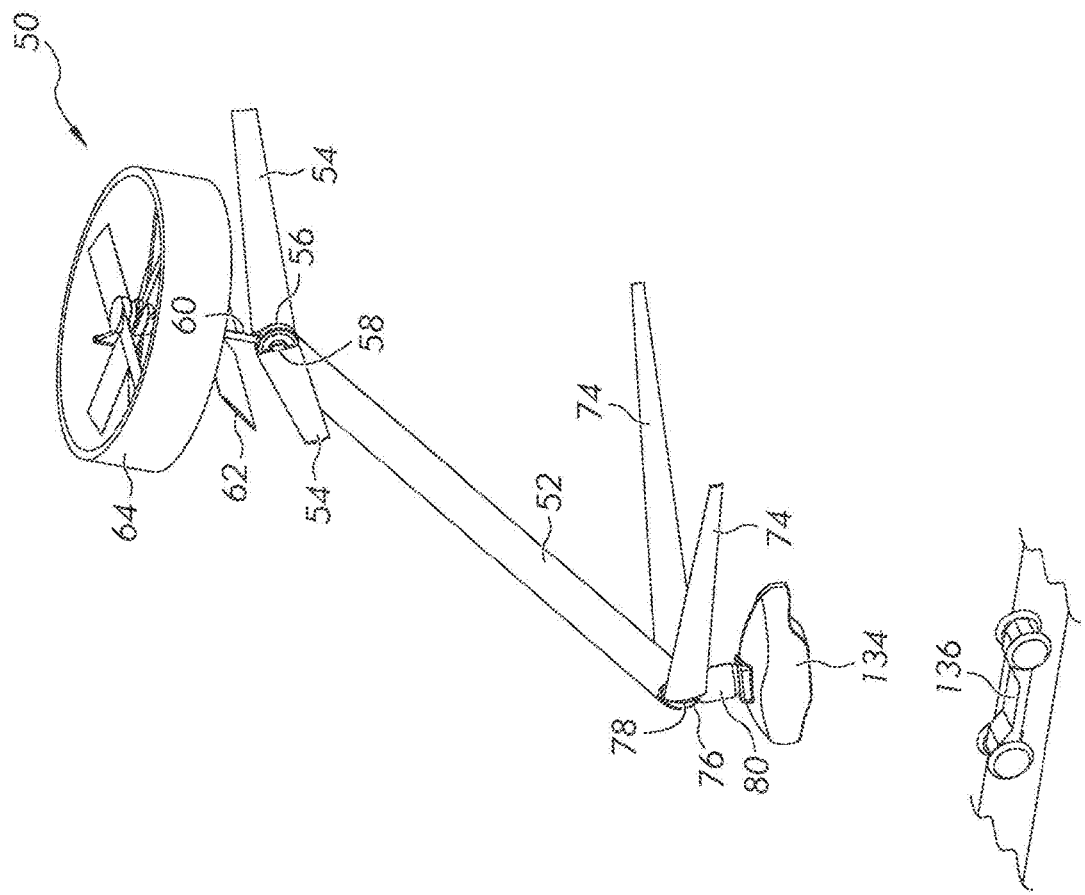
FIGS. 6a-6g illustrate the eVTOL going from vertical takeoff to horizontal cruising when transporting a ground vehicle.
Figure 6A:
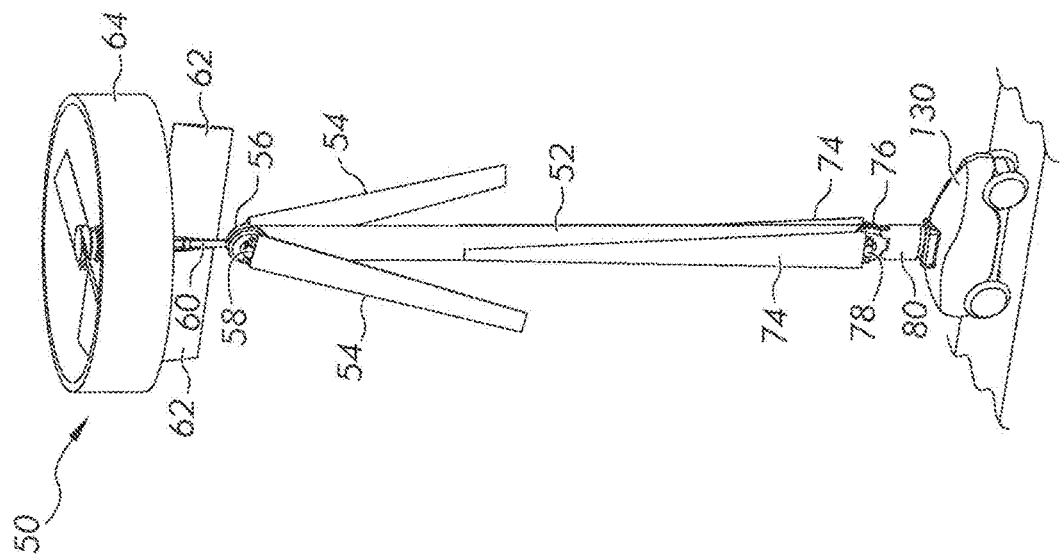

In FIG. 6a, vehicle 130 was standing still, and eVTOL 50 has flown down vertically, attached payload connector 80 to dock 132, and raised body 134 up from chassis 136. EVTOL 50 is flying vertically similar to FIG. 3a. In some embodiments, payload connector 80 includes a telescoping shaft or ladder to attach ground vehicle 130.

Figures 6C, 6D:
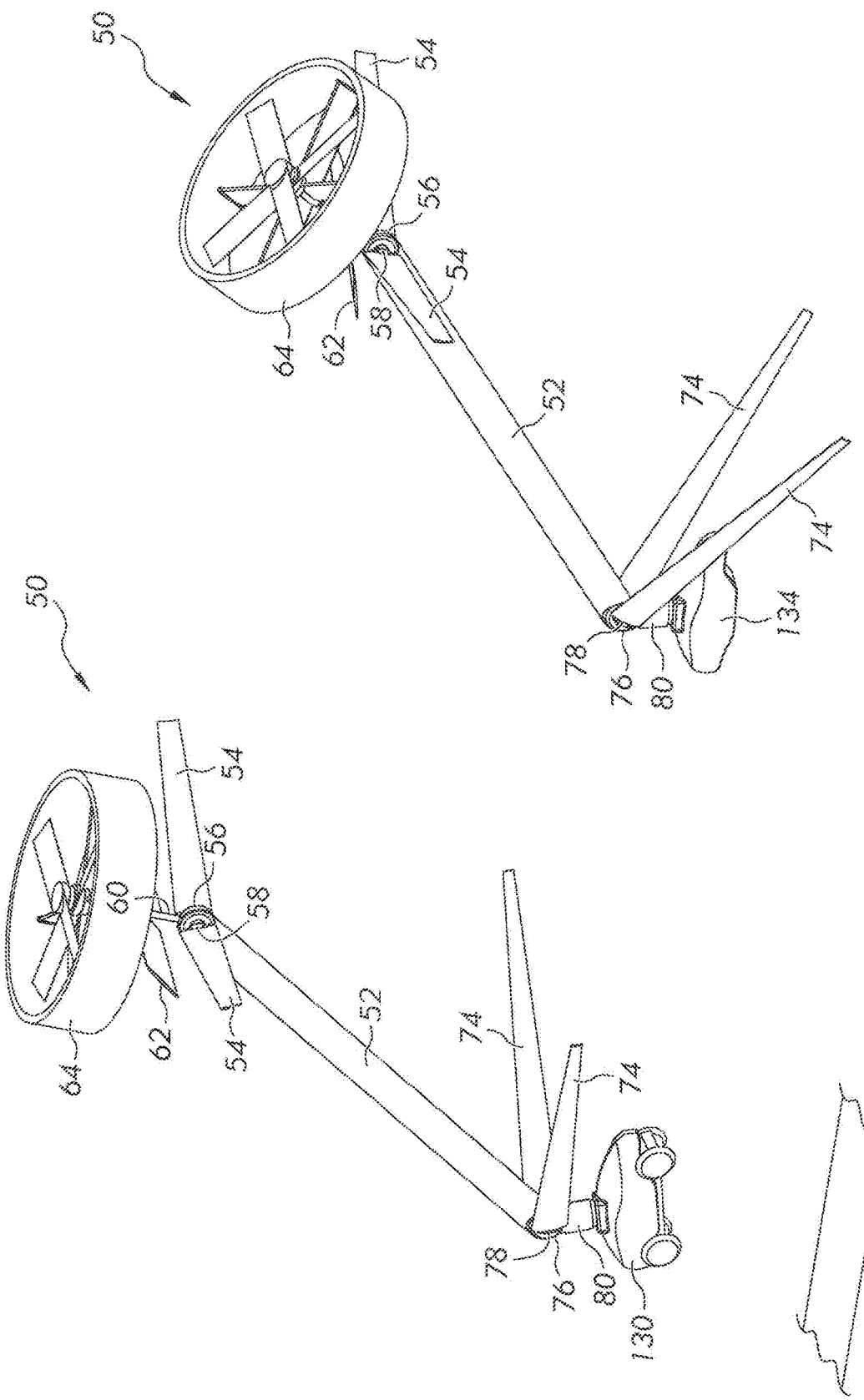
Figure 6E:
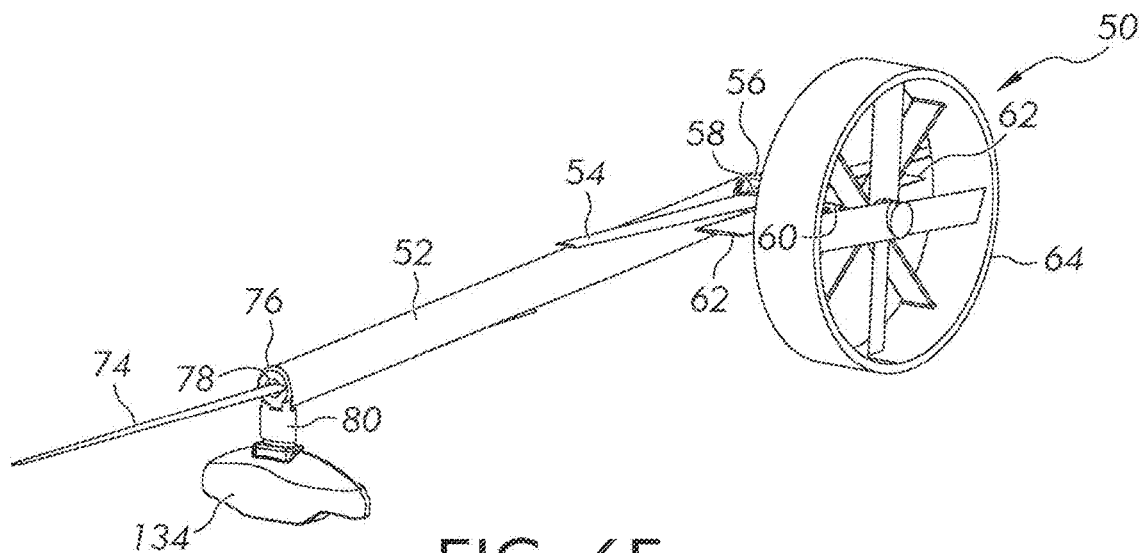
Figure 6F:
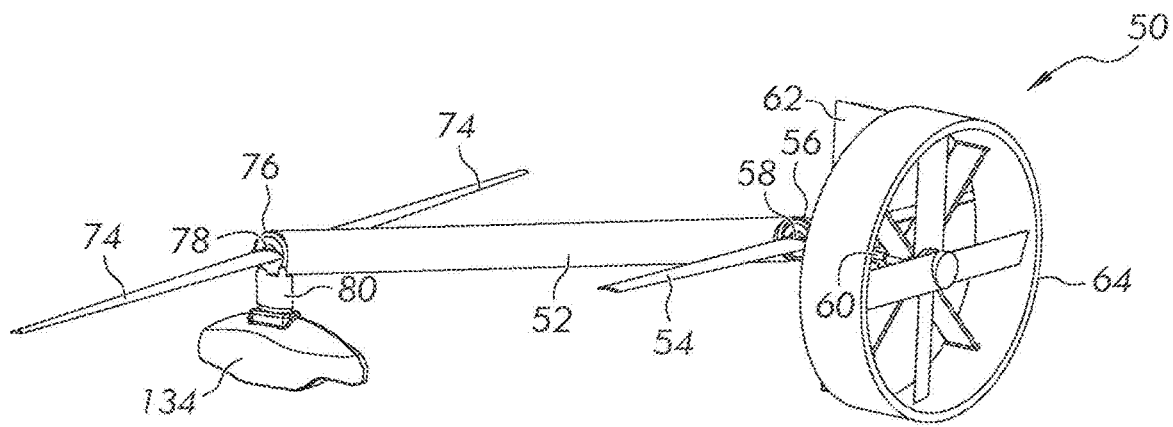

In FIG. 6b, eVTOL 50 increases vertical thrust to raise body 134 and begins transitioning to horizontal flight. The upper wings 54 begin opening sooner than lower wings 74, and are more open in FIG. 6b. FIG. 6c illustrate an alternative option where chassis 136 is picked up and transported along with body 134. Both wings 54 and 74 continue opening and e VTOL 50 continues increasing horizontal speed as the transition from vertical to horizontal flight continues. In FIG. 6d, wings 54 and 74 are more open, and skyboom 52 is closer to horizontal. In FIG. 6e, wings 54 and 74 have fully opened to perpendicular. Lift generated by wings 74 picks up the tail end of skyboom 52 to its final horizontal flight position in FIG. 6f. Ground vehicle 130, or just body 134 is in tow behind rotor assembly 64.

Payload connector 80 hanging down between eVTOL 50 and body 134 operates as a vertical stabilizer. Payload connector 80 includes an airfoil shaped portion, and an actively controlled telescoping shaft through the airfoil shaped portion. The airfoil shaped portion can rotate 360 degrees around the shaft to operate as a rudder. Vehicle 130 can also rotated around the internal rudder shaft to remain in a determined position relative to the wings or ground. This feature allows vehicle 130 to rotate 180 degrees to better place the passengers within the vehicle to absorb impact loads in the event of a crash. The feature also aligns vehicle 130 to the roadway when landing in motion.

Figure 6G:
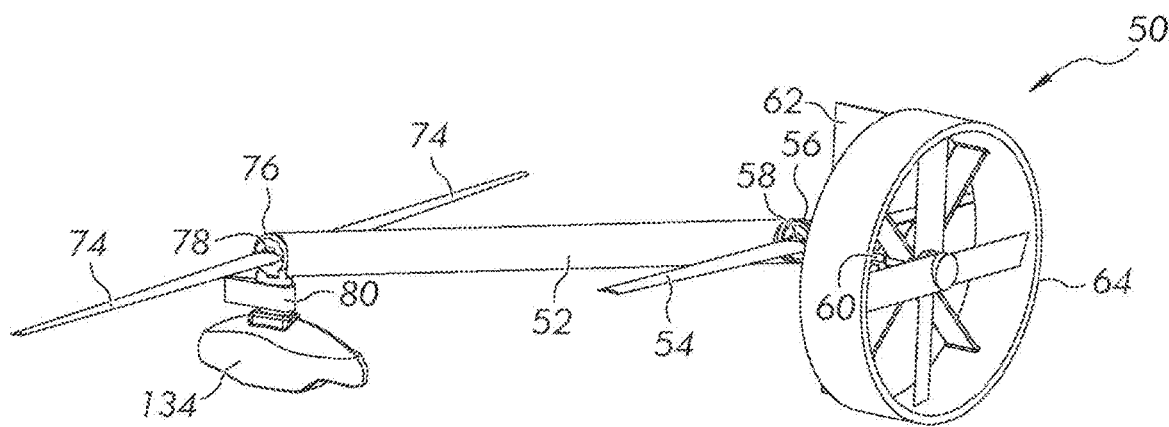

FIG. 6g illustrates payload connector 80 and built-in rudder 148. Rudder 148 is 2 feet high and 3.5 feet long in one embodiment but could be made bigger, e.g., 3 feet by 6 feet. Rudder 148 can rotate within connector 80 to steer the forward motion of eVTOL 50. Rudder 148 can rotate up to 360 degrees. Rudder 148 can be added to any of the above or below embodiments. In some embodiments, payload connector 80 as illustrated above and below, or a portion thereof, has the ability to rotate left-right to operate as a rudder.

The transition when loaded in FIGS. 6a-6f is similar to the transition when unloaded in FIGS. 3a-3f. Wings 54 and 74 are opened in a manner to reduce or minimize loading of the geared joints and hinges. The articulated dual-wing design provides leverage to rapidly transition from vertical to horizontal flight without the instability moments common to other VTOL aircraft. Transition efficiency helps decrease flight time, and thus overall system efficiency. The loaded eVTOL 50 is more vertical throughout the transition than when unloaded.

When chassis 136 is transported along with body 134, or a non-separable vehicle 130 is used, attitude adjustment and relative position of ground vehicle 130 and eVTOL 50 can be manipulated using gyroscopic precession of the ground vehicle's wheels. Using all-wheel steering and all-wheel drive of ground vehicle 130, changing velocity, direction, and lean angle of the wheels will affect attitude of eVTOL 50.

A communication link between eVTOL 50 and ground vehicle 130 can allow the operator of the ground vehicle to take manual control of the eVTOL. A high current connection between the two vehicles would allow eVTOL 50 to charge the ground vehicles batteries in flight. Batteries of ground vehicle 130 could also provide additional current to eVTOL 50 in an emergency to increase available thrust. Electrical power and communication control connections are made upon physical connection between payload connector 80 and dock 132. A wireless communication method can be employed between eVTOL 50 and ground vehicle 130 before a hard connection is established to coordinate relative positions of the vehicles.

EVTOL 50 is designed to reduce noise issues. The length of skyboom 52 isolates vehicle 130 from the noise of rotor assembly 64, or whatever propulsion system is used, providing occupants with a quiet cabin. The height of the propulsion system also reduces noise and rotor wash at ground level, whether an open rotor, ducted rotor, or jet engine is used. The ducted design reduces noise further. Using larger diameter rotors will lower rotor tip speed, and thus reduce noise levels as well. The high rate of climb that e VTOL 50 is capable of helps reduce ground level noise around takeoff and landing zones.

Figure 7A:
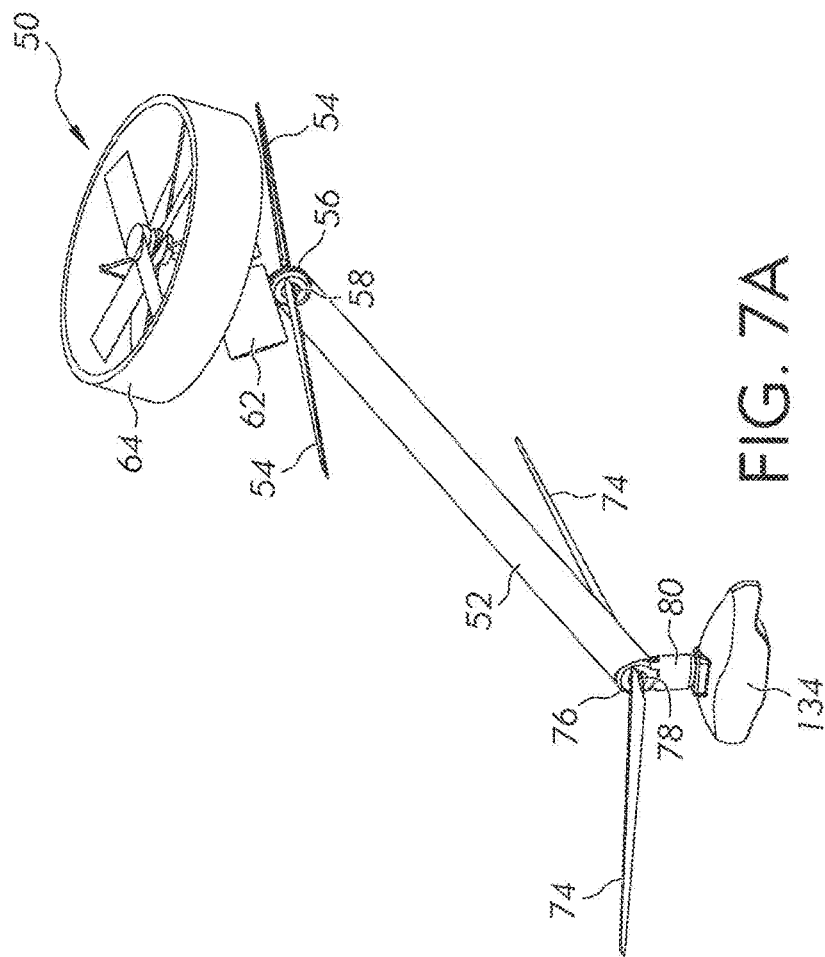
FIGS. 7a-7d illustrate the eVTOL going from horizontal cruising to vertical landing when transporting a ground vehicle.
Figure 7B:
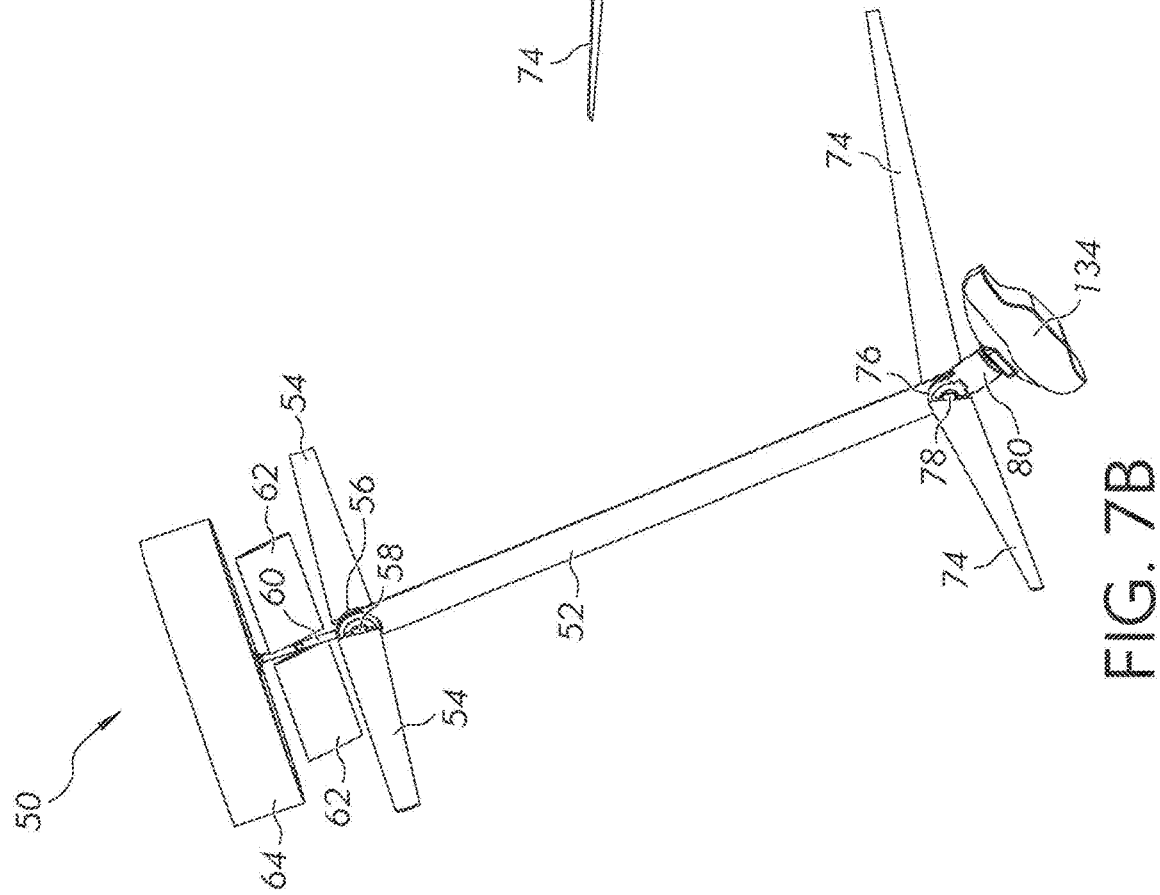
Figure 7D:
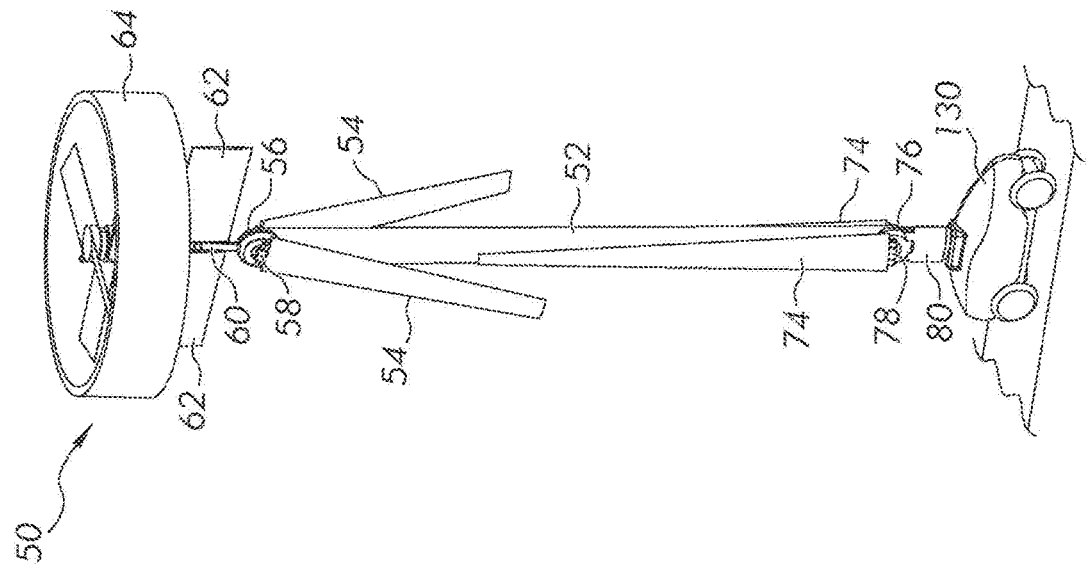
Figure 7C:
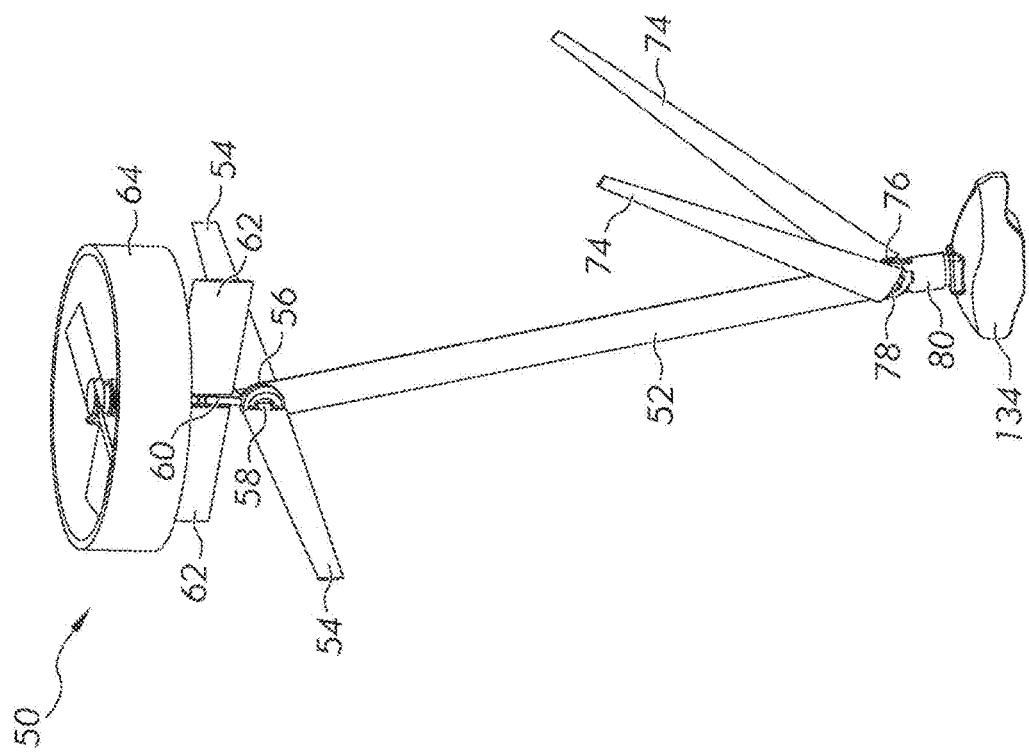

FIGS. 7a-7d illustrate eVTOL 50 transitioning from horizontal flight back to vertical flight to drop off a payload at the payload's destination. FIG. 7a shows eVTOL 50 beginning to slow down horizontal flight by angling rotor assembly 64 more upward. The angle of attack of lower wings 74 increases lift, and then stalls, resulting in rapid deceleration. The tail end of skyboom 52 with body 134 falls as wings 74 lose lift. Skyboom 52 swings down under rotor assembly 64. The weight of body 134 adds momentum that swings skyboom 52 forward such that lower wings 74 are forward from rotor assembly 64 in FIG. 7b. In FIG. 7c, skyboom 52 is rotating back to vertical, and finally reaches vertical flight in FIG. 7d. Once vertical flight is achieved, vehicle 130 can be dropped at the destination, or body 134 can be dropped onto a chassis 136. When vehicle 130 is transported as a whole, the processional positioning techniques with the vehicle's wheels can be used to properly orient the vehicle prior to contact with the ground or other surface. Such processional positioning improves predictability when vehicle 130 is released by eVTOL 50.

Figure 8E:
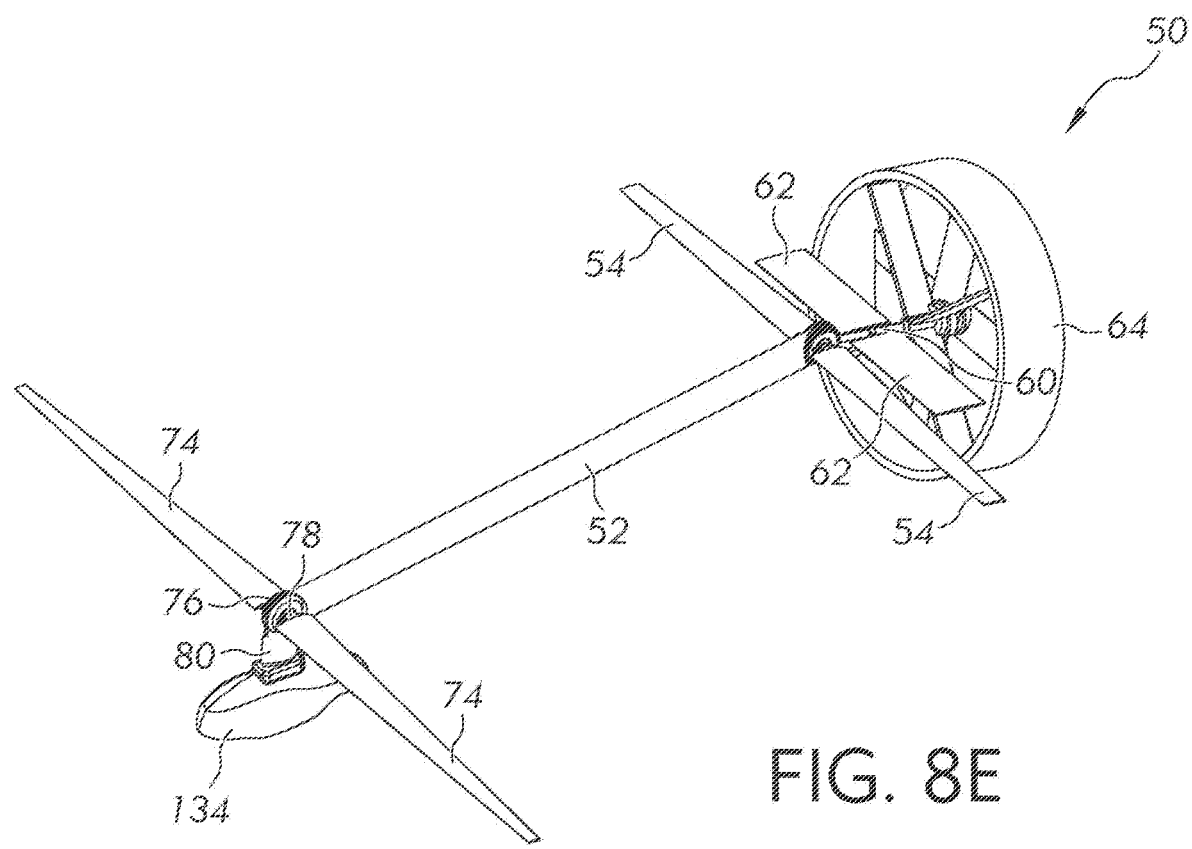
Figure 8F:
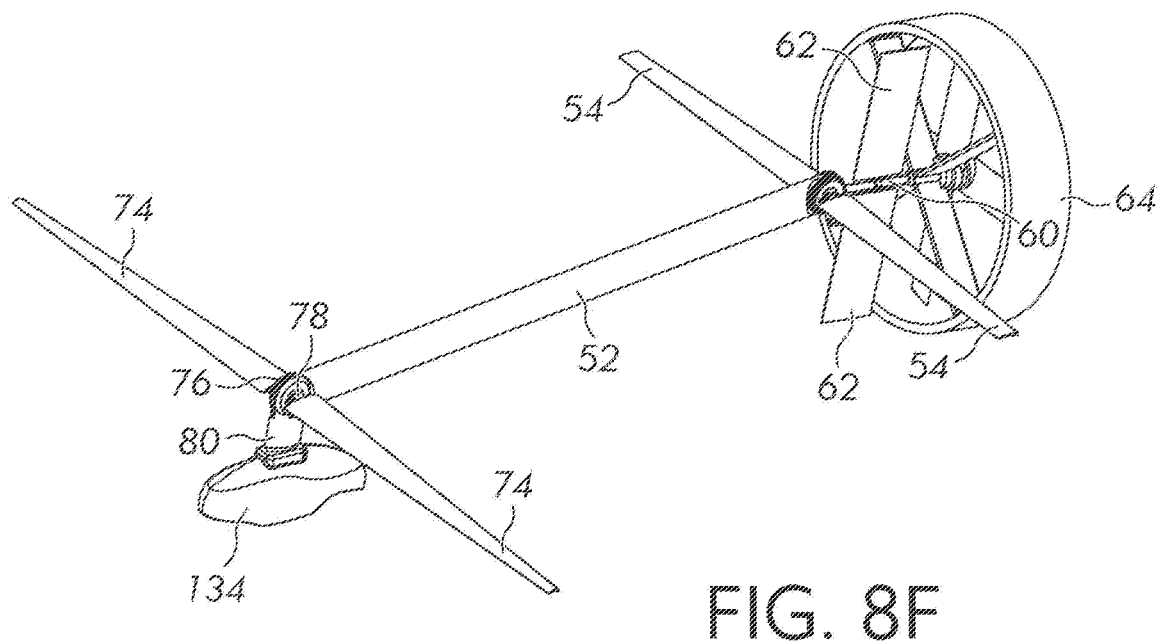

FIGS. 8a-8f show eVTOL 50 picking up vehicle 130 while vehicle 130 is in motion driving on a highway. Making a pickup with both eVTOL 50 and vehicle 130 in motion is the most effective and efficient transport method because both vehicles have greater dynamic stability with additional degrees of freedom in movement. FIG. 8a shows the positioning of eVTOL 50 while the eVTOL attaches to vehicle 130. EVTOL 50 flies horizontally along a highway above vehicle 130. Lower wings 74 are partially deployed. Control surfaces could be designed into the wings to help fine positioning when docking with or without wings 54 and 74 deployed. In heavy traffic, deploying wings 54 and 74 may not be possible. In some embodiments, nearby vehicles communicate with each other autonomously to create a safety zone around a vehicle being picked up. Traffic can still travel as normal, but will slow down or speed up to temporarily create an area of empty road around the vehicle being picked up. The safety zone may show up visually on the display of manually driven vehicles so that drivers can avoid the pickup area.

During pickup, the hydraulic suspension of vehicle 130 is used to mirror and dampen connection moment loads. The suspension of vehicle 130 can autonomously mirror the roll, pitch, and yaw movements of eVTOL 50, making in-motion coupling easier than static coupling. Vehicle 130 aligns itself as necessary for proper connection between payload connector 80 and dock 132. Vehicle 130 can use the independent wheel hub drive and steering system to place the vehicle into proper liftoff and landing alignment and orientation. Payload connector 80 has a telescoping aspect that can make fine positional adjustments to connect with dock 132. Once in flight, the precessional torque generated by the spin angular momentum of the wheels of vehicle 130 can further assist in alignment and orientation.

Vehicle coupling, whether in horizontal flight or vertical hover, will have impact shock loads controlled or minimized by the hydraulic suspension. Mirroring the attitude, velocity, and other real-time movement of both vehicle 130 and eVTOL 50 in relation to one another reduces impact shock loads. Mounting a small multi-hinged folding robotic arm on the bottom end of skyboom 52, probably on the back side to reduce drag, would reduce the problem. On the end of the robotic arm would be an articulated pin. When eVTOL 50 and vehicle 130 are close enough together, within approximately 3 feet, the arm would reach out and attach to the top of the ground vehicle. Attachment would provide relative positioning information to the ECU, which would, in turn, control the movements of both vehicles through the mating process to positive coupling with a degree of mechanical assistance. The robotic arm would allow compensation for weather-induced alignment discrepancies and provide the control resistance necessary to ensure a fluid coupling sequence to mitigate impact moments. The robotic arm facilitates mirroring of automobile suspension and drone flight movements, to ensure precise and smooth coupling.

Sensors and wireless communication between vehicles will also play an important role for successful pickup. Sensors will include LiDAR, radar, and cameras on both skyboom 52 and ground vehicle 130 assessing the environment to ensure safe connection. Sensors onboard both vehicles may send data to the CPU to calculate variables ensuring automated coupling is within set guidelines or limits. Viable connection is ensured prior to the attempt based on the ground vehicle 130 load, ground vehicle operational status, eVTOL 50 and ground vehicle surroundings and flight path. A wireless connection set up prior to physical connection allows data transfer so that eVTOL 50 is aware of the real-time suspension status of vehicle 130, and has information about the vehicle weight and center of gravity.

Once successful connection is made, eVTOL 50 elevates vertically with vehicle 130 or body 134 in tow by increasing thrust from rotor assembly 64. In FIG. 8*b*, lower wings 74 are positioned to stabilize vehicles through forward wing rotation in FIG. 8*d*. FIG. 8*b* illustrates the alternative where body 134 is lifted off the road without chassis 136. Chassis 136 is fully autonomous and continues driving on the road to a holding location to recharge, or to a location of the next use for the chassis. Vehicle 130 is picked up as a whole with chassis 136 in FIG. 8*c*. In FIG. Be, lower wings 74 are fully spread to provide lift and achieve the final horizontal flight position in FIG. 8*f*.

Figure 9B:
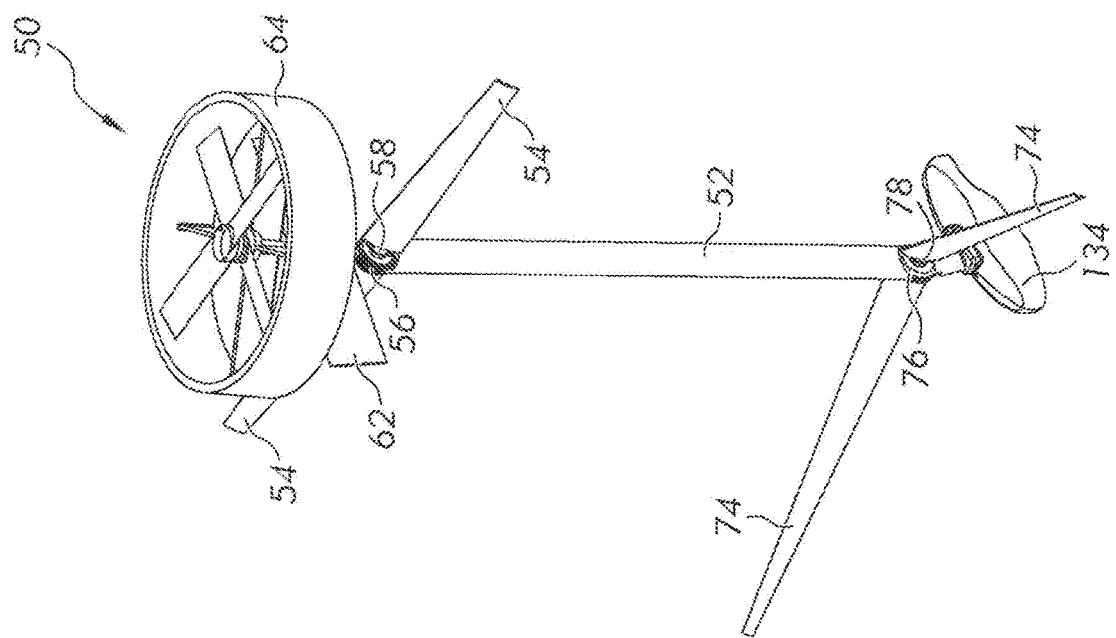
Figure 9A:
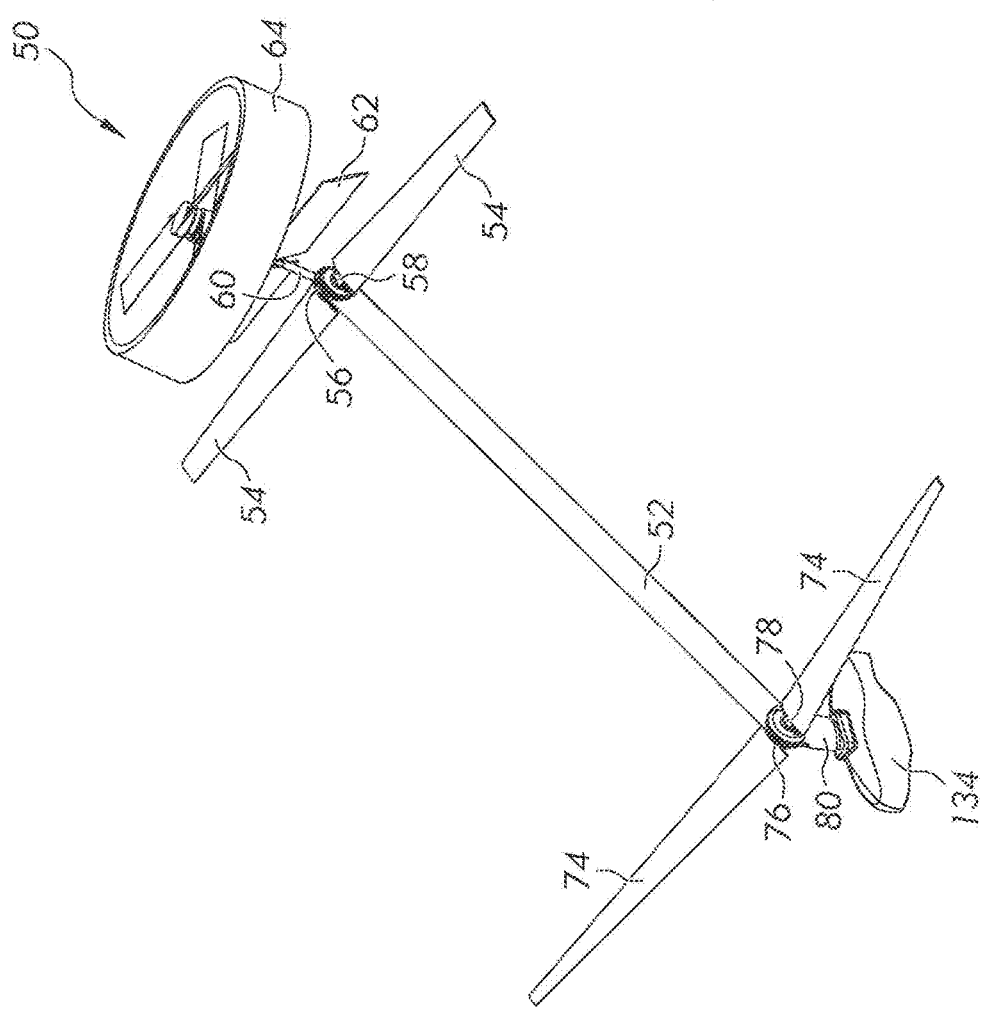

FIGS. 9*a*-9*d* illustrate eVTOL 50 dropping off vehicle 130 onto a road with the vehicle in motion. In FIG. 9*a*, thrust from rotor assembly 64 is oriented more vertically, and lower wings 74 begin folding up to reduce lift. The lower end of skyboom 52 begins swinging forward under rotor assembly 64 as lift is reduced. Due to the rapid slowdown, the load swings forward in front of rotor assembly 64 in FIGS. 9*b* and 9*c*, and then quickly back in FIG. 9*d*. Rotor assembly 64 provides momentary lift as skyboom 52 is rotated back, and then body 134 continues forward at the same velocity without loss in altitude.

In FIG. 9*d*, eVTOL 50 is in a similar position to FIG. 8*a* when vehicle 130 was picked up. EVTOL 50 is traveling horizontal above a road that vehicle 130 will be dropped off on. The active suspension system would set the attitude of vehicle 130 using precessional wheel force upon release. The wheels of vehicle 130 spin up to match ground speed upon landing. Automatic adjustments to active suspension spring rate and damping would ensure smooth automated landing of ground vehicle 130 on the road. On-demand pickup and recharge by e VTOL 50 allow for reduction to the maximum range of vehicle 130, allowing smaller batteries and cheaper overall vehicles.

A vehicle can be picked up from a standstill but dropped off in motion, or picked up in motion and dropped off to a standstill. Vehicle 130 can also be picked up from a mobile platform, such as a rail car, a platform on a magnetic track, or a flatbed trailer. Vehicle 130 can also be dropped off travelling in reverse to better protect the passengers. Reverse landing can be accomplished by eVTOL 50 rotating its wings backward, or payload connector 80 can provide the capability to turn around vehicle 130. Reverse landing may occur regularly, or may be an emergency procedure.

EVTOL 50 is designed for fully autonomous flight, but has either manual or augmented flight mode capability available. EVTOL 50 is normally stable, so manual flight without stability controls is possible. In early stages of the transportation system using eVTOL 50, remote pilot oversight of the system may be used. A single pilot could remotely monitor several drones as the system moves closer to full automation.

EVTOL 50 is designed for safety. The high glide ratio provided by four long wings 54 and 74 increases the chance of successful landing after loss of power, in addition to increasing efficiency in general. Both vehicle 130 and eVTOL 50 can have active or passive parachute systems to save lives and the equipment in case of more serious failures, e.g., in the event of a chemical, battery, hydrocarbon, or fuel fire. eVTOL 50 can be configured to separate lower wings 74 from skyboom 52 to allow the lower wings to stay with the ground vehicle and glide to safety. The precessional torque from the vehicle 130 wheels can control the aircraft attitude while the ground vehicle glides to safety using lower wings 74. Precessional torque can also be used to position the ground vehicle for impact if dropped with or without wings 74, or even with the entirety of eVTOL 50 attached. The universal attachment system of eVTOL 50 allows quick emergency evacuation by the closest eVTOL.

FIG. 10*a* illustrates a storage silo 150 with eVTOL 50 parked within the storage silo. Storage silo 150 includes a long, thin cylinder 152 that skyboom 52 can descend into with wings 74 and 54 folded down. A dock 154 at the bottom of cylinder 152 provides a connection to eVTOL 50 for recharging the batteries, downloading or uploading data, or performing diagnostics. Dock 154 connects to payload connector 80, similar to dock 132 of vehicle 130. The walls of cylinder 152 can include cameras, sensors, or other components to perform physical diagnostics on eVTOL 50. Diagnostics can also be performed via the data connection of dock 154. Walls of cylinder 152 may also include water spouts, brushes, and other elements to clean eVTOL 50 while parked.

Head 156 of storage silo 150 is sized to fit rotor assembly 64, or any other propulsion system in use for a particular eVTOL. In one embodiment, rotor assembly 64 of eVTOL 50 rests on a bottom surface of head 156 when parked, and skyboom 52 hangs below the rotor assembly. A wider portion of cylinder 152 can accommodate paddles 62. In other embodiments, dock 154 supports the weight of eVTOL 50 at the bottom of cylinder 152, and paddles 62 can be contained within head 156. A lid 158 protects the inside of silo 150, including eVTOL 50 when parked, from rain and other weather conditions, local wildlife, or criminal theft or damage. A hinge 160 allows lid 158 to open for takeoff or landing of eVTOL 50.

FIG. 10b illustrates an array of storage silos 150 buried in the ground. Arrays of storage silos 150 can be placed in any convenient location within or nearby a city center. Silos 150 provide a convenient mass-producible storage solution for eVTOL 50 to return to when recharging or other maintenance is necessary. Typically, a large city might have thousands of eVTOL 50 to service the citizens of the city. At any given time, some percentage of the total eVTOL 50 of the city will be loitering in the air awaiting passenger pickup, and some percentage will be within a silo 150 for maintenance. Those eVTOL 50 that are loitering in wait for a passenger will return to a silo 150 once available battery power is reduced below an appropriate threshold.

Silo storage provides 24-hour on-demand service. Loitering eVTOL 50 are available for very quick pickup of a vehicle 130 that requests a flight. The ability for eVTOL 50 to loiter in airspace above the area being serviced provides for rapid movement of vehicles during high-traffic periods. Skyboom 52 holds enough batteries or fuel to stay afloat for an entire four-to-six-hour work envelope. Additional eVTOL 50 can be deployed from the storage silos as demand increases. Having a large capacity of storage silos 150 also allows eVTOL 50 to be deployed from the silos rather than loitering in the air during low noise hours or in low noise areas. Silo storage of eVTOL 50 provides 24-hour on-demand service.

In addition to being buried in the ground, storage silos 150 can be built into high-rise buildings at the city center as shown in FIG. 6c. The silo 150 can be extended from high-rise 170 using robotic arms to allow an eVTOL 50 to park. The silo 150 containing a parked eVTOL 50 can be robotically moved to a storage location internal to high-rise 170, and a new empty silo extended from the building to store another eVTOL 50. When an eVTOL 50 is charged or needs to take off for another reason, the silo with that eVTOL can be extended from high-rise 170 using the same or a different robotic arm for takeoff.

Body 134 or vehicle 130 can be stored within high-rise 170 in a similar mechanism. In one scenario, a woman works in high-rise 170. The worker hops in her vehicle and pulls out of the garage at home. An eVTOL 50 is loitering nearby and picks up the worker's vehicle body via dock 132 when she indicates readiness. Once body 134 has been picked up, chassis 136 can automatically return to the worker's garage if not contracted to be made available elsewhere. eVTOL 50 flies vehicle body 134 with the worker as an occupant to high-rise 170. Only vehicle body 134 is necessary, without chassis 136, because the worker is being dropped of at her place of work and the vehicle body will be stored at the same location. There is no need for the worker to drive during the day. The eVTOL automatically flies to a designated passenger drop off point for the worker to get out and walk to her desk. The automobile body 134 is personally owned by the worker, so eVTOL 50 takes the body and drops it off with a robotic arm extending from high-rise 170 designated for vehicles. If eVTOL 50 needs recharged or serviced, the eVTOL can fly to another robotic arm designated for parking of eVTOL.

During the day, if for any reason the worker needs to drive somewhere local to high-rise 170, a drone can retrieve her automobile body 134 and attach a leased chassis 136 for local driving. If the worker commonly drives during the day, she could have had eVTOL 50 bring her chassis 136 at the beginning of the day. At the end of the day, the worker orders an eVTOL 50 to pick up her automobile body 134, pick her up from the designated pickup location, and drop her off at home. The worker's chassis 136 can automatically back out of the garage for parking of body 134 on the chassis. A variety of schemes can be implemented to expedite travel and improve convenient access.

Figure 10C:
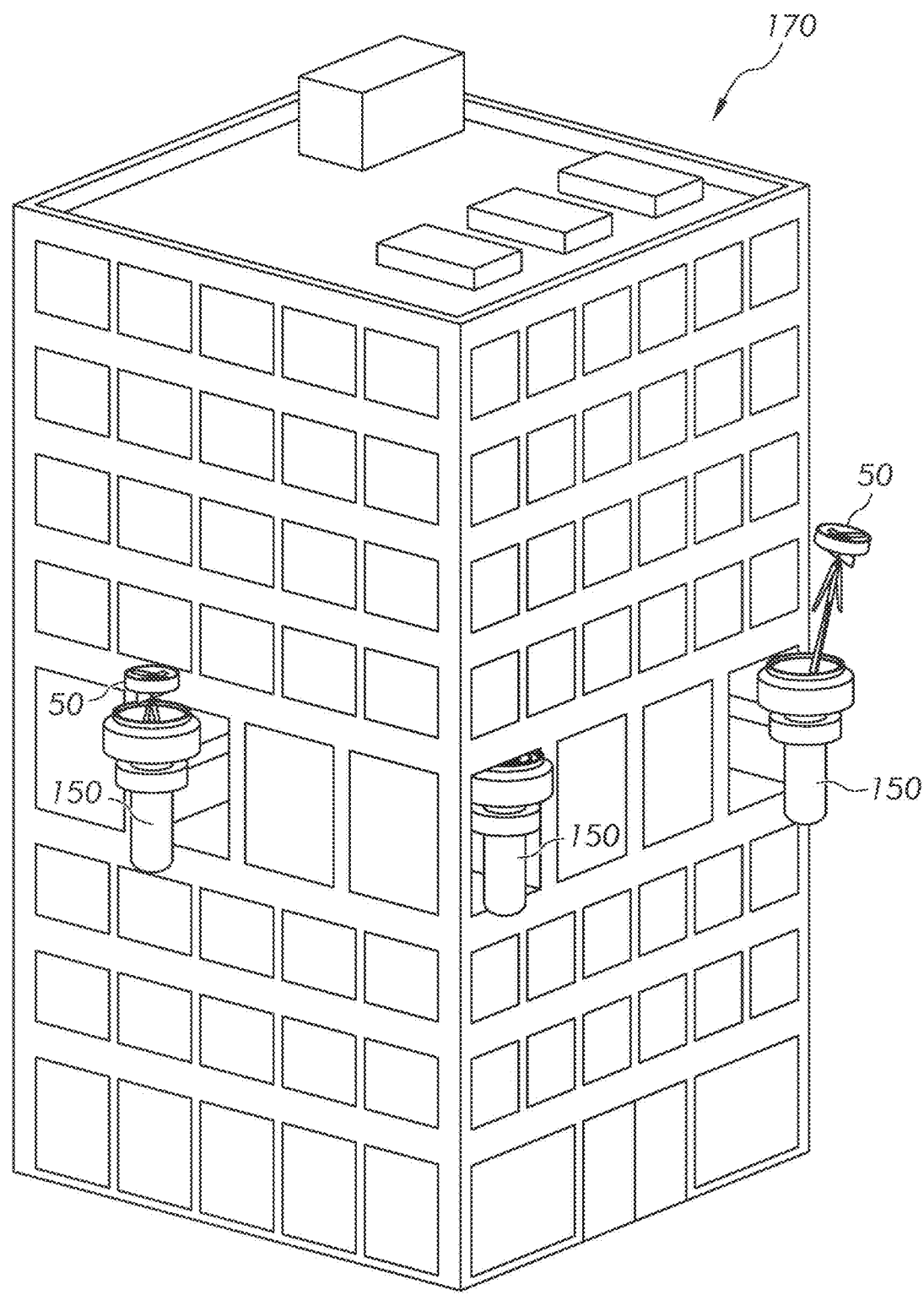
Figure 10D:
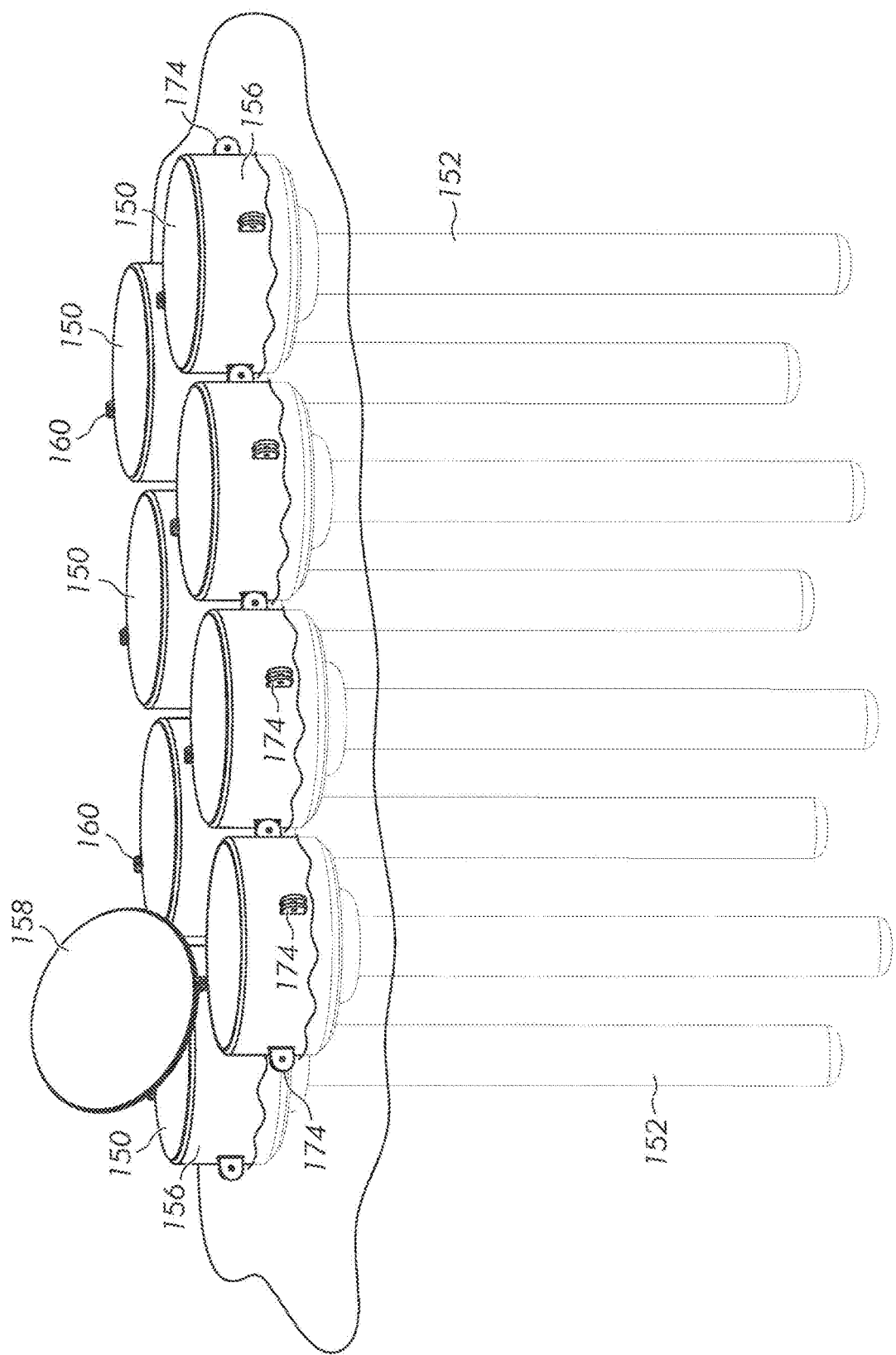

Cities adjacent to waterfronts can store thousands of silos 150 locked together in floating grids. FIG. 10d illustrates several silos 150 locked together in a body of water. Silos 150 include four locking mechanisms 174 located orthogonally around head 156 of each silo. Locking mechanisms 174 attach to each other mechanically to keep the silos from floating away from each other. Lid 158 can have a built-in lifting mechanism allowing an eVTOL 50 to lift the entire silo 150, allowing the eVTOLs to self-assemble the grid system.

The floating silos 150 can have power generation capability that powers the silos and recharges eVTOL 50 using wave power from the surrounding water. Power can also be generated from solar panels in lids 158. In one embodiment, each silo 150 in an array is totally self-sufficient and includes batteries to store wave and solar power for charging an eVTOL 50. In other embodiments, each silo includes a small battery, with one or more silos 150 totally dedicated to housing batteries for power storage without the capability to park an eVTOL 50. Silos 150 can transmit power between each other through electrical interconnects at locking mechanisms 174. Status information and other data can also be transmitted through electrical interconnects at locking mechanisms 174. One or more dedicated silos 150 could also be filled with liquid fuel to refuel jet eVTOLs 50 and hybrid eVTOLs.

The transportation system comprising eVTOL 50 with skyboom 52 will not require large infrastructure projects. The system may be aided by sensor placement along major thoroughfares to provide precise vehicle location. Personal ownership will spur automotive and aerospace manufacturers to increase production to meet demand. The highly efficient eVTOL 50 system will allow automobile companies to continue to use aluminum instead of carbon fiber in the manufacturing process. The use of aluminum is essential to retain the high-volume manufacturing techniques needed to reduce cost and accelerate demand-quickening the transition to passenger vehicles compatible with eVTOL 50. The layout of the carbon fiber eVTOL 50 structure is simple but will require strict adherence to aerospace standards of manufacturing to ensure safety. The narrow vehicle 130 design will effectively double road capacity as a solution to intracity congestion. Although it may seem counterintuitive, producing millions of eVTOL capable automobiles annually will quickly reduce traffic congestion and improve air quality.

Splitting the flying vehicle into two portions, eVTOL 50 and ground vehicle 130, allows both to be optimized separately. The modular design provides a practical systems solution to eVTOL flight, equally supporting the needs of both industry and the consumer. The design provides on-demand seamless VTOL transport, encompassing most sectors of the transportation industry.

EVTOL 50 with skyboom 52 turns VTOL flight into a customer-centric affordable on-demand service. The design supports private ownership, enticing consumers to purchase new VTOL capable automobiles due to value-added capability, i.e., better ride quality, performance, and safety. One of the best-selling features will be the virtually silent flight experience via the remote propulsion system. Purchase of a new eVTOL capable automobile 130 will allow the owner to fly across town or across the state without issue or hassle. EVTOL 50 will eliminate the need to build airports—resources would instead focus on developing the flight control systems and air traffic control systems that will be necessary irrespective of chosen vehicle. EVTOL 50 with skyboom 52 combined with vehicle 130 solves the problems associated with urban transport VTOL, eVTOL, and ground transportation vehicles.

Figure 11A:
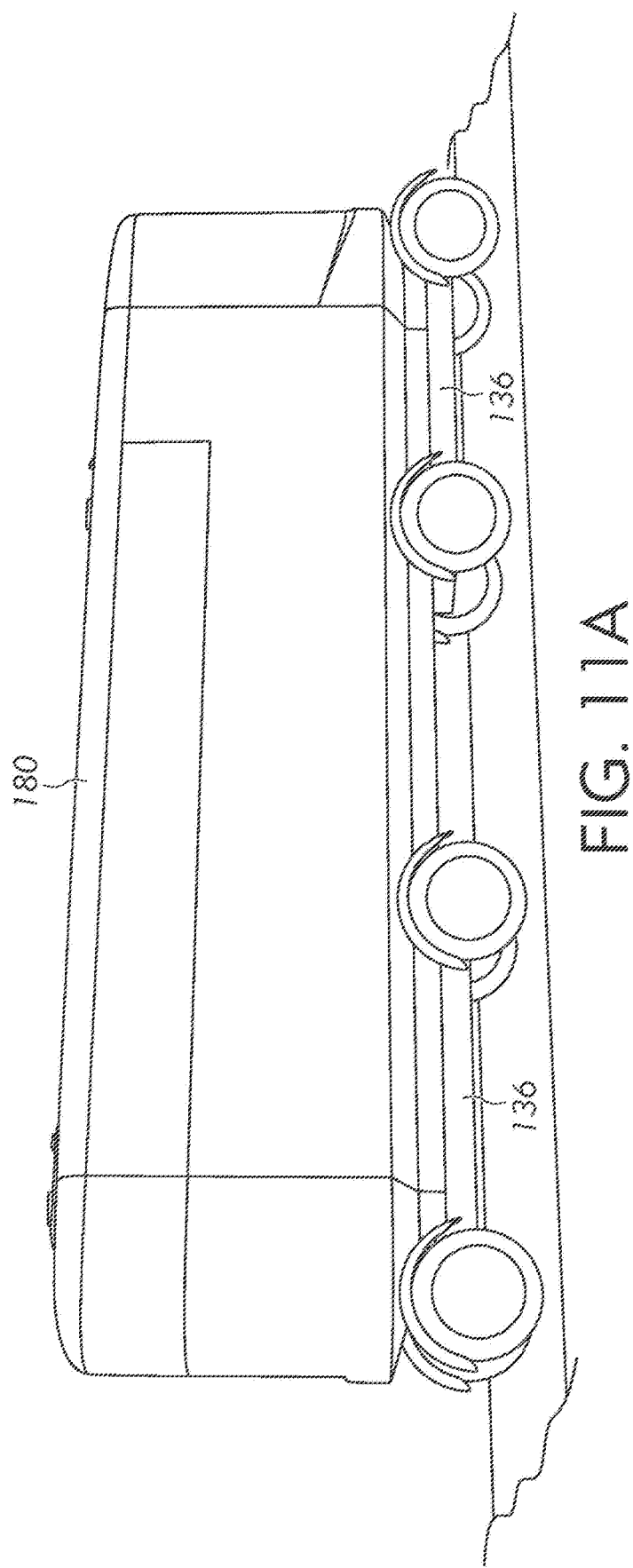

The modular design is capable of encompassing most sectors of the transportation industry. Multiple eVTOL 50 can be coupled together for metro bus service or larger delivery vehicles. One embodiment could be narrow-width taxicabs, as shown in FIGS. 11a and 11b, in which the occupants could stand rather than sit. This would enable the vehicle to adjust its pre-collision position to alter its final position. In the case of the standing taxis, front, back, and side pliable panels surrounding the vehicle's occupants could be used to absorb and distribute energy over a greater percentage of the occupants body surface. Standing would allow for greater occupancy per vehicle.

FIGS. 11a and 11b illustrate a large vehicle body 180. Large vehicle body is compatible with both chassis 136 and eVTOL 50. In FIG. 11a, body 180 is mounted on top of two chassis 136. Using two chassis 136 in tandem increases lifting capacity and improves control of larger vehicles. The two chassis 136 communicate with each other wired or wirelessly to coordinate leaning and other suspension qualities.

Similarly, in FIG. 11b, two eVTOL 50 are pictured attached to body 134. Using a pair of eVTOL 50 increases lifting capacity and range. Any number of eVTOL 50 can be used to lift an arbitrarily large load. eVTOL 50 can attach to a load side-by-side as shown in FIG. 11b, or attached to each other end-to-end to combine thrust power. In FIG. 11b, the power of four eVTOL 50 could be combined by using two end-to-end pair of eVTOL disposed side-by-side. The ability to combine multiple eVTOL 50 to increase lift capacity reduces the need to manufacture larger eVTOL.

FIGS. 12a-12d illustrate a rocket powered aircraft that adapts the skyboom 52 concept to faster travel speeds and longer travel distances, including into outer space. VTOL 200 in FIG. 12a has a rocket dome 202 as the propulsion system, essentially replacing rotor assembly 64 above. Dome 202 has rocket engines 204 formed in a ring around the lower edge of the dome. Rocket engines 204 are conventional bell nozzle rockets. Dome 202 has a temporary or removable loading ring 206 at the top of the dome for carrying VTOL 200 using a crane or other lifting mechanism.

Spaceboom 210 is attached to dome 202 by a rotating joint similar to rotating joint 56 above. The articulated dome 202 is able to use thrust vectoring to change trajectory of VTOL 200. Spaceboom 210 provides room for liquid rocket fuel storage, as well as batteries for operation of the electronics.

Spaceboom 210 includes a wing tip retention slide 212 that can hold onto the tip of wings 74 in a delta wing configuration. That is, wings 74 are oriented parallel to spaceboom 210, and both wings lie in a similar plane extending out from the spaceboom. Slide 212 holds the tips of wings 74 against spaceboom 210, and rotating joints 76 allow the wings to flex and act as control surfaces. The dotted line wings 54 in FIG. 12c illustrate the direction of flex when joint 56 is rotated. The wings can rotate to the delta configuration at a pre-set altitude or could be locked in place at liftoff. In another embodiment, VTOL 200 is launched with static wings or without wings at all.

Vehicle 130 can be loaded as the payload for VTOL 200, or any other payload can be carried. Vehicle 130 can have a heat shield attached under the vehicle in place of chassis 136 to protect the vehicle during takeoff, flight, and reentry. A clevis joint 216 is used to carry the payload. A rotating joint attaches vehicle 130 to clevis joint 216, which allows the vehicle to rotate parallel to spaceboom 210 for travel as shown in FIG. 12d. Alternatively, a payload could be loaded into a bell-shaped capsule 220 for attachment to VTOL 200 as shown in FIG. 12c. The load could also be disposed above wings 74.

Figure 12A:
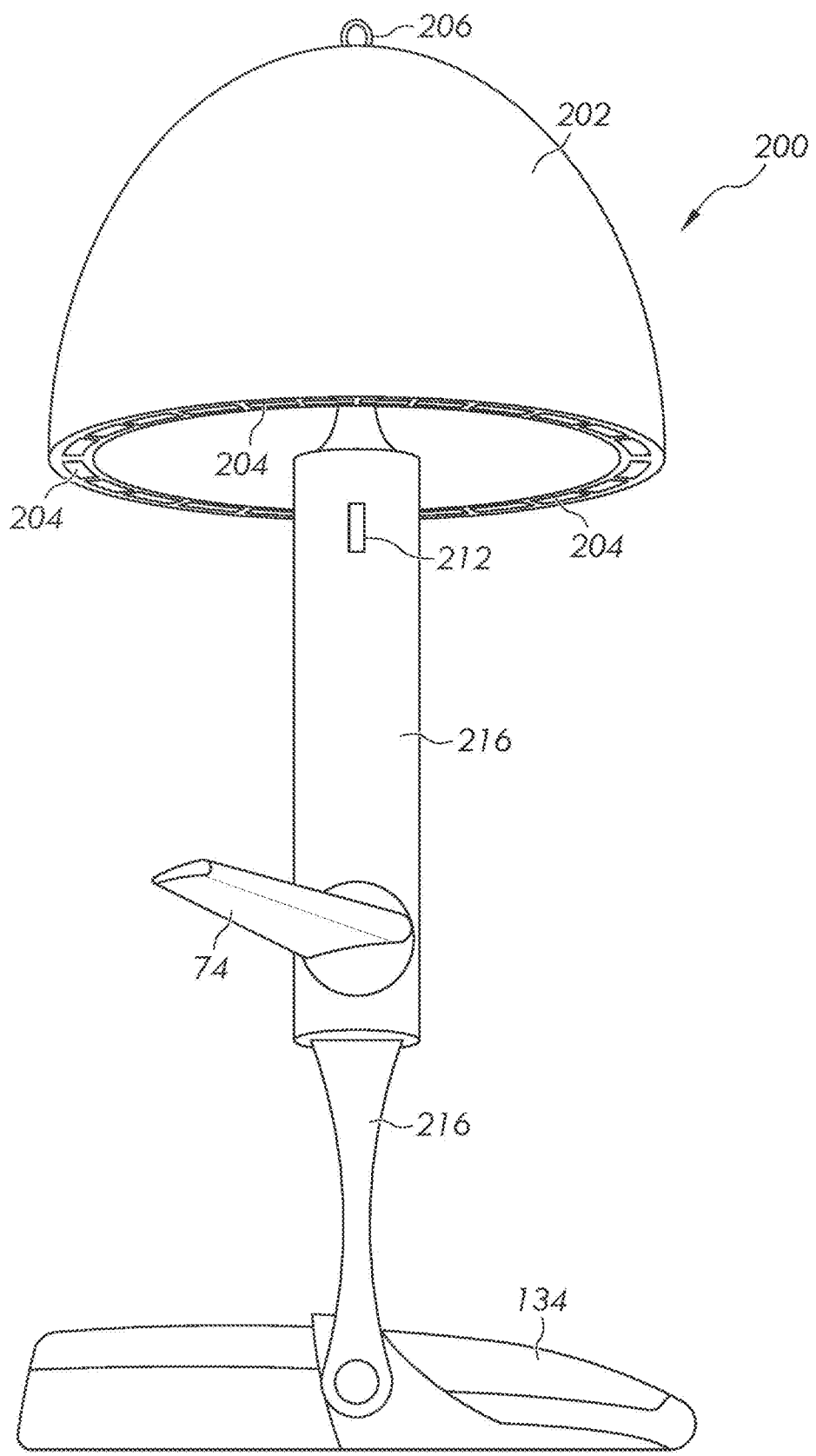
FIGS. 12a-12d illustrate a spaceboom capable of extending the concepts of the skyboom eVTOL into outer space.
Figure 12B:
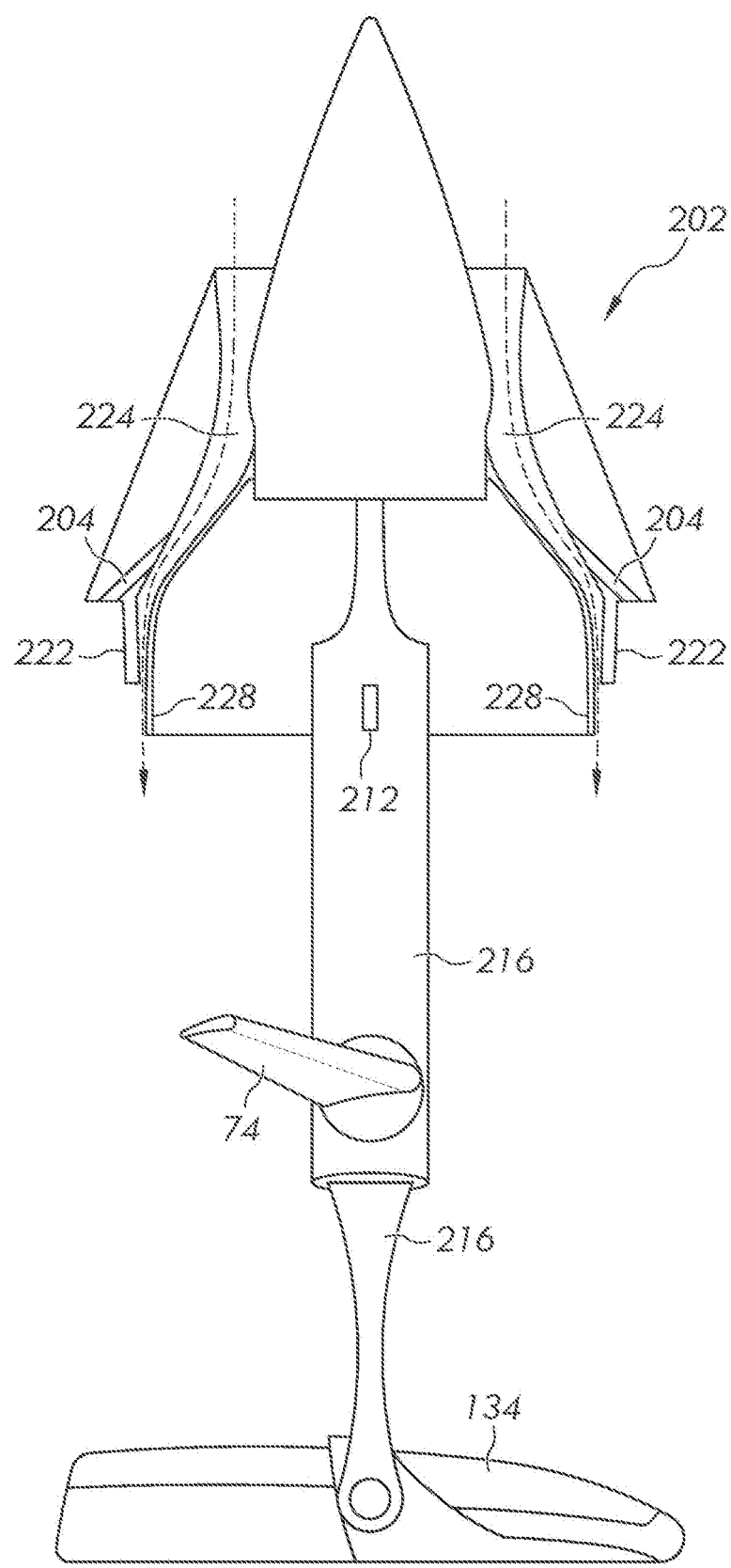
Figure 12C:
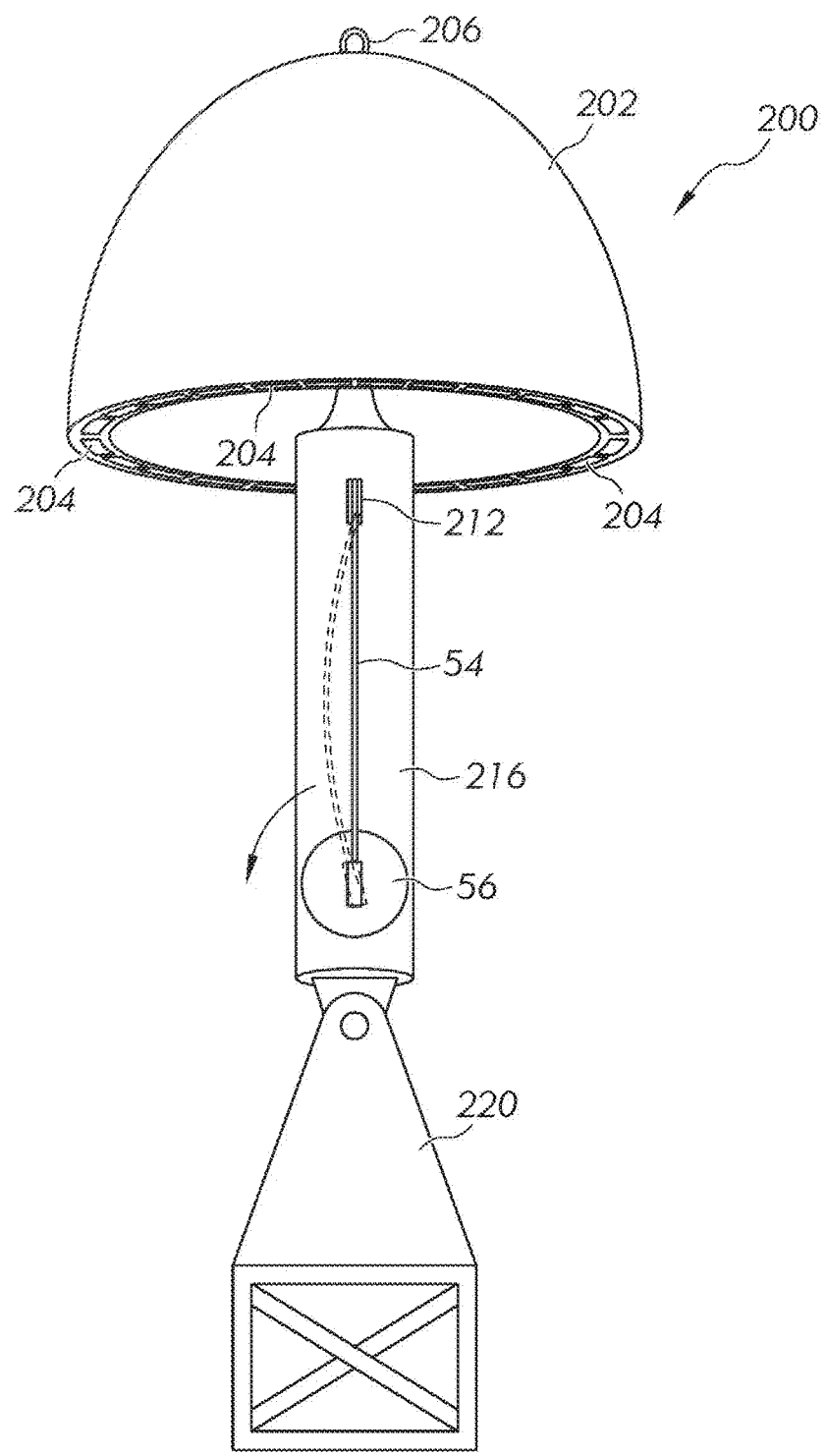
Figure 12D:
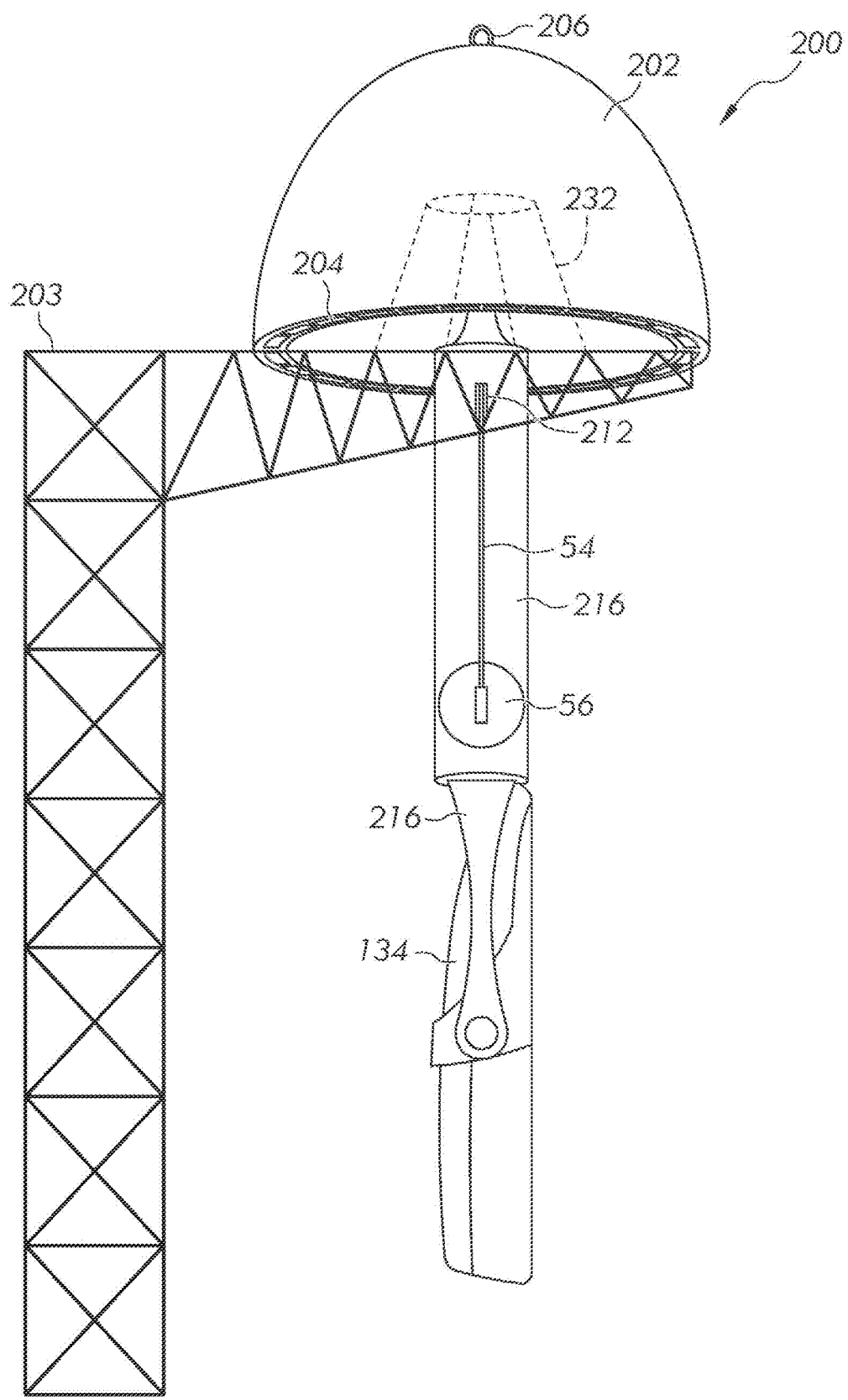

FIG. 12b illustrates an alternative embodiment for rocket dome 202. Inside the circle of rocket engines 204 is a truncated aerospike bell 222. Aerospike bell 222 guides the thrust from rocket engines 204 into the path of jet exhaust from ramjet 224. The dotted arrows in FIG. 12b illustrate the path of air through ramjet 224. The jet exhaust from ramjet 224 and rocket exhaust from rocket engines 204 combine to form a focused circular thrust plume. An optional inner jetscreen 228 is a circular shaped to direct exhaust around spaceboom 210 and the payload.

The large diameter dome 202 provides clean air flow into the ramjet engine 224. The adjustable inlet cone of ramjet engine 224 may be moved forward to close off the inlet for purposes of reentry. Exhaust gases from rocket engines 204 moving past the end of the aerospike bell 222 create a vacuum pulling air through the jet engine exhaust nozzle, located between the truncated aerospike bell and the longer "Inner jet-screen" allowing the jet engine to generate thrust at lower velocity. Given the size of the ramjet 224 inlet, the engine could operate as a Scramjet at higher velocity and altitude. Exhaust from the ramjet 224 outlet creates an inner boundary between the rocket exhaust and the fuselage, reducing temperatures on the fuselage. The inner boundary layer of air from the high velocity ramjet exhaust reduces thrust diffusion of the rocket exhaust that occurs with decreased pressure as the vehicle moves up through the atmosphere.

A second inner screen could be added to direct cooler air from an opening in the top of dome 202. The screen would be located on the inside of the rocket screen and act to further cool spaceboom 210 and the load. Dome 202 could also be fitted with rockets and a ram jet or rockets and air breathing jets without being an aerospike configuration.

FIG. 12d illustrates a launch configuration for VTOL 200. A crane lifts VTOL 200 using loading ring 206 and sets the underside of the dome on a launch trellis 230. Dome 202 includes an integrated support structure 232 within the dome structure to support the weight of VTOL 200 on trellis 230. Hanging from dome 202 keeps VTOL 200 in tension prior to takeoff. Propulsion being located in dome 202 keeps VTOL 200 in tension during takeoff and flight. Keeping VTOL 200 in tension allows beneficial weight saving design changes in both structure and materials. The tractor location of the propulsion system also provides greater stability and control throughout the flight envelope. Trellis 230 can be mounted permanently on the ground, on rails, on a magnetic track, on a wheeled platform, or on any other suitable base.

Once launched, flight trajectory of VTOL 200 is controlled via thrust vectoring of the propulsion dome 202 through independent throttling of the aerospike nozzles located around the perimeter of the dome. Attitude of the spaceboom 210 and load relative to dome 202 is maintained via warping of the elongated delta wings 74 located on either side of the fuselage. Detachment of the wings leading edge from the fuselage allows the wing to fold out upon reentry, providing controlled flight back to the landing zone. Alternatively, VTOL 200 can parachute back to earth. In one embodiment, the load separates from VTOL 200 and each parachutes or glides back to Earth individually.

With heat shield 214 attached to the bottom of the gimbal mounted load VTOL 200 can reenter Earth's atmosphere dome 202 first or load first. Wings 74 can stay in the locked delta configuration during reentry to control flight.

While one or more embodiments of the present invention have been illustrated in detail, the skilled artisan will appreciate that modifications and adaptations to those embodiments may be made without departing from the scope of the present invention as set forth in the following claims.

What is claimed:

1. A vertical takeoff and landing (VTOL) aircraft, comprising:
    a boom;
    a propulsion assembly coupled to a first end of the boom via a first rotating joint; and
    a pair of wings extending from the boom, the pair of wings includes a first wing coupled to the boom and a second wing coupled to the boom;
    wherein the boom is configured to be suspended substantially vertically from the propulsion assembly with the aircraft in a vertical flight mode, the propulsion assembly is configured to generate a vertical thrust during vertical flight mode; and
    the first rotating joint is configured to rotate the propulsion assembly with respect to the boom to generate a horizontal thrust with the propulsion assembly to transition the aircraft from the vertical flight mode to a horizontal flight mode; and
    wherein, in flight, the pair of wings is configured to move between a first position, wherein the pair of wings is folded substantially parallel with the boom, and a second position, wherein the pair of wings is unfolded from the boom and oriented substantially perpendicular to the boom so as to generate lift when the aircraft is in at least one of the vertical flight mode or the horizontal flight mode.

2. The VTOL aircraft of claim 1, wherein, in flight, the first wing and the second wing are configured to at least one of:
    move between the first position and the second position independently of one another; or
    rotate independently of one another.

3. The VTOL aircraft of claim 1, wherein, in flight, the first wing is rotatable with respect to the boom about an axis through a length of the first wing.

4. The VTOL aircraft of claim 1, wherein the first wing is coupled to the boom via the first rotating joint.

5. The VTOL aircraft of claim 1, wherein the first wing is coupled to the boom via a second rotating joint.

6. The VTOL aircraft of claim 5, wherein the first wing is coupled to a second end of the boom via the second rotating joint.

7. The VTOL aircraft of claim 5, wherein, in flight, the second rotating joint is configured to at least one of:
    rotate the first wing about an axis through a length of the first wing; or
    rotate the first wing between the first position and the second position.

8. The VTOL aircraft of claim 1, further comprising the second wing coupled to the boom via a second rotating joint.

9. The VTOL aircraft of claim 1, wherein the pair of wings is configured to generate lift when the aircraft is in the horizontal flight mode.

10. The VTOL aircraft of claim 9, wherein the pair of wings is configured to generate lift when the aircraft is in vertical flight mode.

11. A VTOL aircraft, comprising:
    a boom;
    a propulsion assembly coupled to a first end of the boom, the propulsion assembly is configured to generate a vertical thrust when the aircraft is in a vertical flight mode; and
    a first pair of wings extending from the boom, the first pair of wings includes a first wing and a second wing;
    a second pair of wings extending from the boom, the second pair of wings includes a third wing and a fourth wing;
    wherein, with the aircraft in a vertical flight mode, the boom, the first pair of wings, and the second pair of wings are configured to rotate together relative to the propulsion assembly about a longitudinal axis of the boom.

12. The VTOL aircraft of claim 11, wherein the boom is configured to be suspended substantially vertically beneath the propulsion assembly with the aircraft in the vertical flight mode.

13. The VTOL aircraft of claim 11, wherein the first pair of wings is coupled to the boom via a first rotating joint configured to at least one of:
    rotate the first wing and the second wing about axes through the lengths thereof; or
    rotate the first wing and the second wing between first positions, wherein the first wing and the second wing are folded substantially parallel with the boom, and second positions, wherein the first wing and the second wing are unfolded from the boom and oriented substantially perpendicular to the boom.

14. The VTOL aircraft of claim 11, wherein the propulsion assembly is coupled to the first end of the boom via a first rotating joint configured to rotate the propulsion assembly with respect to the boom to generate a horizontal thrust with the propulsion assembly to transition the aircraft from the vertical flight mode to a horizontal flight mode.

15. The VTOL aircraft of claim 11, further comprising an electrical energy source disposed in the boom, wherein the propulsion assembly is powered by the electrical energy source.

16. The VTOL aircraft of claim 11, wherein the first pair of wings is configured to move between a first position, wherein the pair of wings is folded substantially parallel with the boom, and a second position, wherein the pair of wings is unfolded from the boom and oriented substantially perpendicular to the boom so as to generate lift when the aircraft is in the vertical flight mode.

17. A VTOL aircraft, comprising:
    a boom;
    a propulsion assembly coupled to a first end of the boom via a stanchion, the propulsion system incudes a plurality of rotor blades;
    a plurality of paddles disposed between the propulsion assembly and the boom, the propulsion assembly is configured to direct a flow of air across the plurality of paddles to spin the boom in vertical flight; and
    a first wing coupled to the boom and configured to generate lift when the boom spins in vertical flight.

18. The VTOL aircraft of claim 17, wherein each paddle of the plurality of paddles is configured to rotate about an axis through the length thereof.

19. The VTOL aircraft of claim 17, wherein the plurality of paddles is configured to rotate about the stanchion.

20. The VTOL aircraft of claim 17, wherein the plurality of paddles is configured to direct the flow of air from the propulsion assembly to direct a thrust generated by the plurality of rotor blades to change a direction of flight of the VTOL aircraft.

* * * * *